US012701174B2

(12) United States Patent
Parla et al.

(10) Patent No.: US 12,701,174 B2
(45) Date of Patent: *Aug. 4, 2026

(54) USING MASQUE TO TUNNEL ETHERNET FRAMES

(71) Applicant: Cisco Technology, Inc., San Jose, CA (US)

(72) Inventors: Vincent E. Parla, North Hampton, NH (US); Kyle Andrew Donald Mestery, Woodbury, MN (US)

(73) Assignee: Cisco Technology, Inc., San Jose, CA (US)

( * ) Notice: Subject to any disclaimer, the term of this patent is extended or adjusted under 35 U.S.C. 154(b) by 316 days.

This patent is subject to a terminal disclaimer.

(21) Appl. No.: 18/612,355

(22) Filed: Mar. 21, 2024

(65) Prior Publication Data

US 2025/0184408 A1     Jun. 5, 2025

Related U.S. Application Data

(63) Continuation of application No. 17/719,921, filed on Apr. 13, 2022, now Pat. No. 11,968,277.

(Continued)

(51) Int. Cl.
H04L 67/561          (2022.01)
H04L 9/40          (2022.01)
(Continued)

(52) U.S. Cl.
CPC ........ H04L 67/561 (2022.05); H04L 12/4633 (2013.01); H04L 12/4641 (2013.01);
(Continued)

(58) Field of Classification Search
CPC ....... H04L 45/62; H04L 67/561; H04L 67/02; H04L 63/0236
(Continued)

(56) References Cited

U.S. PATENT DOCUMENTS 9,923,961 B2     3/2018  Hentunen
10,951,522 B2*   3/2021  Merchant .............. H04L 61/103
(Continued)

FOREIGN PATENT DOCUMENTS

CN      111885093 A     11/2020
CN      112600953 A      4/2021
(Continued)

OTHER PUBLICATIONS

The PCT Search Report and Written Opinion for PCT application No. PCT/US2022/047826, mailed Feb. 20, 2023, 17 pages.
(Continued)

*Primary Examiner* — Sibte H Bukhari
(74) *Attorney, Agent, or Firm* — Lee & Hayes, P.C.

(57)     ABSTRACT

Techniques for tunneling Layer 2 ethernet frames over a connection tunnel using the MASQUE protocol are described herein. The MASQUE protocol may be extended to include a new entity, configured to proxy ethernet frames using a MASQUE proxy connection, and an associated CONNECT method, CONNECT-ETH. Using the extended MASQUE protocol, an Ethernet over MASQUE (Eo-MASQUE) tunnel may then be established between various networks that are remote from one another and connected to the internet. An EoMASQUE tunnel, established between separate remote client premises, and/or between a remote client premise and an enterprise premise, may tunnel ethernet packets between the endpoints. Additionally, a first EoMASQUE tunnel, established between a first client router provisioned in a first remote client premise and an EoMASQUE proxy node, and a second EoMASQUE tunnel, established between a second client premise and the EoMASQUE proxy node, may tunnel ethernet packets between the first and second client premise.

20 Claims, 21 Drawing Sheets

Related U.S. Application Data

(60) Provisional application No. 63/273,306, filed on Oct. 29, 2021, provisional application No. 63/272,985, filed on Oct. 28, 2021, provisional application No. 63/271,437, filed on Oct. 25, 2021, provisional application No. 63/244,599, filed on Sep. 15, 2021.

(51) Int. Cl.

| | |
|---|---|
| *H04L 12/46* | (2006.01) |
| *H04L 45/00* | (2022.01) |
| *H04L 45/42* | (2022.01) |
| *H04L 61/103* | (2022.01) |
| *H04L 61/4511* | (2022.01) |
| *H04L 67/02* | (2022.01) |
| *H04L 67/101* | (2022.01) |
| *H04L 67/1012* | (2022.01) |
| *H04L 67/141* | (2022.01) |
| *H04L 67/562* | (2022.01) |

(52) U.S. Cl.
CPC .............. *H04L 45/42* (2013.01); *H04L 45/66* (2013.01); *H04L 61/103* (2013.01); *H04L 61/4511* (2022.05); *H04L 63/0236* (2013.01); *H04L 63/0281* (2013.01); *H04L 63/029* (2013.01); *H04L 63/0435* (2013.01); *H04L 67/02* (2013.01); *H04L 67/101* (2013.01); *H04L 67/1012* (2013.01); *H04L 67/141* (2013.01); *H04L 67/562* (2022.05)

(58) Field of Classification Search
USPC ........................................................ 709/238
See application file for complete search history.

(56) References Cited

U.S. PATENT DOCUMENTS

| | | | |
|---|---|---|---|
| 11,516,185 B2 | 11/2022 | Scali et al. | |
| 11,563,772 B2 | 1/2023 | Doron et al. | |
| 11,785,523 B1 | 10/2023 | Di Dio et al. | |
| 11,968,277 B2 | 4/2024 | Parla et al. | |
| 2006/0193335 A1 | 8/2006 | Nanji | |
| 2010/0077064 A1 | 3/2010 | Viger et al. | |
| 2013/0014206 A1 | 1/2013 | Rao et al. | |
| 2015/0365412 A1 | 12/2015 | Innes et al. | |
| 2017/0104851 A1 | 4/2017 | Arangasamy et al. | |
| 2017/0353386 A1 | 12/2017 | Wang et al. | |
| 2018/0183794 A1 | 6/2018 | Desai et al. | |
| 2018/0375967 A1 | 12/2018 | Pithawala et al. | |
| 2019/0199835 A1 | 6/2019 | Deval et al. | |
| 2019/0268305 A1 | 8/2019 | Xu et al. | |
| 2019/0268797 A1 | 8/2019 | Pang et al. | |
| 2019/0319873 A1 | 10/2019 | Shelar et al. | |
| 2019/0386961 A1 | 12/2019 | Kupisiewicz et al. | |
| 2020/0067634 A1 | 2/2020 | Medard et al. | |
| 2020/0120015 A1 | 4/2020 | Boucadair et al. | |
| 2020/0120555 A1 | 4/2020 | Patil et al. | |
| 2021/0045186 A1 | 2/2021 | Fu et al. | |
| 2021/0250333 A1 | 8/2021 | Negrea et al. | |
| 2021/0312366 A1 | 10/2021 | Dhanabalan et al. | |
| 2022/0116327 A1 | 4/2022 | Salkintzis | |
| 2022/0174044 A1* | 6/2022 | Konda ................ | H04L 63/0442 |
| 2022/0386166 A1 | 12/2022 | Sarker et al. | |
| 2022/0407799 A1 | 12/2022 | Amend | |
| 2023/0074934 A1 | 3/2023 | Li et al. | |
| 2023/0079444 A1 | 3/2023 | Parla | |
| 2023/0081782 A1 | 3/2023 | Parla et al. | |
| 2023/0083582 A1 | 3/2023 | Parla et al. | |
| 2023/0085513 A1 | 3/2023 | Mestery et al. | |
| 2025/0350667 A1 | 11/2025 | Parla et al. | |
| 2026/0006106 A1 | 1/2026 | Parla et al. | |

FOREIGN PATENT DOCUMENTS

| | | |
|---|---|---|
| CN | 112653740 A | 4/2021 |
| WO | WO2014161408 A1 | 10/2014 |
| WO | WO2021009553 | 1/2021 |
| WO | 2021084326 A1 | 5/2021 |
| WO | 2021163684 A1 | 8/2021 |
| WO | 2021170248 A1 | 9/2021 |
| WO | 2022083897 A1 | 4/2022 |
| WO | 2022194397 A1 | 9/2022 |
| WO | 2023043727 A1 | 3/2023 |
| WO | 2023044174 A1 | 3/2023 |

OTHER PUBLICATIONS

International Search Report and Written Opinion for International Application No. PCT/US2023/017934, mailed Jul. 5, 2023, 16 Pages.

Iyengar J., et al., "QUIC: A UDP-Based Mulitplexed and Secure Transport," Internet Engineering Task Force (IETF), May 2021, 95 pages.

Kuehlewind M., et al., "Applicability of the QUIC Transport Protocol draft-ietf-quic-applicability-13," Network Working Group, Internet—Draft, Sep. 2, 2021, 28 pages.

Kuehlewind M., et al., "Discovery Mechanism for QUIC-based, Non-transparent Proxy Services draft-Kuehlewind-quic-proxy-discovery-01," Network Working Group, Internet Draft, Jan. 27, 2020, 12 pages.

Non-Final Office Action for U.S. Appl. No. 17/719,867, mailed Sep. 18, 2023, 10 Pages.

Non-Final Office Action for U.S. Appl. No. 17/719,829, dated Jun. 2, 2023, 15 Pages.

Sy E., et al., "Accelerating QUIC's Connection Establishment on High-Latency Access Networks," Institute of Electrical and Electronics Engineers, Internet Article, 2019 IEEE 38th International Performance Computing and Communications Conference, Oct. 29-31, 2019, 8 pages.

GPP Draft; 23700-93-130, 3rd Generation Partnership Project (3GPP), Mobile Competence Centre; 650, Route Des Lucioles; F-06921 Sophia-Antipolis Cedex ; France, Mar. 16, 2021 (Mar. 16, 2021), XP051988422, Retrieved from th~ Internet: URL:https://ftp.3gpp.org/tsg_sa/WG2_Arch/Latest_SA2_Specs/Latest_draft_S2_Specs/23700-93-130.zip 23700-93-130_MCCclean.docx [retrieved on Mar. 16, 2021] p. 49, paragraph 6.7.4.1-p. 50, paragraph 6.7.4.2.

3GPP Access Traffic Steering Switching and Splitting (ATSSS)—Overview for IETF Participants; draft-bonaventure-quic-atsss-overview-00.txt; Internet-Draft: QUIC Working Group, Internet Engineering TA May 30, 2020 (May 30, 2020), pp. 1-29, XP015139853, Retrieved from the Internet: URL:https://too1s.ietf.org/html/draft-bonaventure-quic-atsss-overview-00 [retrieved on May 30, 2020] paragraph [0008].

Method to Pre-Fetch Domain Names at HTTP Proxy Servers; draft-pchowdaiah-prefetch-dns-over-http-00.txt, Internet Engineering Task Force, IETF; Standardworkingdraft, Internet Society (ISOC) 4, Rue Des Falaises CH-1205 Geneva, Switzerland, Mar. 28, 2017 (Mar. 28, 2017), pp. 1-9, XP015118971, [retrieved on Mar. 28, 2017] abstract.

Use Cases and Requirements for QUIC as a Substrate; draft-kuehlewind-quic-substrate-02.txt; Internet-Draft: Network Working Group, Internet Engineering Task Force, IETF; Standardworkingdraft, Internet, No. 2. Nov. 4, 2019 (Nov. 4, 2019), pp. 1-10, XP015136306, Retrieved from the Internet: URL:https://too1s.ietf.org/html/draft-kueh1ewind-quic-substrate-02 [retrieved on Nov. 4, 2019] p. 1-p. 4.

Kuhlewind Mirja Mirja Kuehlewind@ericsson.com et al: "Evaluation of QUIC-based MASQUE proxying", Proceedings of the 2nd ACM International Workshop on Distributed Machine Learning, ACMPUB27, New York, NY, USA, Dec. 7, 2021 (Dec. 7, 2021), pp. 29-34, XP058784828, DOI: 10.1145/3488660.3493806 ISBN: 978-1-4503-9140-5 the whole document.

QUIC-Aware Proxying Using HTTP draft-pauly-masque-quic-proxy-03; draft-pauly-masque-quic~proxy-03.txt; Internet-Draft: Masque, Internet Engineering Task Force, IETF; Standardworkingdraft, Internet Soc, No. 3 Mar. 5, 2022 (Mar. 5, 2022), pp. 1-19, XP015150575,

(56) References Cited

OTHER PUBLICATIONS

Retrieved from the Internet: URL:https://tools.ietf.org/htrn1/draft-pauly-masque-quic-proxy-03 [retrieved on Mar. 5, 2022] p. 11, paragraph 5.

The PCT Search Report and Written Opinion mailed Nov. 25, 2022 for PCT application No. PCT/US2022/043336, 16 pages.

The PCT Search Report and Written Opinion mailed Feb. 20, 2023 for PCT application No. PCT/US2022/04 7765, 15 pages.

Piraux et al. "Tunneling Inernet Protocols Inside QUIC; draft-piraux-quic-tunnel-03.txt", Tunneling Internet Protocols Inside QUIC; draft-piraux-quic-tunnel-03.txt; Internet-Draft: QUIC Working Group, Internet Engineering Task Force, IETF; Standardworkingdraft, Internet Society (ISOC) 4, R No. 3 Aug. 12, 2020 (Aug. 12, 2020), pp. 1-18, XP015141276, Retrieved from the Internet: URL:https://tools.ietf.org/html/draft-piraux-quic-tunnel-03 [retrieved on Aug. 12, 2020] paragraphs [0003], [0005].

The Masque Protocol; draft-schinazi-masque-protocol-01.txt; Internet-Draft: Network Working Group, Internet Engineering Task Force, IETF; Standardworkingdraft, Internet Society (ISOC) 4, Rue Des Falai No. 1 Mar. 13, 2020 (Mar. 13, 2020), pp. 1-14, XP015138706, Retrieved from the Internet: URL:https://tools.ietf.org/html/draft-schinazi-masque-protocol-01 [retrieved on Mar. 13, 2020] paragraph [0001].

* cited by examiner

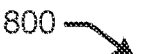
QUIC Long Header
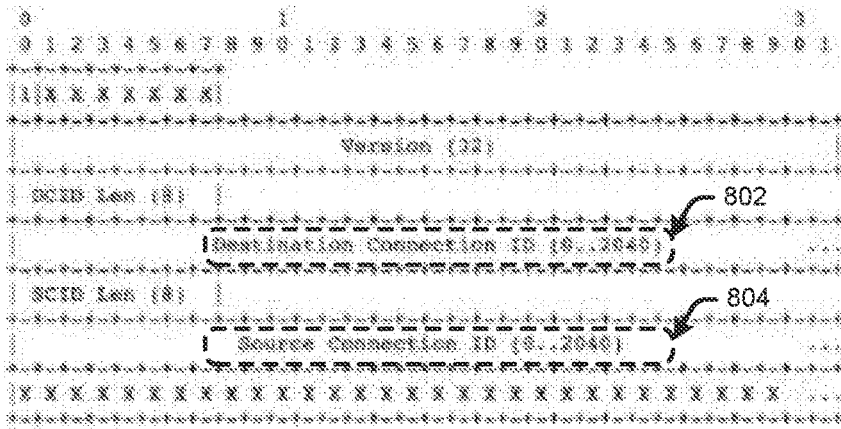
FIG. 8A
QUIC Short Header
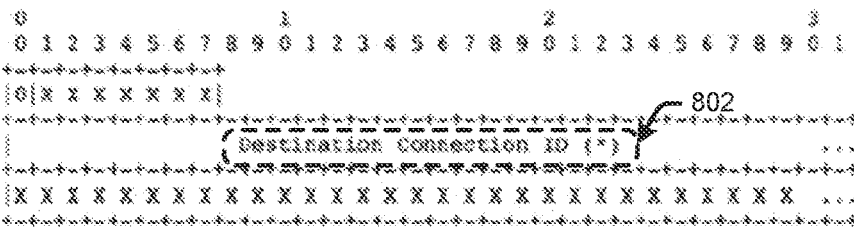
Used after connection establishment
(+) Destination CID is optional
"Spin bit" used for RTT measurement
FIG. 8B

900 —

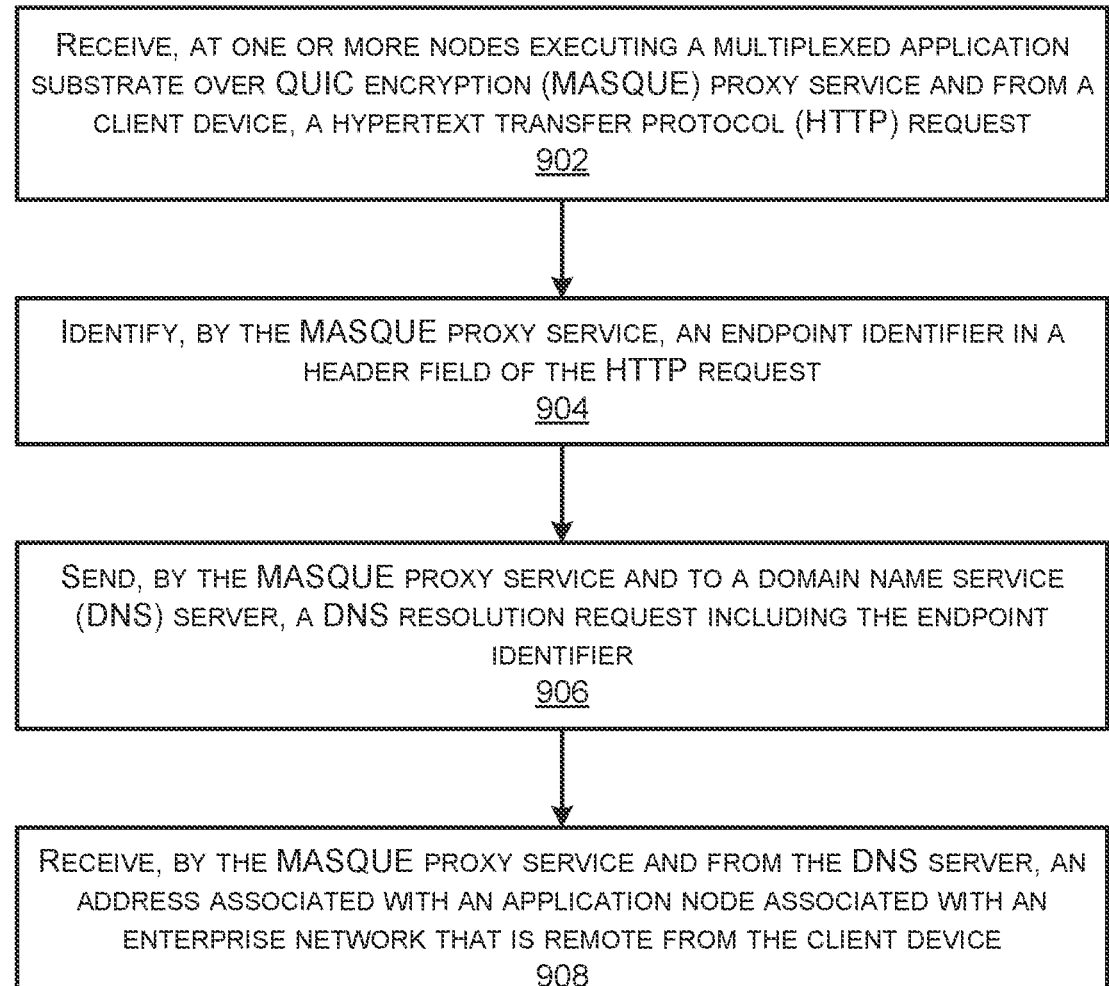

RECEIVE, AT ONE OR MORE NODES EXECUTING A MULTIPLEXED APPLICATION SUBSTRATE OVER QUIC ENCRYPTION (MASQUE) PROXY SERVICE AND FROM A CLIENT DEVICE, A HYPERTEXT TRANSFER PROTOCOL (HTTP) REQUEST
902

IDENTIFY, BY THE MASQUE PROXY SERVICE, AN ENDPOINT IDENTIFIER IN A HEADER FIELD OF THE HTTP REQUEST
904

SEND, BY THE MASQUE PROXY SERVICE AND TO A DOMAIN NAME SERVICE (DNS) SERVER, A DNS RESOLUTION REQUEST INCLUDING THE ENDPOINT IDENTIFIER
906

RECEIVE, BY THE MASQUE PROXY SERVICE AND FROM THE DNS SERVER, AN ADDRESS ASSOCIATED WITH AN APPLICATION NODE ASSOCIATED WITH AN ENTERPRISE NETWORK THAT IS REMOTE FROM THE CLIENT DEVICE
908

ESTABLISH, AT LEAST PARTLY BY THE MASQUE PROXY SERVICE, A TUNNELED CONNECTION BETWEEN THE ONE OR MORE NODES AND THE APPLICATION NODE, WHEREIN THE TUNNELED CONNECTION IS CONFIGURED TO TRANSMIT A DATA STREAM BETWEEN THE CLIENT DEVICE AND THE APPLICATION NODE
910

Figure 10:
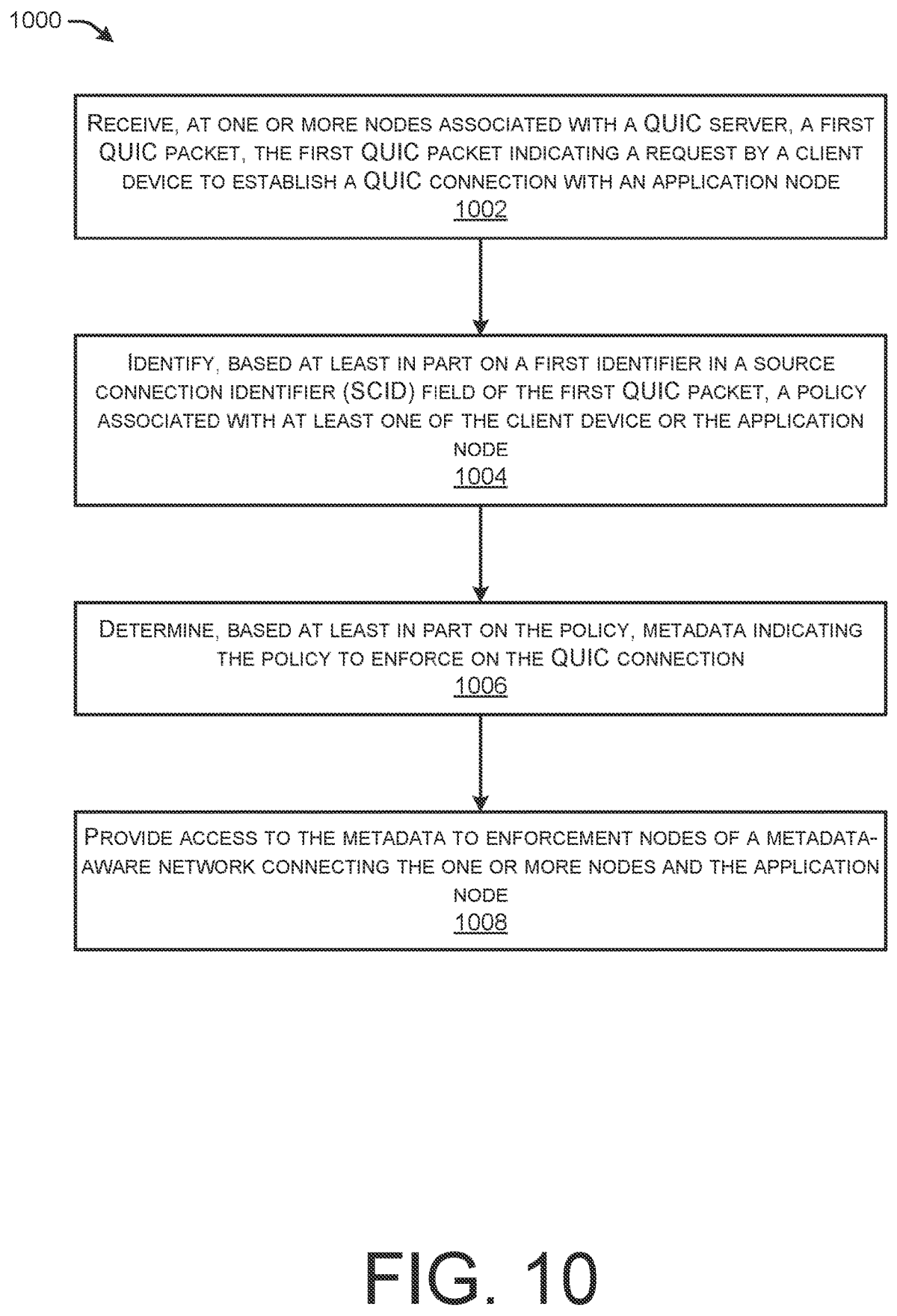

RECEIVE, AT ONE OR MORE NODES ASSOCIATED WITH A QUIC SERVER, A FIRST QUIC PACKET, THE FIRST QUIC PACKET INDICATING A REQUEST BY A CLIENT DEVICE TO ESTABLISH A QUIC CONNECTION WITH AN APPLICATION NODE
1002

IDENTIFY, BASED AT LEAST IN PART ON A FIRST IDENTIFIER IN A SOURCE CONNECTION IDENTIFIER (SCID) FIELD OF THE FIRST QUIC PACKET, A POLICY ASSOCIATED WITH AT LEAST ONE OF THE CLIENT DEVICE OR THE APPLICATION NODE
1004

DETERMINE, BASED AT LEAST IN PART ON THE POLICY, METADATA INDICATING THE POLICY TO ENFORCE ON THE QUIC CONNECTION
1006

PROVIDE ACCESS TO THE METADATA TO ENFORCEMENT NODES OF A METADATA-AWARE NETWORK CONNECTING THE ONE OR MORE NODES AND THE APPLICATION NODE
1008

Figure 11:
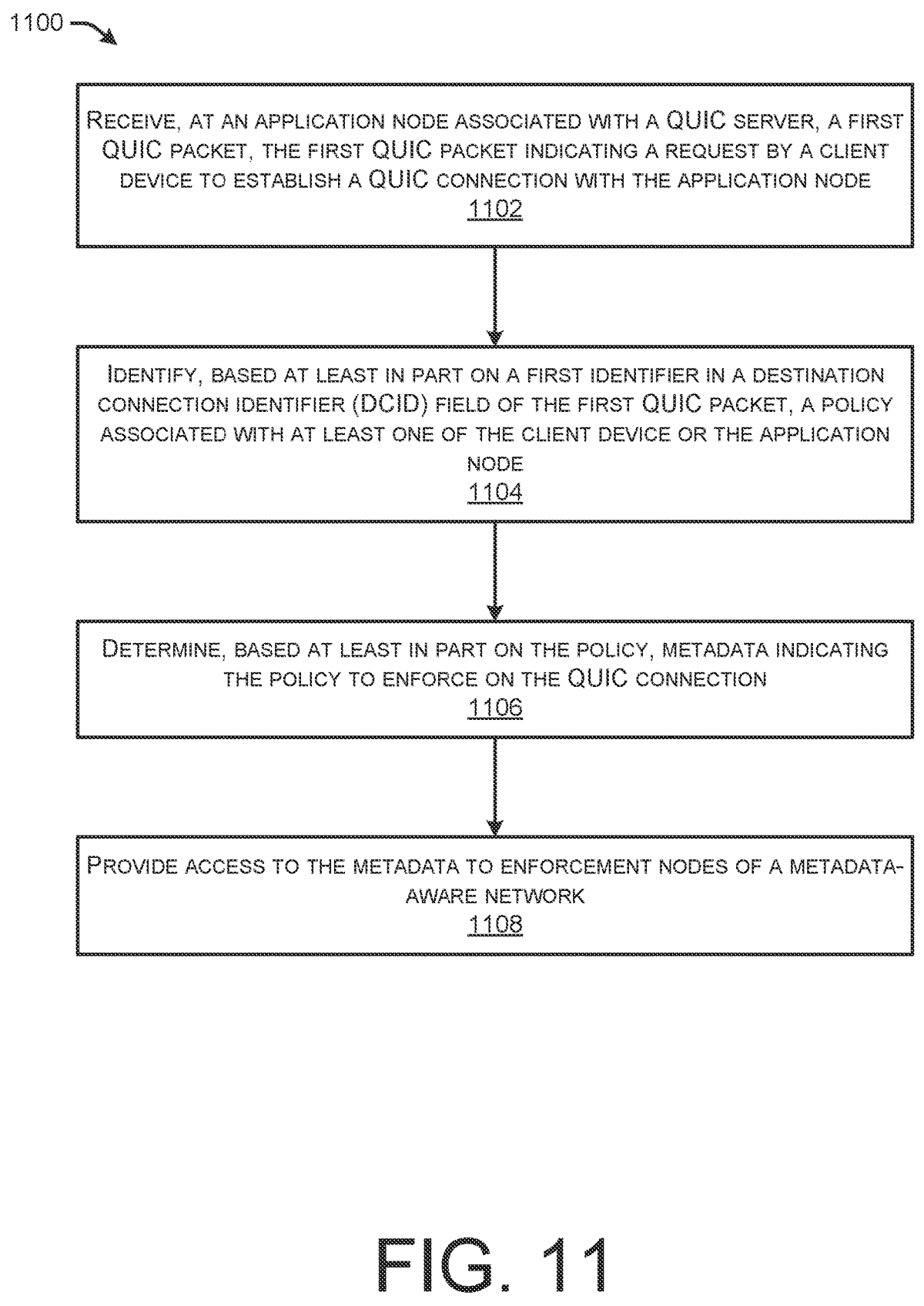

RECEIVE, AT AN APPLICATION NODE ASSOCIATED WITH A QUIC SERVER, A FIRST QUIC PACKET, THE FIRST QUIC PACKET INDICATING A REQUEST BY A CLIENT DEVICE TO ESTABLISH A QUIC CONNECTION WITH THE APPLICATION NODE
1102

IDENTIFY, BASED AT LEAST IN PART ON A FIRST IDENTIFIER IN A DESTINATION CONNECTION IDENTIFIER (DCID) FIELD OF THE FIRST QUIC PACKET, A POLICY ASSOCIATED WITH AT LEAST ONE OF THE CLIENT DEVICE OR THE APPLICATION NODE
1104

DETERMINE, BASED AT LEAST IN PART ON THE POLICY, METADATA INDICATING THE POLICY TO ENFORCE ON THE QUIC CONNECTION
1106

PROVIDE ACCESS TO THE METADATA TO ENFORCEMENT NODES OF A METADATA-AWARE NETWORK
1108

Figure 12:
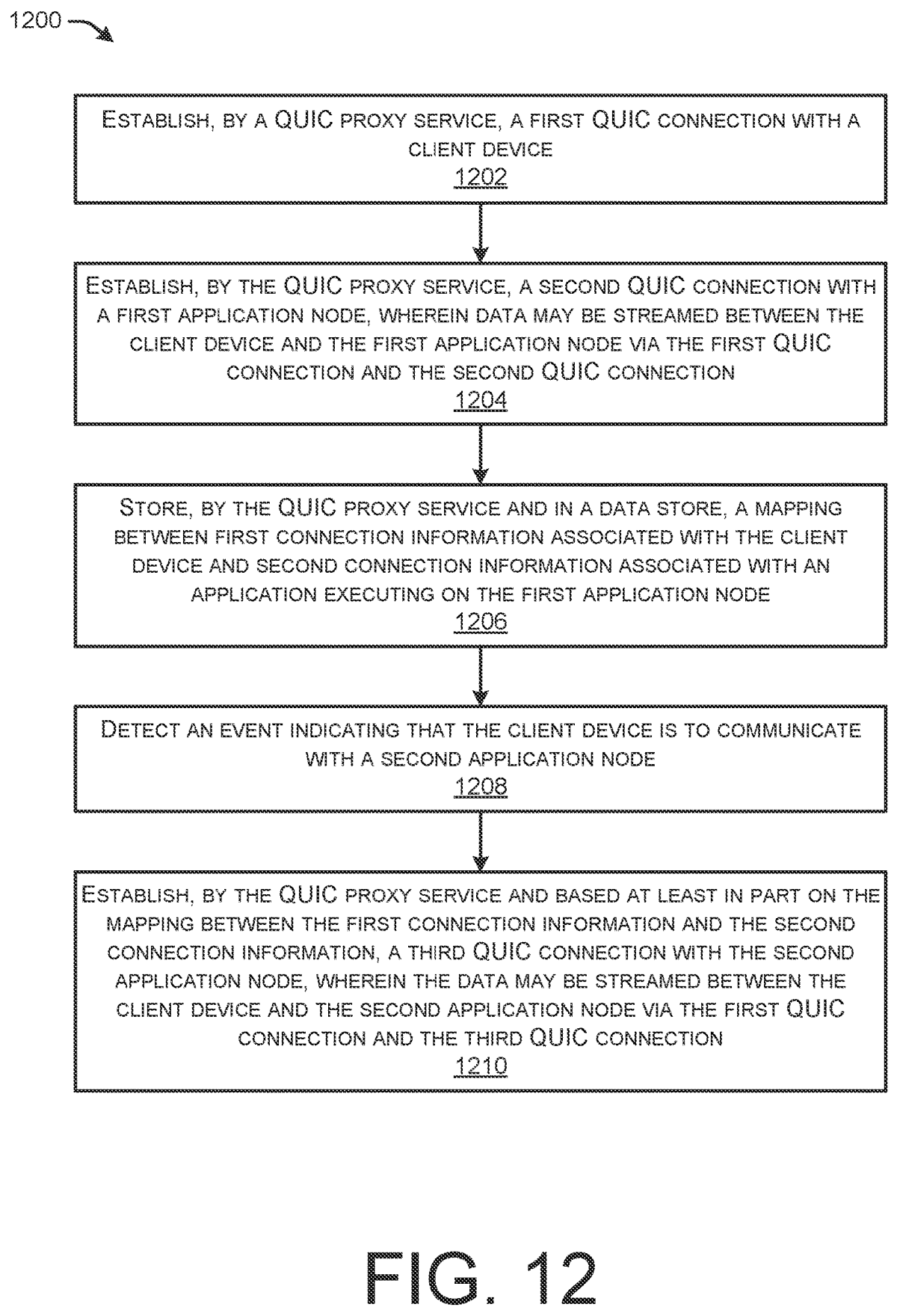

ESTABLISH, BY A QUIC PROXY SERVICE, A FIRST QUIC CONNECTION WITH A
CLIENT DEVICE
1202

ESTABLISH, BY THE QUIC PROXY SERVICE, A SECOND QUIC CONNECTION WITH
A FIRST APPLICATION NODE, WHEREIN DATA MAY BE STREAMED BETWEEN THE
CLIENT DEVICE AND THE FIRST APPLICATION NODE VIA THE FIRST QUIC
CONNECTION AND THE SECOND QUIC CONNECTION
1204

STORE, BY THE QUIC PROXY SERVICE AND IN A DATA STORE, A MAPPING
BETWEEN FIRST CONNECTION INFORMATION ASSOCIATED WITH THE CLIENT
DEVICE AND SECOND CONNECTION INFORMATION ASSOCIATED WITH AN
APPLICATION EXECUTING ON THE FIRST APPLICATION NODE
1206

DETECT AN EVENT INDICATING THAT THE CLIENT DEVICE IS TO COMMUNICATE
WITH A SECOND APPLICATION NODE
1208

ESTABLISH, BY THE QUIC PROXY SERVICE AND BASED AT LEAST IN PART ON THE
MAPPING BETWEEN THE FIRST CONNECTION INFORMATION AND THE SECOND
CONNECTION INFORMATION, A THIRD QUIC CONNECTION WITH THE SECOND
APPLICATION NODE, WHEREIN THE DATA MAY BE STREAMED BETWEEN THE
CLIENT DEVICE AND THE SECOND APPLICATION NODE VIA THE FIRST QUIC
CONNECTION AND THE THIRD QUIC CONNECTION
1210

Figure 13:
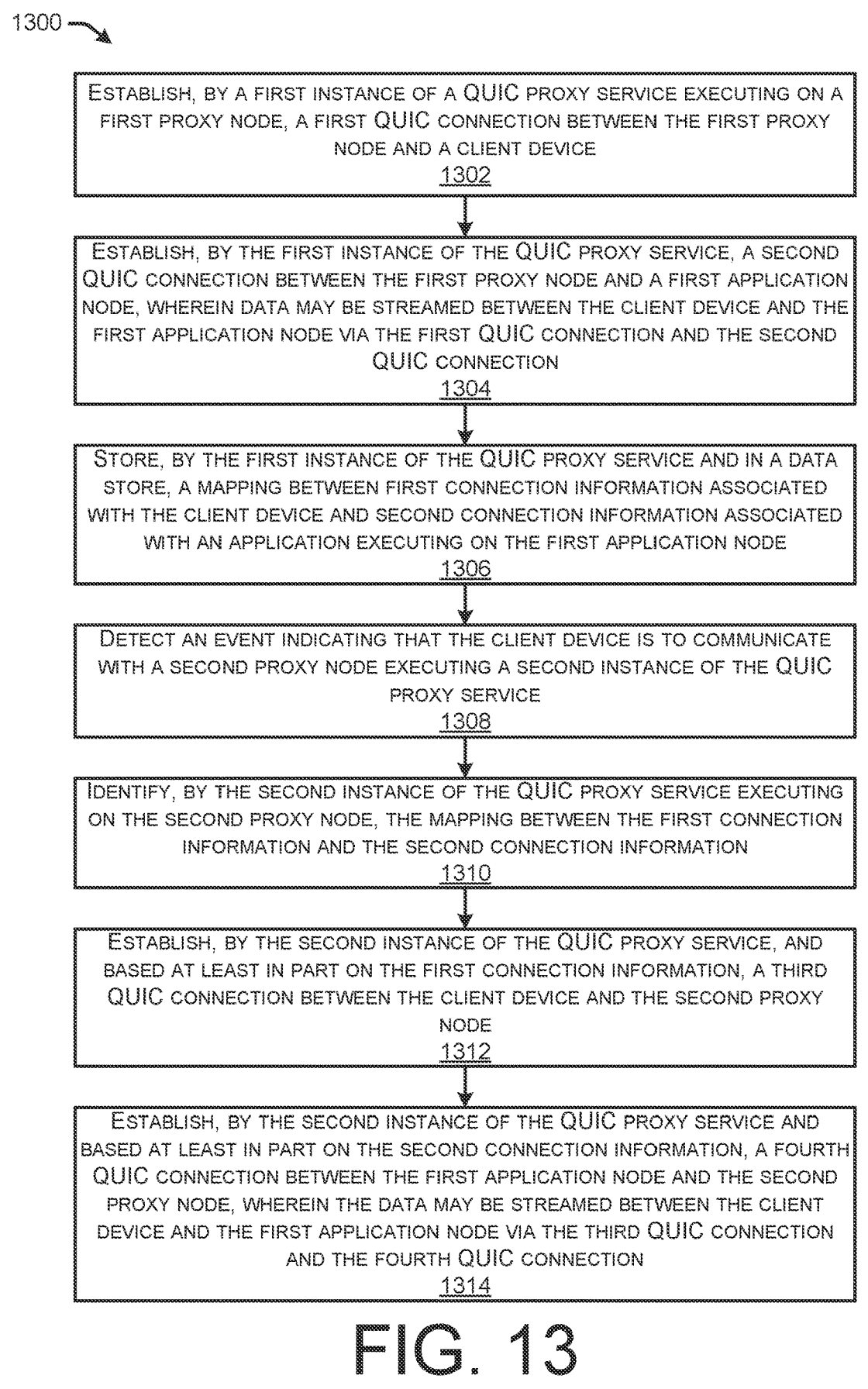

ESTABLISH, BY A FIRST INSTANCE OF A QUIC PROXY SERVICE EXECUTING ON A FIRST PROXY NODE, A FIRST QUIC CONNECTION BETWEEN THE FIRST PROXY NODE AND A CLIENT DEVICE
1302

ESTABLISH, BY THE FIRST INSTANCE OF THE QUIC PROXY SERVICE, A SECOND QUIC CONNECTION BETWEEN THE FIRST PROXY NODE AND A FIRST APPLICATION NODE, WHEREIN DATA MAY BE STREAMED BETWEEN THE CLIENT DEVICE AND THE FIRST APPLICATION NODE VIA THE FIRST QUIC CONNECTION AND THE SECOND QUIC CONNECTION
1304

STORE, BY THE FIRST INSTANCE OF THE QUIC PROXY SERVICE AND IN A DATA STORE, A MAPPING BETWEEN FIRST CONNECTION INFORMATION ASSOCIATED WITH THE CLIENT DEVICE AND SECOND CONNECTION INFORMATION ASSOCIATED WITH AN APPLICATION EXECUTING ON THE FIRST APPLICATION NODE
1306

DETECT AN EVENT INDICATING THAT THE CLIENT DEVICE IS TO COMMUNICATE WITH A SECOND PROXY NODE EXECUTING A SECOND INSTANCE OF THE QUIC PROXY SERVICE
1308

IDENTIFY, BY THE SECOND INSTANCE OF THE QUIC PROXY SERVICE EXECUTING ON THE SECOND PROXY NODE, THE MAPPING BETWEEN THE FIRST CONNECTION INFORMATION AND THE SECOND CONNECTION INFORMATION
1310

ESTABLISH, BY THE SECOND INSTANCE OF THE QUIC PROXY SERVICE, AND BASED AT LEAST IN PART ON THE FIRST CONNECTION INFORMATION, A THIRD QUIC CONNECTION BETWEEN THE CLIENT DEVICE AND THE SECOND PROXY NODE
1312

ESTABLISH, BY THE SECOND INSTANCE OF THE QUIC PROXY SERVICE AND BASED AT LEAST IN PART ON THE SECOND CONNECTION INFORMATION, A FOURTH QUIC CONNECTION BETWEEN THE FIRST APPLICATION NODE AND THE SECOND PROXY NODE, WHEREIN THE DATA MAY BE STREAMED BETWEEN THE CLIENT DEVICE AND THE FIRST APPLICATION NODE VIA THE THIRD QUIC CONNECTION AND THE FOURTH QUIC CONNECTION
1314

Figure 14:
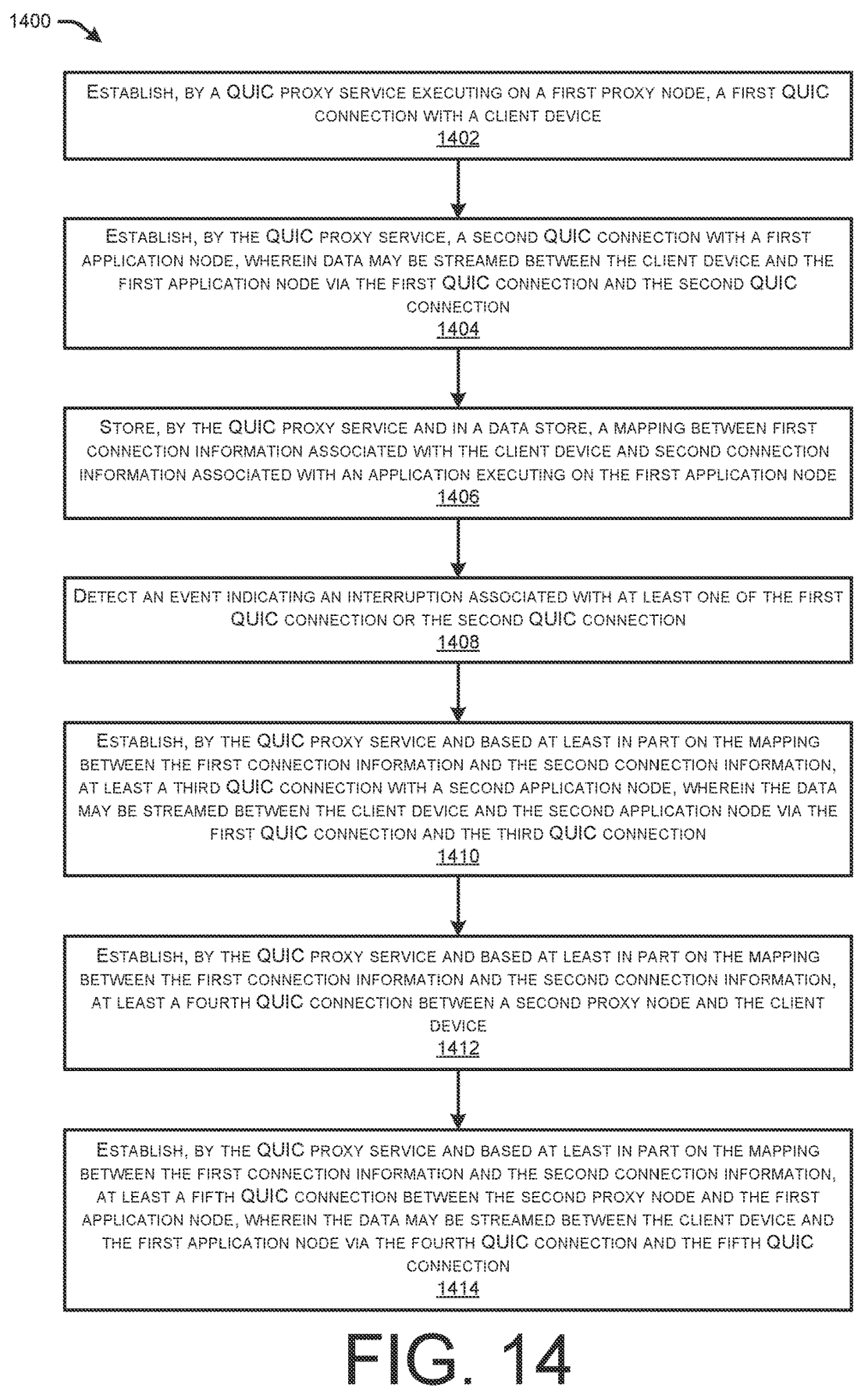

ESTABLISH, BY A QUIC PROXY SERVICE EXECUTING ON A FIRST PROXY NODE, A FIRST QUIC CONNECTION WITH A CLIENT DEVICE
1402

ESTABLISH, BY THE QUIC PROXY SERVICE, A SECOND QUIC CONNECTION WITH A FIRST APPLICATION NODE, WHEREIN DATA MAY BE STREAMED BETWEEN THE CLIENT DEVICE AND THE FIRST APPLICATION NODE VIA THE FIRST QUIC CONNECTION AND THE SECOND QUIC CONNECTION
1404

STORE, BY THE QUIC PROXY SERVICE AND IN A DATA STORE, A MAPPING BETWEEN FIRST CONNECTION INFORMATION ASSOCIATED WITH THE CLIENT DEVICE AND SECOND CONNECTION INFORMATION ASSOCIATED WITH AN APPLICATION EXECUTING ON THE FIRST APPLICATION NODE
1406

DETECT AN EVENT INDICATING AN INTERRUPTION ASSOCIATED WITH AT LEAST ONE OF THE FIRST QUIC CONNECTION OR THE SECOND QUIC CONNECTION
1408

ESTABLISH, BY THE QUIC PROXY SERVICE AND BASED AT LEAST IN PART ON THE MAPPING BETWEEN THE FIRST CONNECTION INFORMATION AND THE SECOND CONNECTION INFORMATION, AT LEAST A THIRD QUIC CONNECTION WITH A SECOND APPLICATION NODE, WHEREIN THE DATA MAY BE STREAMED BETWEEN THE CLIENT DEVICE AND THE SECOND APPLICATION NODE VIA THE FIRST QUIC CONNECTION AND THE THIRD QUIC CONNECTION
1410

ESTABLISH, BY THE QUIC PROXY SERVICE AND BASED AT LEAST IN PART ON THE MAPPING BETWEEN THE FIRST CONNECTION INFORMATION AND THE SECOND CONNECTION INFORMATION, AT LEAST A FOURTH QUIC CONNECTION BETWEEN A SECOND PROXY NODE AND THE CLIENT DEVICE
1412

ESTABLISH, BY THE QUIC PROXY SERVICE AND BASED AT LEAST IN PART ON THE MAPPING BETWEEN THE FIRST CONNECTION INFORMATION AND THE SECOND CONNECTION INFORMATION, AT LEAST A FIFTH QUIC CONNECTION BETWEEN THE SECOND PROXY NODE AND THE FIRST APPLICATION NODE, WHEREIN THE DATA MAY BE STREAMED BETWEEN THE CLIENT DEVICE AND THE FIRST APPLICATION NODE VIA THE FOURTH QUIC CONNECTION AND THE FIFTH QUIC CONNECTION
1414

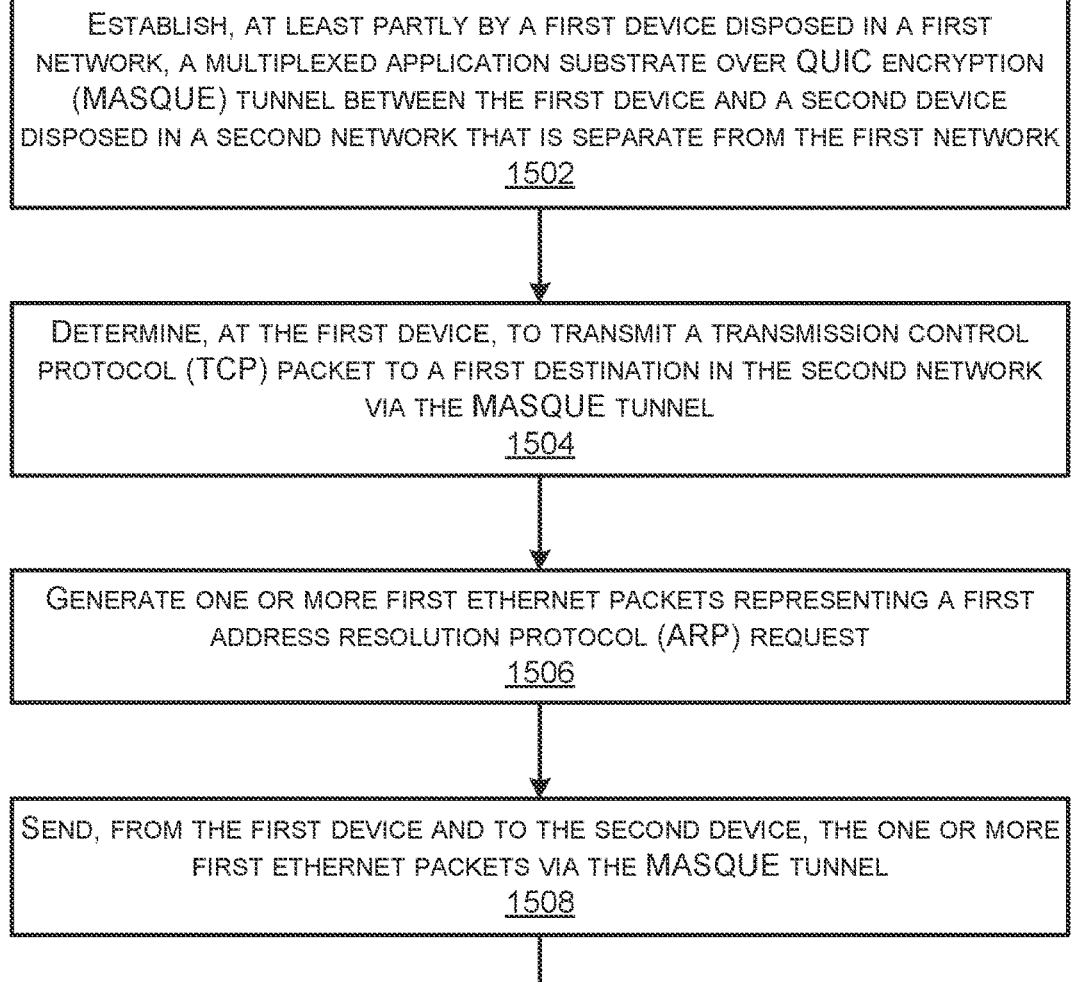

ESTABLISH, AT LEAST PARTLY BY A FIRST DEVICE DISPOSED IN A FIRST NETWORK, A MULTIPLEXED APPLICATION SUBSTRATE OVER QUIC ENCRYPTION (MASQUE) TUNNEL BETWEEN THE FIRST DEVICE AND A SECOND DEVICE DISPOSED IN A SECOND NETWORK THAT IS SEPARATE FROM THE FIRST NETWORK
1502

DETERMINE, AT THE FIRST DEVICE, TO TRANSMIT A TRANSMISSION CONTROL PROTOCOL (TCP) PACKET TO A FIRST DESTINATION IN THE SECOND NETWORK VIA THE MASQUE TUNNEL
1504

GENERATE ONE OR MORE FIRST ETHERNET PACKETS REPRESENTING A FIRST ADDRESS RESOLUTION PROTOCOL (ARP) REQUEST
1506

SEND, FROM THE FIRST DEVICE AND TO THE SECOND DEVICE, THE ONE OR MORE FIRST ETHERNET PACKETS VIA THE MASQUE TUNNEL
1508

RECEIVE, AT THE FIRST DEVICE AND FROM THE SECOND DEVICE, ONE OR MORE SECOND ETHERNET PACKETS VIA THE MASQUE TUNNEL, THE ONE OR MORE SECOND ETHERNET PACKETS REPRESENTING A FIRST ARP RESPONSE THAT INCLUDES A FIRST MEDIA ADDRESS CONTROL (MAC) ADDRESS ASSOCIATED WITH THE FIRST DESTINATION
1510

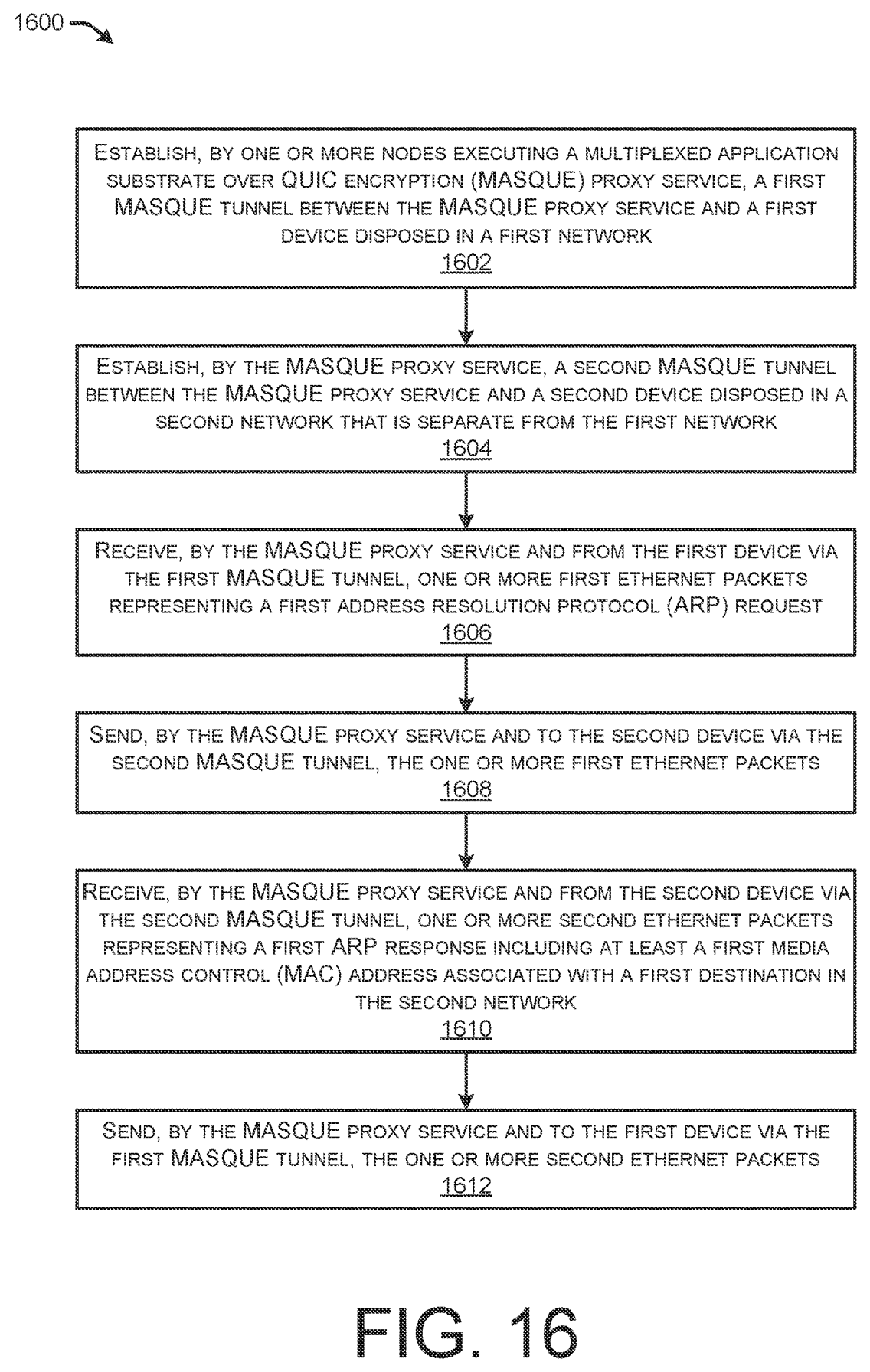

ESTABLISH, BY ONE OR MORE NODES EXECUTING A MULTIPLEXED APPLICATION
SUBSTRATE OVER QUIC ENCRYPTION (MASQUE) PROXY SERVICE, A FIRST
MASQUE TUNNEL BETWEEN THE MASQUE PROXY SERVICE AND A FIRST
DEVICE DISPOSED IN A FIRST NETWORK
1602

ESTABLISH, BY THE MASQUE PROXY SERVICE, A SECOND MASQUE TUNNEL
BETWEEN THE MASQUE PROXY SERVICE AND A SECOND DEVICE DISPOSED IN A
SECOND NETWORK THAT IS SEPARATE FROM THE FIRST NETWORK
1604

RECEIVE, BY THE MASQUE PROXY SERVICE AND FROM THE FIRST DEVICE VIA
THE FIRST MASQUE TUNNEL, ONE OR MORE FIRST ETHERNET PACKETS
REPRESENTING A FIRST ADDRESS RESOLUTION PROTOCOL (ARP) REQUEST
1606

SEND, BY THE MASQUE PROXY SERVICE AND TO THE SECOND DEVICE VIA THE
SECOND MASQUE TUNNEL, THE ONE OR MORE FIRST ETHERNET PACKETS
1608

RECEIVE, BY THE MASQUE PROXY SERVICE AND FROM THE SECOND DEVICE VIA
THE SECOND MASQUE TUNNEL, ONE OR MORE SECOND ETHERNET PACKETS
REPRESENTING A FIRST ARP RESPONSE INCLUDING AT LEAST A FIRST MEDIA
ADDRESS CONTROL (MAC) ADDRESS ASSOCIATED WITH A FIRST DESTINATION IN
THE SECOND NETWORK
1610

SEND, BY THE MASQUE PROXY SERVICE AND TO THE FIRST DEVICE VIA THE
FIRST MASQUE TUNNEL, THE ONE OR MORE SECOND ETHERNET PACKETS
1612

FIG. 16

USING MASQUE TO TUNNEL ETHERNET FRAMES

CROSS REFERENCE TO RELATED APPLICATIONS

This application claims priority to U.S. Provisional Patent Application No. 63/244,599, filed Sep. 15, 2021, U.S. Provisional Patent Application No. 63/271,437, filed Oct. 25, 2021, U.S. Provisional Patent Application No. 63/272,985, filed Oct. 28, 2021, U.S. Provisional Patent Application No. 63/273,306, filed Oct. 29, 2021, and U.S. patent application Ser. No. 17/719,921, filed Apr. 13, 2022, the entire contents of which are incorporated herein by reference.

TECHNICAL FIELD

The present disclosure relates generally to expressing network policies and establishing connection tunnels using QUIC and Multiplexed Application Substrate over QUIC Encryption (MASQUE) protocols to provide remote users with access to private application(s), handle connection migration(s), and enforce network flow policies.

BACKGROUND

Cloud-based service provider networks, often described as 'hyperscalers', offer cloud-based services to fulfill users' computing-service needs without the users having to invest in and maintain computing infrastructure required to implement the services. For example, cloud service providers may operate networks of data centers housing significant numbers of interconnected computing systems, such as public data centers, that are configured by the service provider to provide cloud-based services to users (or "customers"). These service provider networks may provide network-based computing resources on an as-needed basis. For example, a service provider network may permit users to purchase and utilize computing resources such as virtual machine ("VM") instances, compute resources, data storage resources, database resources, networking resources, network services, and other types of computing resources. Users may configure the computing resources provided by a service provider network to implement desired functionality, such as to provide a network-based application or another type of functionality to an enterprise of users. While hyperscaler-based datacenters are growing in popularity, traditional enterprise-managed datacenters are still widely used. The combination of these deployments is usually described as 'hybrid' datacenters. Generally, remote users are able to connect to these network-based applications and/or enterprise functionalities using virtual private network (VPN) or proxy-based solutions.

While there may be additional methods for remote users to connect to private enterprise applications, traditionally, VPN tunneling and reverse proxy technologies are among the most common. However, both approaches come with limitations. While VPN tunneling can work with any application and protocol, can open up a large attack surface within the network. Additionally, while proxy-based solutions allow for better edge controls, which results in a smaller attack surface, they generally don't work well with protocols that are not transmission control protocol (TCP)-based, and require additional solutions to convert from a non-TCP protocol to a TCP protocol or to encapsulate the non-TCP protocol in TCP, which may impact performance of the proxies themselves, among other things.

Further, proxy nodes executing proxy solutions serve as a middle box into a connection (e.g., a TCP or UDP connection) and allow clients to connect to a public internet protocol (IP) address while the backend processing may be performed on nodes not connected to public IP addresses. Proxies typically achieve this by taking incoming connections, terminating them, and opening new connections on the backend. While these proxying techniques are traditionally performed on the TCP and (user datagram protocol) UDP protocols, these same proxying techniques may be performed on the QUIC protocol. However, since the QUIC protocol utilizes UDP as the underlying transport, it may be difficult to handle failover or replacement of a QUIC proxy node and provide the seamless user experience provided by TCP or UDP proxies. Moreover, the QUIC protocol was designed to not interoperate with version unaware middle boxes. Additionally, QUIC can migrate sessions in a manner in which only the endpoint and the QUIC server may be aware of such a change. However, it would be desirable for middleboxes to process QUIC streams differently from one another in a reliable and predictable manner.

Additionally, the Multiplexed Application Substrate over QUIC Encryption (MASQUE) protocol provides a mechanism for proxying different types of protocols (e.g., HTTP proxying, DNS over HTTPS, QUIC proxying, UDP proxying, and IP proxying) using a single proxy solution. However, the MASQUE protocol does not provide a mechanism for proxying L2 ethernet packets over a MASQUE tunnel, such as, the tunneling protocol Ethernet over IP (EoIP).

Thus, the solutions at hand tend to have a number of drawbacks, and it may be difficult to express network policies and establish secure connection tunnels to provide remote users with access to private application(s) and enforce network flow policies.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 8A illustrates an example QUIC long header.

FIG. 8B illustrates an example QUIC short header.

FIG. 9 illustrates a flow diagram of an example method for one or more nodes executing a MASQUE proxy service to establish a connection with an application node on behalf of a client device to transmit a data stream between the client device and the application node.

FIG. 10 illustrates a flow diagram of an example method for providing enforcement nodes of a metadata-aware network with access to metadata indicating a policy to enforce on a QUIC connection between a client device and an application node.

FIG. 11 illustrates a flow diagram of another example method for providing enforcement nodes of a metadata-aware network with access to metadata indicating a policy to enforce on a QUIC connection between a client device and an application node.

FIG. 12 illustrates a flow diagram of an example method for a QUIC proxy service to handle one or more QUIC connection migrations across QUIC proxy nodes, data centers, and/or application nodes.

FIG. 13 illustrates a flow diagram of another example method for a QUIC proxy service to handle one or more QUIC connection migrations across QUIC proxy nodes, data centers, and/or application nodes.

FIG. 14 illustrates a flow diagram of another example method for a QUIC proxy service to handle one or more QUIC connection migrations across QUIC proxy nodes, data centers, and/or application nodes.

FIG. 15 illustrates a flow diagram of an example method for establishing an EoMASQUE tunnel configured to tunnel one or more Layer 2 ethernet frames from a first device in a first network to a second device in a second network.

FIG. 16 illustrates a flow diagram of another example method for establishing an EoMASQUE tunnel configured to tunnel one or more Layer 2 ethernet frames from a first device in a first network to a second device in a second network.

DESCRIPTION OF EXAMPLE EMBODIMENTS

Overview

Figure 1A:
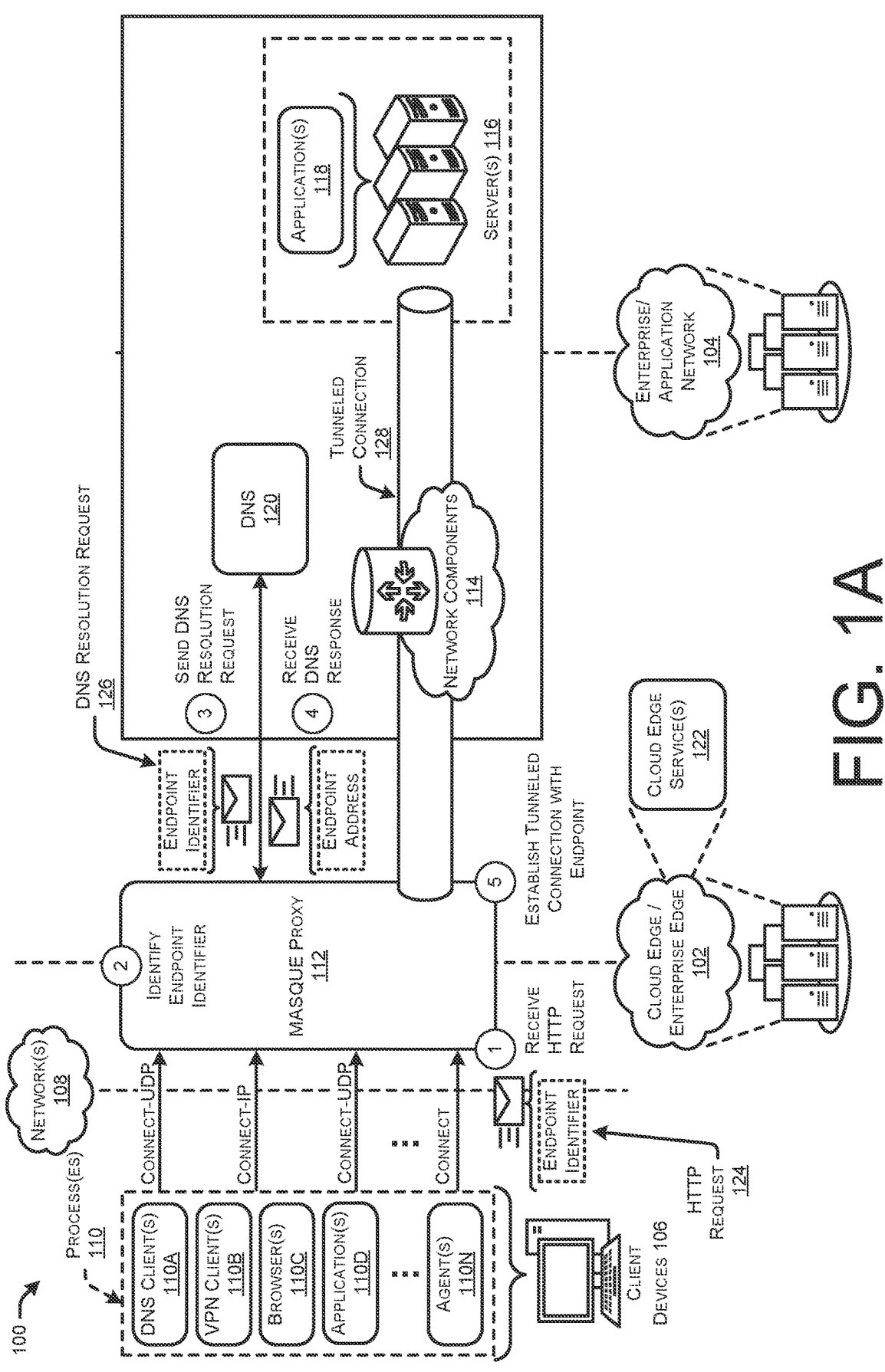
FIG. 1A illustrates a system-architecture diagram of an example environment for a MASQUE proxy service to establish a connection between an application node and one or more nodes executing the MASQUE proxy service that is configured to transmit a data stream between a client device and the application node.

This disclosure describes methods for using and extending the QUIC and MASQUE protocols to provide remote users with full application access to private enterprise/application resources and tunnel Layer 2 (L2) ethernet frames via MASQUE tunnel(s) while handling QUIC connection migrations and enforcing network policies on middleboxes of a network fabric without decrypting and/or proxying a QUIC connection. The method includes receiving, at one or more nodes executing a multiplexed application substrate over QUIC encryption (MASQUE) proxy service and from a client device, a hypertext transfer protocol (HTTP) request. Additionally, or alternatively, the method includes identifying, by the MASQUE proxy service, an endpoint identifier in a header field of the HTTP request. Additionally, or alternatively, the method includes sending, by the MASQUE proxy service and to a domain name service (DNS) server, a DNS resolution request including the endpoint identifier. Additionally, or alternatively, the method includes receiving, by the MASQUE proxy service and from the DNS server, an address associated with an application node associated with an enterprise network that is remote from the client device. Additionally, or alternatively, the method includes establishing, at least partly by the MASQUE proxy service, a tunneled connection between the one or more nodes and the application node, wherein the tunneled connection is configured to transmit a data stream between the client device and the application node.

Additionally, or alternatively, the method includes receiving, at one or more nodes associated with a QUIC, a first QUIC packet, the first QUIC packet indicating a request by a client device to establish a QUIC connection with an application node. Additionally, or alternatively, the method includes identifying, based at least in part on a first identifier in a source connection identifier (SCID) field of the first QUIC packet, a policy associated with at least one of the client device or the application node. Additionally, or alternatively, the method includes determining, based at least in part on the policy, metadata indicating the policy to enforce on the QUIC connection. Additionally, or alternatively, the method includes providing access to the metadata to enforcement nodes of a metadata-aware network connecting the one or more nodes and the application node.

Additionally, or alternatively, the method includes receiving, at an application node associated with a QUIC server, a first QUIC packet, the first QUIC packet indicating a request by a client device to establish a QUIC connection with the application node. Additionally, or alternatively, the method includes identifying, based at least in part on a first identifier in a destination connection identifier (DCID) field of the first QUIC packet, a policy associated with at least one of the client device or the application node. Additionally, or alternatively, the method includes determining, based at least in part on the policy, metadata indicating the policy to enforce on the QUIC connection. Additionally, or alternatively, the method includes providing access to the metadata to enforcement nodes of a metadata-aware network.

Additionally, or alternatively, the method includes establishing, by a QUIC proxy service, a first QUIC connection with a client device. Additionally, or alternatively, the method includes establishing, by the QUIC proxy service, a second QUIC connection with a first application node, wherein data may be streamed between the client device and the first application node via the first QUIC connection and the second QUIC connection. Additionally, or alternatively, the method includes storing, by the QUIC proxy service and in a data store, a mapping between first connection information associated with the client device and second connection information associated with an application executing on the first application node. Additionally, or alternatively, the method includes detecting an event indicating that the client device is to communicate with a second application node. Additionally, or alternatively, the method includes establishing, by the QUIC proxy service and based at least in part on the mapping between the first connection information and the second connection information, a third QUIC connection with the second application node, wherein the data may be streamed between the client device and the second application node via the first QUIC connection and the third QUIC connection.

Additionally, or alternatively, the method includes establishing, by a first instance of a QUIC proxy service executing on a first proxy node, a first QUIC connection between the first proxy node and a client device. Additionally, or alternatively, the method includes establishing, by the first instance of the QUIC proxy service, a second QUIC connection between the first proxy node and a first application node, wherein data may be streamed between the client device and the first application node via the first QUIC connection and the second QUIC connection. Additionally, or alternatively, the method includes storing, by the first instance of the QUIC proxy service and in a data store, a mapping between first connection information associated with the client device and second connection information associated with an application executing on the first application node. Additionally, or alternatively, the method includes detecting an event indicating that the client device is to communicate with a second proxy node executing a second instance of the QUIC proxy service. Additionally, or alternatively, the method includes identifying, by the second instance of the QUIC proxy service executing on the second proxy node, the mapping between the first connection information and the second connection information. Additionally, or alternatively, the method includes establishing, by the second instance of the QUIC proxy service, and based at least in part on the first connection information, a third QUIC connection between the client device and the second proxy node. Additionally, or alternatively, the method includes establishing, by the second instance of the QUIC proxy service and based at least in part on the second connection information, a fourth QUIC connection between the first application node and the second proxy node, wherein the data may be streamed between the client device and the first application node via the third QUIC connection and the fourth QUIC connection.

Additionally, or alternatively, the method includes establishing, by a QUIC proxy service executing on a first proxy node, a first QUIC connection with a client device. Additionally, or alternatively, the method includes establishing, by the QUIC proxy service, a second QUIC connection with a first application node, wherein data may be streamed between the client device and the first application node via the first QUIC connection and the second QUIC connection. Additionally, or alternatively, the method includes storing, by the QUIC proxy service and in a data store, a mapping between first connection information associated with the client device and second connection information associated with an application executing on the first application node. Additionally, or alternatively, the method includes detecting an event indicating an interruption associated with at least one of the first QUIC connection or the second QUIC connection. Additionally, or alternatively, the method includes establishing, by the QUIC proxy service and based at least in part on the mapping between the first connection information and the second connection information, a third QUIC connection with a second application node, wherein the data may be streamed between the client device and the second application node via the first QUIC connection and the third QUIC connection. Additionally, or alternatively, the method includes establishing, by the QUIC proxy service and based at least in part on the mapping between the first connection information and the second connection information, a fourth QUIC connection between a second proxy node and the client device. Additionally, or alternatively, the method includes establishing, by the QUIC proxy service and based at least in part on the mapping between the first connection information and the second connection information, a fifth QUIC connection between the second proxy node and the first application node, wherein the data may be streamed between the client device and the first application node via the fourth QUIC connection and the fifth QUIC connection.

Additionally, or alternatively, the method includes establishing, at least partly by a first device disposed in a first network, a multiplexed application substrate over QUIC encryption (MASQUE) tunnel between the first device and a second device disposed in a second network that is separate from the first network. Additionally, or alternatively, the method includes determining, at the first device, to transmit a transmission control protocol (TCP) packet to a first destination in the second network via the MASQUE tunnel. Additionally, or alternatively, the method includes generating one or more first ethernet packets representing a first address resolution protocol (ARP/NDP) request. Additionally, or alternatively, the method includes sending, from the first device and to the second device, the one or more first ethernet packets via the MASQUE tunnel. Additionally, or alternatively, the method includes receiving, at the first device and from the second device, one or more second ethernet packets via the MASQUE tunnel, the one or more second ethernet packets representing a first ARP/NDP response that includes a first media address control (MAC) address associated with the first destination.

Additionally, or alternatively, the method includes establishing, by one or more nodes executing a multiplexed application substrate over QUIC user datagram protocol (UDP) internet connections (QUIC) encryption (MASQUE) proxy service, a first MASQUE tunnel between the MASQUE proxy service and a first device disposed in a first network. Additionally, or alternatively, the method includes establishing, by the MASQUE proxy service, a second MASQUE tunnel between the MASQUE proxy service and a second device disposed in a second network that is separate from the first network. Additionally, or alternatively, the method includes receiving, by the MASQUE proxy service and from the first device via the first MASQUE tunnel, one or more first ethernet packets representing a first address resolution protocol (ARP/NDP) request. Additionally, or alternatively, the method includes sending, by the MASQUE proxy service and to the second device via the second MASQUE tunnel, the one or more first ethernet packets. Additionally, or alternatively, the method includes receiving, by the MASQUE proxy service and from the second device via the second MASQUE tunnel, one or more second ethernet packets representing a first ARP/NDP response including at least a first media address control (MAC) address associated with a first destination in the second network. Additionally, or alternatively, the method includes sending, by the MASQUE proxy service and to the first device via the first MASQUE tunnel, the one or more second ethernet packets.

Additionally, the techniques described herein may be performed by a system and/or device having non-transitory computer-readable media storing computer-executable instructions that, when executed by one or more processors, performs the method described above.

Example Embodiments

Various networking protocols may be employed to connect remote users to private enterprise/application resources. For instance, common techniques for establishing such remote connections may include VPN tunneling or reverse proxy technologies. VPN tunneling provides the flexibility to work with any application and protocol, while proxy-based solutions allow for superior edge controls. However, both approaches have drawbacks, where VPN tunneling may open an enterprise network up to a larger attack surface than proxy-based solutions, but proxy-based solutions require additional configurations to convert from a non-TCP protocol to a TCP protocol or encapsulating that protocol in TCP, impacting proxy performance directly. Additionally, proxy nodes serve as a middle box into a connection, allowing clients to connect to a public IP address while backend processing is performed on nodes that are not connected to public IP addresses (e.g., a private enterprise/application resource) by taking incoming connections, terminating such connections, and opening new connections on the backend. These proxying techniques may be performed on TCP, UDP, and QUIC protocols. However, the QUIC protocol utilizes UDP as its underlying transport, making it difficult to handle failover or replacement of a proxy node while providing a seamless user experience that TCP or UDP proxies provide. Additionally, in scenarios where a session migration occurs, only the endpoint and an associated QUIC server may be aware of such a change. While QUIC was designed to not interoperate with version unaware middle boxes, it would be desirable for middle-boxes to process QUIC streams differently from one another in a reliable and predictable manner.

In order to combine the advantages of VPN and proxy-based solutions, it may be useful to utilize the MASQUE protocol. The MASQUE protocol includes a family of protocol capabilities that allows for proxying of any protocol over Hypertext Transfer Protocol (HTTP). Particularly, MASQUE has 5 defined protocols that may be proxied, including HTTP proxying, DNS over HTTPS, QUIC proxying, UDP proxying, and IP proxying, and offers new CONNECT methods to HTTP, including CONNECT-UDP and CONNECT-IP, for example. However, the MASQUE protocol does not provide a mechanism for proxying ethernet packets (e.g., L2 ethernet frames) over a MASQUE tunnel.

As such, it would be beneficial to utilize protocol capabilities provided by the MASQUE protocol with the option to proxy ethernet packets in a manner similar that offered by EoIP.

This disclosure describes methods for using and extending the QUIC and MASQUE protocols to provide remote users with full application access to private enterprise/application resources and tunnel Layer 2 ethernet frames via MASQUE tunnel(s) while handling QUIC connection migrations and enforcing network policies on middleboxes of a network fabric without decrypting and/or proxying a QUIC connection. In some examples, one or more network nodes may be configured to execute a MASQUE proxy service to provide a remote client device with full access to an enterprise/private application resource executing on an application node and hosted in an enterprise/application network, behind the MASQUE proxy service. In some examples, the MASQUE proxy service may execute on a single proxy node hosted at an edge of a cloud network or at an edge of an enterprise/application network. Additionally, or alternatively, a first instance of the MASQUE proxy service may execute on a first proxy node hosted at an edge of a cloud network (e.g., an ingress proxy node) and a second instance of the MASQUE proxy service may execute on a second proxy node hosted at an edge of the enterprise/application network. Additionally or alternatively, one or more enforcement nodes of a metadata-aware network may be configured to utilize metadata encoded into a connection ID of a QUIC header and apply one or more policies to a QUIC connection session between a remote client device and a private enterprise/application resource executing on an application node hosted in an enterprise/application network. In some examples, the metadata-aware network may include a connection data store configured to store mappings between connection IDs associated with a QUIC connection session and/or a policy engine for generating metadata indicating the one or more policies. In some examples, the QUIC connection sessions may be established using one or more proxy nodes executing one or more instances of a QUIC proxy service. Additionally, or alternatively, the MASQUE proxy instance(s) and/or the QUIC proxy instance(s) may be configured to access a global key/value data store configured to store mappings between one or more QUIC connection sessions. Additionally, or alternatively, one or more Ethernet over MASQUE (EoMASQUE) tunnels may be configured to tunnel L2 ethernet frames and may be established between separate network devices hosted in separate network sites, such as, for example, a remote client router, an enterprise router, and/or an EoMASQUE proxy node.

A client device may transmit a request to establish a connection with an private enterprise/application resource hosted in a private enterprise/application network. In some example, the client device may run various software programs that can transmit the request using various protocols. For instance, the client devices may be running applications, software agents, web browsers, VPN clients, DNS clients, and the like, that can communicate data using encrypted data flows using various protocols. In some examples, the request may be transmitted using any of the protocols that may be proxied via the MASQUE protocol (e.g., CONNECT-UDP, CONNECT-IP, QUIC or HTTP/3 as HTTP over UDP, DNS over HTTPS, or any other CONNECT method offered by the MASQUE protocol) and/or an Ethernet CONNECT method, as described in more detail below.

A QUIC connection session may be configured to transmit data in a first flow direction from the client device to the private application resource and/or in a second flow direction from the private application resource to the client device. In establishing the QUIC connection session, the desired endpoints of the connection (e.g., the client device and the private application resource) may perform an initial handshake by sending respective QUIC packets having a long header including at least a source connection ID (SCID) and a destination connection ID (DCID). Once the QUIC connection has been established, subsequent communications over the QUIC connection session may be transmitted using QUIC packets having a short header including only a DCID. In some examples, an initial QUIC packet, including the long header, sent from the client device may include an SCID generated by the client device, and a DCID associated with the private application resource and assigned by a QUIC server managing the QUIC session associated with the private application resource. Additionally, or alternatively, an initial QUIC packet, including the long header, sent from the private application resource may include an SCID assigned by the QUIC server managing the QUIC session associated with the private application resource, and a DCID including the connection ID included in the SCID field of the initial QUIC packet received from the client device. That is, the DCID included in the QUIC packets being transmitted in the first flow direction of the QUIC session (e.g., from the client and to the private application resource) correspond to the SCID of the QUIC packets being transmitted in the second flow direction of the QUIC session (e.g., from the private application resource and to the client device). Additionally, or alternatively, the SCID included in the QUIC packets being transmitted in the first flow direction of the QUIC session may correspond to the DCID of the QUIC packets being transmitted in the second flow direction of the QUIC session.

Take, for example, an environment including one or more networks. In some examples, the networks may include a remote client network, a private enterprise/application network, and/or a cloud network. In some examples, the remote client network may include one or more client device(s), such as, a client device (e.g., a desktop, laptop, or a mobile device) and/or a client router for connecting the client device to the additional networks, such as, the cloud network and/or the private enterprise/application network. In some examples, the private enterprise/application network may include one or more network components, a domain name service (DNS) server, one or more servers executing a private application resource, and/or a MASQUE proxy node executing a MASQUE proxy service. In some examples, the cloud network may include one or more network nodes for establishing a connection session, one or more cloud edge services, such as, for example, one or more secure access service edge (SASE) services, and/or a MASQUE proxy node executing a MASQUE proxy service. In some examples, the client device may transmit a request to establish a connection with the private application resource as an HTTP request including an endpoint identifier associated with the private enterprise/application resource hosted in the private enterprise/application network.

In some examples, the environment may include a single MASQUE proxy service executing on a proxy node hosted at the edge of the cloud network and/or at the edge of the private enterprise/application network. The MASQUE proxy service may receive the HTTP request from the client device and begin a proxy workflow. In some examples, the proxy workflow may include identifying the endpoint identifier in a header field of the HTTP request and sending a DNS resolution request using the endpoint identifier to the DNS server. The MASQUE proxy service may then receive an endpoint address (e.g., an IP address) associated with the private enterprise/application resource, and establish a tunneled connection between the MASQUE proxy service and the private enterprise/application resource using one or more cloud nodes and/or the network components of the private enterprise/application network. In some examples, the tunneled connection may be configured to transmit a data stream between the client device and the application node.

Additionally, or alternatively, the environment may include multiple instances of the MASQUE proxy service executing on multiple proxy nodes, such as, for example, a first instance of the MASQUE proxy service executing on a first proxy node and a second instance of the MASQUE proxy service executing on a second proxy node. In some examples, the first proxy node may be hosted at an edge of the cloud network and configured as an ingress proxy node, and the second proxy node may be hosted at an edge of the private enterprise/application network and configured as an egress proxy node. In some examples, the HTTP request from the client device may be received at the first proxy node and transmitted to the second proxy node via a first tunneled connection established between the first proxy node and the second proxy node. The first tunneled connection may be configured such that all of the traffic moving from the cloud network(s) to the private enterprise/application network(s) may be tunneled in this single connection, fully privatizing the traffic from the cloud. This may be achieved by encrypting any HTTP HOST HEADER field using various encryption methods, such as, for example, hybrid public key encryption (HPKE) or the like. Additionally, or alternatively, the second proxy node may be configured to apply one or more enterprise configured security services to the first tunneled connection, such as, for example, an enterprise firewall service, or the like. As such, the first tunneled connection may be established by the second proxy node, enabling the second proxy node to operate seamlessly behind the enterprise security services. Once the second proxy node receives the HTTP request, a proxy workflow that is similar to the workflow described above with respect to the single proxy node may begin. For example, the proxy workflow may include the second instance of the MASQUE proxy service identifying the endpoint identifier in a header field of the HTTP request and sending a DNS resolution request using the endpoint identifier to the DNS server. The MASQUE proxy service may then receive an endpoint address (e.g., an IP address) associated with the private enterprise/application resource, and establish a second tunneled connection between the second instance of the MASQUE proxy service executing on the second proxy node and the private enterprise/application resource using the network components of the private enterprise/application network. In some examples, the first tunneled connection and the second tunneled connection may be configured to transmit a data stream between the client device and the application node.

As previously described, the MASQUE protocol may be extended to tunnel L2 ethernet frames according to the techniques described herein. Currently, various protocols may be proxied via the MASQUE mechanism, such as, for example, http_proxying (assigned value 0x00), dns_over_https (assigned value 0x01), quic_proxying (assigned value 0x02), udp_proxying (assigned value 0x03), and ip_proxying (assigned value 0x04). In some examples, a new entity configured to allow for proxying of ethernet frames using a MASQUE proxy connection (e.g., an EoMASQUE tunnel) may be added to the MASQUE protocol along with a corresponding CONNECT method, CON-NECT-ETH. The new entity and CONNECT method may be configured similar to CONNECT-IP, however, instead of raw Layer-3 (L3) IP packets being proxied over MASQUE, the new entity may allow for raw L2 ethernet frames to be proxied over MASQUE using the new CONNECT-ETH method and a corresponding entity value (e.g., eth_proxying assigned the next available value in the protocol, such as, 0x05). EoMASQUE may be configured to utilize HTTP/3, a UDP-based protocol, and may utilize the QUIC protocol as a transport. In some examples, an EoMASQUE tunnel may be configured to be established between various networks. For example, an EoMASQUE tunnel may be configured to connect a first client router provisioned in a first remote client premise to a second client router provisioned in a second remote client premise. Additionally, or alternatively, an EoMASQUE tunnel may be configured to connect a client router provisioned in a remote client premise to an enterprise router provisioned in an enterprise premise. Addi-tionally, or alternatively, an EoMASQUE tunnel may be configured to connect a client router provisioned in a remote client premise and/or an enterprise router provisioned in an enterprise premise to an EoMASQUE proxy node provi-sioned in one or more data center(s) and/or connected to additional client routers provisioned in additional remote client premise(s) via additional EoMASQUE tunnel(s).

As described above, one or more enforcement nodes of a metadata-aware network may be configured to utilize meta-data encoded into a connection ID of a QUIC header and apply one or more policies to a QUIC connection session between a remote client device and a private enterprise/application resource executing on an application node hosted in an enterprise/application network. In some examples, the metadata-aware network may be associated with a policy engine configured to generate metadata indi-cating the one or more policies and/or encoding the metadata as a connection ID and/or a connection data store configured to store mappings between connection IDs associated with a QUIC connection session (e.g., a mapping between an SCID and a DCID in each flow direction of a QUIC connection session).

The metadata may be encoded into the SCID field of an initial QUIC packet including a long header. In some examples, the metadata may be encoded into the SCID field of packets traveling in the first flow direction by a QUIC edge proxy node executing an instance of a QUIC proxy service and in communication with the policy engine, for example. Additionally, or alternatively, the metadata may be encoded into the SCID field of packets traveling in the second flow direction by a QUIC workload proxy node executing an instance of the QUIC proxy service and in communication with the policy engine or by an enterprise/private application resource configured with a metadata component and in communication with the policy engine, for example. Additionally, or alternatively, the metadata may be encoded into the SCID field of packets traveling in both the first flow direction the second flow direction using a combination of the components described above. Since subsequent QUIC packets include a short header, only the DCID may be included in the subsequent packets transmit-ted over the QUIC connection session. As such, the enforce-ment nodes may be configured to access the metadata in various ways. In examples where the metadata is encoded in the SCID field of packets traveling in the first flow direction and not encoded in the SCID field of packets traveling in the second flow direction, subsequent packets traveling in the first flow direction may not carry the metadata encoded in the SCID and instead may only include the DCID in the short header, and thus the enforcement nodes may be con-figured to perform a lookup in the connection data store using the DCID to determine the corresponding SCID with the encoded metadata and apply the policy (or policies) to the QUIC connection in the first flow direction. However, in such an example, subsequent packets traveling in the second flow direction may carry the metadata encoded as the DCID, and thus the enforcement nodes may access the metadata without performing a lookup in the data store and may apply the policy (or policies) to the QUIC connection at wire speed in the second flow direction. In examples where the meta-data is encoded into the SCID field of packets traveling in both the first flow direction and the second flow direction, subsequent packets traveling in both the first flow direction and the second flow direction may carry the metadata encoded as the DCID, and thus enforcement nodes may access the metadata without performing a lookup in the data store and may apply the policy (or policies) to the QUIC connection at wire speed in both the first flow direction and the second flow direction.

The metadata representing one or more policies may be encoded into a first portion of a QUIC connection ID of a QUIC packet header, and a second portion of the QUIC connection ID may be reserved to represent a unique iden-tifier within the network. In some examples, the first portion of the QUIC connection ID may be encoded with the metadata in an encrypted format or an unencrypted format. Additionally, or alternatively, the second portion of the QUIC connection ID may be encoded with the unique identifier in an encrypted format or an unencrypted format, and the unique identifier may be configured as a specific identifier or a randomized identifier. In some examples, the metadata encoded into the first portion of the QUIC con-nection ID may include a priority field associated with the QUIC connection, a micro-segmentation field associated with the QUIC connection, a secure group tagging (SGT) field associated with the QUIC connection, a network ser-vice header (NSH) field associated with the QUIC connec-tion, a virtual local area network (VLAN) identifier field associated with the QUIC connection, a data loss prevention (DLP) field associated with the QUIC connection, an intru-sion detection system (IDS) field associated with the QUIC connection, and/or one or more user defined policy fields associated with the QUIC connection. Additionally, or alter-natively, the metadata encoded into the first portion of the QUIC connection ID may include a field configured for fixed well-known industry standard fields (e.g., priority, micro-segmentation, etc.) and/or a field for enterprise-de-fined fields (e.g., varying from one enterprise to another).

Take, for example, an environment including one or more networks. In some examples, the networks may include a remote client network, a metadata-aware network, and/or a private application network. In some examples, the remote client network may include one or more client device(s), such as, a client device (e.g., a desktop, laptop, or a mobile device) and/or a client router for connecting the client device to the additional networks, such as, the cloud network and/or the private enterprise/application network. In some examples, the metadata-aware network may include one or more network device(s) configured as enforcement node(s), a connection data store, and/or a policy engine. The con-nection data store may be accessible by the policy engine, the enforcement nodes included in the metadata aware network, the private application resource, and/or one or more proxy nodes executing a QUIC proxy service.

In some examples, the private application resource may be configured as a cooperative application and may include a metadata component configured to communicate with the policy engine and establish a QUIC connection session having a connection ID encoded with metadata expressing a policy to enforce on the connection flows. For example, a QUIC server associated with the private application resource may receive a first initial QUIC packet from the client device and may encode a DCID field of a second initial QUIC packet to send to the client device with the connection ID encoded in the SCID field received from the client device. Additionally, or alternatively, the QUIC server may communicate with the policy engine to determine one or more network policies to apply to the QUIC connection session based on information associated with the client device, information a client account associated with the client device (e.g., an enterprise and/or application specific account), information associated with the private enterprise/application resource, and/or the like. Once the network policies to be applied to the QUIC connection have been determined, the policy engine may then encode metadata representing the desired policies into a connection ID and return the connection ID to the QUIC server and/or the metadata component, where the connection ID including the encoded metadata may be encoded as the SCID of the second initial QUIC packet. Additionally, or alternatively, the policy engine may store a mapping between the connection ID generated by the client device (e.g., the DCID from the perspective of the application resource) and the connection ID generated by the QUIC server (e.g., the SCID from the perspective of the application resource), thus allowing for the enforcement nodes to access the SCID associated with QUIC packets traveling in either flow direction using the DCID encoded into the short header of the QUIC packet.

Since the metadata is encoded into the SCID field of packets traveling in the second flow direction, subsequent QUIC packets that use the short header and are traveling in the second direction may not include the encoded metadata. Alternatively, QUIC packets traveling in the first flow direction will include the SCID generated by the QUIC server as the DCID, thus the encoded metadata may be included in the short header used in the transmission of subsequent packets in the first flow direction. Given that the subsequent packets have the short header including the DCID, the metadata may be instantly accessible by the enforcement nodes of the metadata aware network in the first flow direction. Additionally, or alternatively, the enforcement nodes may access the metadata in the second flow direction by performing a lookup in the connection datastore using the DCID of the short header included in packets traveling in the second flow direction to determine the corresponding SCID with the encoded metadata. Once the metadata has been determined, the enforcement nodes may apply the corresponding policy (or policies) to the QUIC connection.

Additionally, or alternatively, the environment may include a QUIC edge proxy node executing a QUIC proxy service and hosted at an edge of a cloud network or an enterprise network that is more proximal to the client device than the private application resource. The QUIC proxy service may be configured to communicate with the policy engine and establish a QUIC connection session between the client device and the private enterprise/application resource. For example, the QUIC proxy service may receive a first initial QUIC packet from the client device including a DCID associated with the private enterprise/application resource. The QUIC proxy service may be configured to terminate the first QUIC connection session initiated by the client device and initiate a second QUIC connection session with the private enterprise/application resource on behalf of the client device. In some examples, the QUIC proxy service may communicate with the policy engine to determine one or more network policies to apply to the second QUIC connection session based on information associated with the client device, information a client account associated with the client device (e.g., an enterprise and/or application specific account), information associated with the private enterprise/application resource, and/or the like. Once the network policies to be applied to the second QUIC connection have been determined, the policy engine may then encode metadata representing the desired policies into a connection ID and return the connection ID to the QUIC proxy service. The QUIC proxy service may then encode the connection ID including the encoded metadata as the SCID of a second initial QUIC packet, and encode the DCID from the first initial QUIC packet as the DCID of the second initial QUIC packet. Additionally, or alternatively, the policy engine may store a mapping between the connection ID generated by the client device (e.g., the DCID from the perspective of the application resource) and the connection ID generated by the QUIC server (e.g., the SCID from the perspective of the application resource), thus allowing for the enforcement nodes to access the SCID associated with QUIC packets traveling in either flow direction using the DCID encoded into the short header of the QUIC packet.

Since the metadata is encoded into the SCID field of packets traveling in the first flow direction, subsequent QUIC packets that use the short header and are traveling in the first flow direction may not include the encoded metadata. Alternatively, the QUIC packets traveling in the second flow direction will include the SCID corresponding to the QUIC proxy service as the DCID, thus the encoded metadata may be included in the short header used in the transmission of subsequent packets in the second flow direction. Given that the subsequent packets have the short header including the DCID, the metadata may be instantly accessible by the enforcement nodes of the metadata-aware network in the second flow direction. Additionally, or alternatively, the enforcement nodes may access the metadata in the first flow direction by performing a lookup in the connection data store using the DCID of the short header included in packets traveling in the first flow direction to determine the corresponding SCID with the encoded metadata. Once the metadata has been determined, the enforcement nodes may apply the corresponding policy (or policies) to the second QUIC connection.

Additionally, or alternatively, the environment may include a QUIC workload proxy node executing a QUIC proxy service and hosted at an edge of the private application network that is more proximal to the private application resource than the client device. The QUIC proxy service may be configured to communicate with the policy engine and establish a QUIC connection session between the client device and the private enterprise/application resource. For example, a QUIC workload proxy associated with the private application resource may receive a first initial QUIC packet from the client device and may encode a DCID field of a second initial QUIC packet to send to the client device with the connection ID encoded in the SCID field received from the client device. Additionally, or alternatively, the QUIC workload proxy may communicate with the policy engine to determine one or more network policies to apply to the QUIC connection session based on information associated with the client device, information a client account associated with the client device (e.g., an enterprise and/or application specific account), information associated with the private enterprise/application resource, and/or the like. Once the network policies to be applied to the QUIC connection have been determined, the policy engine may then encode metadata representing the desired policies into a connection ID and return the connection ID to the QUIC proxy service, where the connection ID including the encoded metadata may be encoded as the SCID of the second initial QUIC packet. Additionally, or alternatively, the policy engine may store a mapping between the connection ID generated by the client device (e.g., the DCID from the perspective of the QUIC proxy service) and the connection ID generated by the QUIC server (e.g., the SCID from the perspective of the QUIC proxy service), thus allowing for the enforcement nodes to access the SCID associated with QUIC packets traveling in either flow direction using the DCID encoded into the short header of the QUIC packet.

Since the metadata is encoded into the SCID field of packets traveling in the second flow direction, subsequent QUIC packets that use the short header and are traveling in the second direction may not include the encoded metadata. Alternatively, QUIC packets traveling in the first flow direction will include the SCID generated by the QUIC server as the DCID, thus the encoded metadata may be included in the short header used in the transmission of subsequent packets in the first flow direction. Given that the subsequent packets have the short header including the DCID, the metadata may be instantly accessible by the enforcement nodes of the metadata aware network in the first flow direction. Additionally, or alternatively, the enforcement nodes may access the metadata in the second flow direction by performing a lookup in the connection datastore using the DCID of the short header included in packets traveling in the second flow direction to determine the corresponding SCID with the encoded metadata. Once the metadata has been determined, the enforcement nodes may apply the corresponding policy (or policies) to the QUIC connection.

Additionally, or alternatively, as previously mentioned, the environment may include a combination of the components described herein. For example, the environment may include the QUIC edge proxy node executing the proxy service and hosted at an edge of a cloud network or an enterprise network that is more proximal to the client device than the private application resource, and the private application resource configured as the cooperative application including the metadata component that is configured to communicate with the policy engine. Additionally, or alternatively, the environment may include the QUIC edge proxy node executing the proxy service and hosted at an edge of a cloud network or an enterprise network that is more proximal to the client device than the private application resource, and the QUIC workload proxy node executing a QUIC proxy service and hosted at an edge of the private application network that is more proximal to the private application resource than the client device. In such configurations, the metadata representing the policy may be encoded into the SCID in both the first flow direction and the second flow direction, making the metadata instantly accessible to the enforcement nodes via the DCID included in the subsequent packets including the short header in both the first flow direction and the second flow direction. In this way, the enforcement nodes need not perform a lookup in the connection data store and instead may apply the policy (or policies) to the QUIC connection session at wire speed in both the first flow direction and the second flow direction.

As previously described, the MASQUE proxy instance(s) and/or the QUIC proxy instance(s) may be configured to access a global key/value data store configured to store mappings between one or more QUIC connection session(s) to handle a failure and/or migration of the QUIC connection session(s) across proxy nodes, data centers, and/or private application nodes. Take, for example, a cloud network including one or more data centers each having an edge routing device. The edge router in each data center may be connected to a proxy node executing a QUIC and/or MASQUE proxy service, where the proxy node is connected to a private application node executing an private enterprise/application resource. In some examples, the environment may include a global key-value data store, accessible by the proxy nodes and/or private application nodes, and configured to store a mapping between a first connection associated with the proxy node on the front end (e.g., a connection between the proxy node and a client device) and a second connection associated with the proxy node on the back end (e.g., a connection between the proxy node and the private application node). In this way, when a proxy node receives a QUIC packet on the frontend, it can determine where to map this connection to on the backend. Additionally, or alternatively, when a proxy node receives a QUIC packet on the backend, it can determine where to map this connection to on the front end. In some examples, the connection information stored in the global data store may comprise a port associated with the first connection, an IP address associated with the client device, an SCID from the client perspective, a DCID from the client perspective, a port associated with the second connection, an IP address associated with the private application node, an SCID from the private application node perspective, and/or a DCID from the private application node perspective.

In some examples, a first data center may advertise an IP address associated with a private enterprise/application resource executing on a private application node using Anycast, or any protocol of the like. A client may then connect to this IP address and establish an SCID, a DCID, and cryptography configurations to setup the first QUIC connection on the front end of a first proxy node. The first proxy node may then store the first QUIC connection information (e.g., the client IP address, a port associated with the first QUIC connection, the SCID, the DCID, and the cryptography configuration) in the global data store. Additionally, or alternatively, the first proxy node may then select a first private application node from among multiple private application nodes associated with the advertised IP address and may establish a second QUIC connection on the back end of the first proxy node to the first application node. The first proxy node may then receive a response from the first private application node representing the second QUIC connection information including the first application node IP address, a port associated with the second QUIC connection, the SCID from the perspective of the first application node, and the DCID from the perspective of the first application node. The first proxy node may then store the second QUIC connection information in the global data store in association with the first QUIC connection information. The first proxy node may then begin proxying across the first QUIC connection on the front end and the second QUIC connection on the back end.

In some examples, the first data center may be taken out of rotation. In such scenarios, the first data center may then cease advertising the IP address, and the client may be redirected to a second data center advertising the IP address. Once the QUIC traffic arrives at the second data center, the first proxy node or a second proxy node may then query the global data store using the front end QUIC connection information to identify the backend QUIC connection information that it is mapped to, and may continue proxying the traffic without interruption. Additionally, or alternatively, the first proxy node may detect that the first private application node is down, underperforming, and/or that there is an issue with the second QUIC connection on the back end. In such scenarios, the first proxy node may select a second private application node from the private application nodes associated with the IP address, and establish a third QUIC connection with second private application node and continue proxying the traffic without interruption. Additionally, or alternatively, the first proxy node may send traffic from the client device to the first private application node. In some examples, the application node may go offline, and the first proxy node may select a second private application node from the private application nodes associated with the IP address, and may send the traffic to the second private application node. In such scenarios, the second private application node may utilize the DCID and/or the SCID included in the traffic (e.g., associated with the back end connection), to query the global data store and determine the front end connection information, allowing the second private application node to identify the client device and send a response to the first proxy node.

As described herein, a computing-based and/or cloud-based solution and/or resource can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to the QUIC and MASQUE protocols. For instance, the techniques described herein may allow provide remote users with full application access to private enterprise/application resources using the QUIC and/or MASQUE tunneled connections which allow for proxying of any protocol over HTTP. By storing mappings between front end QUIC connections and back end QUIC connections, policies may be applied to QUIC connection flows using enforcement nodes even though the QUIC protocol was designed not to interoperate with middleboxes. A policy engine may encode metadata into a connection ID representing the desired policies, and the enforcement nodes may access the metadata directly from QUIC packets and/or by performing a lookup on the global data store to retrieve the metadata encoded into the connection ID mapped to the connection ID included in a QUIC packet. Additionally, these mappings between front end QUIC connections and back end QUIC connections may be further leveraged to seamlessly handle the migration of a front end QUIC connection and/or a back end QUIC connection across data centers, proxy nodes, and/or application nodes and reestablish QUIC connections on the fly. This may be advantageous for handling the failure of application nodes, the failure of proxy nodes, load balancing at data centers, and the like. Further, the techniques described herein may allow for the tunneling of L2 ethernet packets over MASQUE tunnels configured as an EoMASQUE tunnel. By extending the MASQUE protocol to include a new entity for ethernet proxying along with a new CONNECT-ETH method, an EoMASQUE tunnel may be configured to utilize HTTP/3 and may utilize the QUIC protocol as a transport connecting various networks, such as, for example remote client premises, enterprise premises, and data centers hosting an EoMASQUE proxy node and connected to additional remote premises.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an example environment 100 for implementing at least some of the various technologies disclosed herein. The environment 100 includes one or more cloud network(s) having a cloud edge and/or enterprise edge 102, an enterprise/application network 104, a client device 106 that may utilize one or more resources of the enterprise/application network 104 via one or more networks 108, such as, for example the one or more cloud networks, by way of one or more process(es) 110, such as, for example, DNS client(s) 110A, VPN client(s) 110B, browser(s) 110C, application(s) 110D, and/or software agent(s) 110N executing on the client device 106. Additionally, FIG. 1A illustrates an example flow for a MASQUE proxy service 112 executing at the cloud edge and/or enterprise edge 102 to establish a connection via one or more network components 114 between an application node (e.g., hosted on the server(s) 116) executing one or more application(s) 118 and one or more nodes executing the MASQUE proxy service 112 that is configured to transmit a data stream between the client device 106 and the application node 116.

In some examples, the cloud network(s) and/or the enterprise/application network 104 may include one or more data center(s) comprising various network components, such as, for example, network switch(es) (also referred to as node(s)) operating on physical servers. In some examples, physical server(s) may host one or more virtual machines. Each virtual machine may be configured to execute one of various operations and act as one or more virtual components for the cloud network(s) and/or enterprise/application network 104, such as, for example, the application(s) 118. In some examples, the physical server(s) may host any number of virtual machines. In some examples, the physical server(s) in the enterprise/application network 104 may host the various network components of the enterprise/application network, such as, for example, the network components 114, a DNS server 120, and/or the server(s) 116 hosting the applications 118.

Take, for example, an environment 100 including one or more networks 108. In some examples, the networks 108 may include a remote client network, a private enterprise/application network 104, and/or a cloud network having a cloud edge 102. In some examples, the remote client network may include one or more client device(s), such as, a client device 106 (e.g., a desktop, laptop, or a mobile device) and/or a client router for connecting the client device to the additional networks, such as, the cloud network and/or the private enterprise/application network 104. In some examples, the private enterprise/application network 104 may include one or more network components 114, a domain name service (DNS) server 120, one or more servers 116 executing a private application resource 118, and/or a MASQUE proxy node executing a MASQUE proxy service 112 hosted at a cloud edge or an enterprise edge 102. In some examples, the cloud network may include one or more network nodes for establishing a connection session, one or more cloud edge services 122, such as, for example, one or more secure access service edge (SASE) services, and/or a MASQUE proxy node executing a MASQUE proxy service 112. In some examples, the client device 106 may transmit a request to establish a connection with the private application resource 118 as an HTTP request 124 including an endpoint identifier associated with the private enterprise/application resource 118 hosted in the private enterprise/application network 104. Additionally, or alternatively, the MASQUE proxy service 112 may be configured to communicate with the DNS server 120 and execute a DNS resolution request 126 on behalf of the client device 106. Additionally, or alternatively, the MASQUE proxy service 112 may be configured to establish a tunneled connection 128 with the endpoint (e.g., the application(s) 118 hosted in the private enterprise/application network 104.

At "1," the MASQUE proxy service 112 may receive the HTTP request 124 from the client device 106 and begin a proxy workflow. In some examples, the HTTP request 124 may be transmitted by one or more process(es) 110 executing on the client device 106, such as, for example, a DNS client 110A, a VPN client 110B, a browser 110C, an application 110D, and/or a software agent 110N, leveraging one of the CONNECT methods offered by the MASQUE protocol, such as, for example, CONNECT-UDP and/or CONNECT-IP. Additionally, or alternatively, the MASQUE protocol may be extended to include a new entity configured to tunnel raw L2 ethernet packets via a tunneled connection 128 using a new CONNECT-ETH method, as described in more detail with respect to FIG. 6.

At "2," the MASQUE proxy service 112 may begin the proxy workflow by identifying an endpoint identifier in a header field of the HTTP request 124. In some examples, the endpoint identifier may be associated with the application(s) 118 executing on the server(s) 116 hosted in the private enterprise/application network 104.

At "3," the MASQUE proxy service 112 may then send a DNS resolution request 126 to a DNS server 120 hosted in the enterprise/application network 104 on behalf of the client device 106. In some examples, the DNS resolution request 126 may include the endpoint identifier that was included in the HTTP request 124 received from the client device 106.

At "4," the MASQUE proxy service 112 may receive a DNS response from the DNS server 120 in association with the DNS request 126 that was previously sent by the MASQUE proxy service 112. In some examples, the DNS response may include an IP address associated with the application 118 and determined using the endpoint identifier.

At "5," the MASQUE proxy service 112 may then utilize the IP address of the application 118 received in the DNS response to establish a tunneled connection 128 between the MASQUE proxy service 112 and the server(s) 116 hosting the application(s) 118 in the enterprise/application network 104, using one or more nodes of the cloud network(s) and/or one or more of the network components 114 of the enterprise/application network 104. In some examples, the tunneled connection 128 may be configured to transmit a data stream between the client device 106 and the application node 118. As previously described, the MASQUE proxy service 112 may be hosted at a cloud network edge 102 providing one or more cloud edge service(s) 122, such as, for example SASE services that may be applied to the data stream.

Figure 1B:
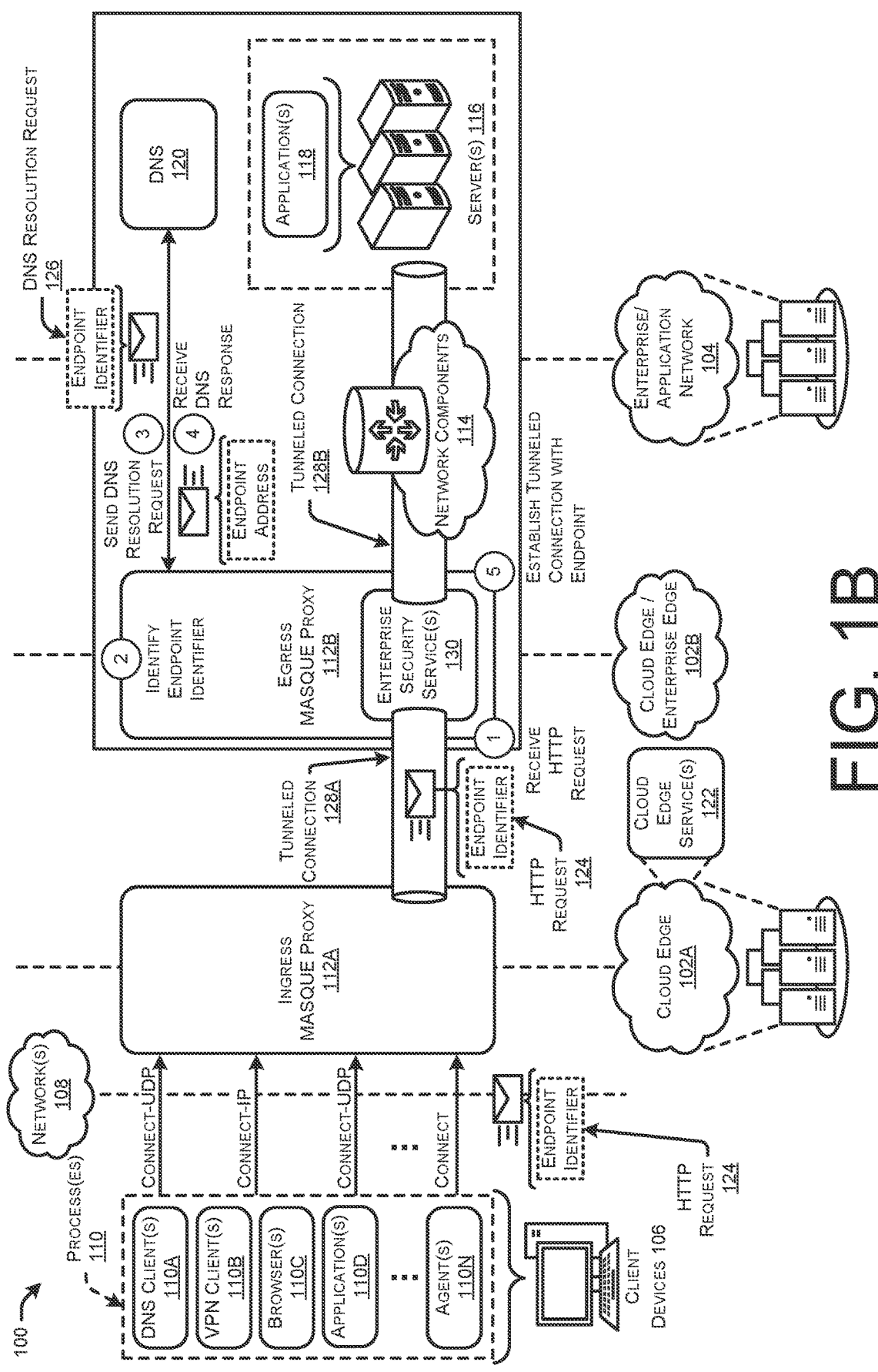
FIG. 1B illustrates a system-architecture diagram of another example environment for a MASQUE proxy service to establish a connection between an application node and one or more nodes executing the MASQUE proxy service that is configured to transmit a data stream between a client device and the application node.

FIG. 1B illustrates a system-architecture diagram of another example environment 100 for implementing at least some of the various technologies disclosed herein. The environment 100 includes one or more cloud network(s) having a cloud edge 102A, an enterprise/application network 104 having an enterprise/application edge 102B, a client device 106 that may utilize one or more resources of the enterprise/application network 104 via one or more networks 108, such as, for example, the cloud network(s), by way of one or more process(es) 110, such as, for example, DNS client(s) 110A, VPN client(s) 110B, browser(s) 110C, application(s) 110D, and/or software agent(s) 110N executing on the client device 106. Additionally, FIG. 1B illustrates an example flow for a first MASQUE proxy service 112A executing at the cloud edge and a second MASQUE proxy service 112B executing at the enterprise/application edge 104 to establish a connection between an application node (e.g., hosted on the server(s) 116) executing one or more application(s) 118 and one or more nodes executing the first MASQUE proxy service 112A and the second MASQUE proxy service 112B, configured to transmit a data stream between the client device 106 and the application node 116.

In some examples, the cloud network(s) and/or the enterprise/application network 104 may include one or more data center(s) comprising various network components, such as, for example, network switch(es) (also referred to as node(s)) operating on physical servers. In some examples, physical server(s) may host one or more virtual machines. Each virtual machine may be configured to execute one of various operations and act as one or more virtual components for the cloud network(s) and/or enterprise/application network 104, such as, for example, the application(s) 118. In some examples, the physical server(s) may host any number of virtual machines. In some examples, the physical server(s) in the enterprise/application network 104 may host the various network components of the enterprise/application network, such as, for example, the network components 114, a DNS server 120, and/or the applications 118.

Take, for example, an environment 100 including one or more networks 108. In some examples, the networks 108 may include a remote client network, a private enterprise/application network 104 having an enterprise/application edge 102B, and/or a cloud network having a cloud edge 102A. In some examples, the remote client network may include one or more client device(s), such as, a client device 106 (e.g., a desktop, laptop, or a mobile device) and/or a client router for connecting the client device to the additional networks, such as, the cloud network and/or the private enterprise/application network 104. In some examples, the cloud network may include one or more network nodes for establishing a connection session, one or more cloud edge services 122, such as, for example, one or more secure access service edge (SASE) services, and/or a first MASQUE proxy node executing a first MASQUE proxy service 112A. In some examples, the private enterprise/application network 104 may include one or more network components 114, a domain name service (DNS) server 120, one or more servers 116 executing a private application resource 118, and/or a second MASQUE proxy node executing a second MASQUE proxy service 112B, configured as an egress proxy node and hosted at an enterprise/application edge 102B.

In some examples, the client device 106 may transmit a request to establish a connection with the private application resource 118 as an HTTP request 124 including an endpoint identifier associated with the private enterprise/application resource 118 hosted in the private enterprise/application network 104. In some examples, the HTTP request 124 may be received by the first MASQUE proxy service 112A, and the first MASQUE proxy service 112A may be configured to send the HTTP request 124 to the second MASQUE proxy service 112B via a first tunneled connection 128A established between the first MASQUE proxy node hosted at the cloud network edge 102A and the second MASQUE proxy node hosted at the enterprise/application network edge 102B. Additionally, or alternatively, the second MASQUE proxy service 112 may be configured to communicate with the DNS server 120 and execute a DNS resolution request 126 on behalf of the client device 106. Additionally, or alternatively, the MASQUE proxy service 112 may be configured to establish a second tunneled connection 128B with the endpoint (e.g., the application(s) 118 hosted in the private enterprise/application network 104. The first tunneled connection 128A may be configured such that all of the traffic moving from the cloud network(s) to the private enterprise/application network(s) 104 may be tunneled in this single connection, fully privatizing the traffic from the cloud. This may be achieved by encrypting any HTTP HOST HEADER field using various encryption methods, such as, for example, hybrid public key encryption (HPKE) or the like. Additionally, or alternatively, the second MASQUE proxy node may be configured to apply one or more enterprise configured security services 130 to the first tunneled connection 128A, such as, for example, an enterprise firewall service, or the like. As such, the first tunneled connection 128A may be established by the second MASQUE proxy service 112B, enabling the second proxy node to operate seamlessly behind the enterprise security services 130.

At "1," the first MASQUE proxy service 112A may receive the HTTP request 124 from the client device 106, and may transmit the HTTP request 124 to the second MASQUE proxy service 112B via the first tunneled connection 128A. In some examples, the HTTP request 124 may be transmitted by one or more process(es) 110 executing on the client device 106, such as, for example, a DNS client 110A, a VPN client 110B, a browser 110C, an application 110D, and/or a software agent 110N, leveraging one of the CONNECT methods offered by the MASQUE protocol, such as, for example, CONNECT-UDP and/or CONNECT-IP. Additionally, or alternatively, the MASQUE protocol may be extended to include a new entity configured to tunnel raw L2 ethernet packets via the first tunneled connection 128A and/or the second tunneled connection 128B using a new CONNECT-ETH method, as described in more detail with respect to FIG. 6. Once the second MASQUE proxy service 112B receives the HTTP request 124, the second MASQUE proxy service 112B may begin a proxy workflow.

At "2," the second MASQUE proxy service 112B may begin the proxy workflow by identifying an endpoint identifier in a header field of the HTTP request 124. In some examples, the endpoint identifier may be associated with the application(s) 118 executing on the server(s) 116 hosted in the private enterprise/application network 104.

At "3," the second MASQUE proxy service 112B may then send a DNS resolution request 126 to a DNS server 120 hosted in the enterprise/application network 104 on behalf of the client device 106. In some examples, the DNS resolution request 126 may include the endpoint identifier that was included in the HTTP request 124 received from the client device 106.

At "4," the second MASQUE proxy service 112B may receive a DNS response from the DNS server 120 in association with the DNS request 126 that was previously sent by the MASQUE proxy service 112. In some examples, the DNS response may include an IP address associated with the application 118 and determined using the endpoint identifier.

At "5," the second MASQUE proxy service 112B may then utilize the IP address of the application 118 received in the DNS response to establish a second tunneled connection 128B between the second MASQUE proxy service 112B and the server(s) 116 hosting the application(s) 118 in the enterprise/application network 104, using one or more of the network components 114 of the enterprise/application network 104. In some examples, the first tunneled connection 128A and the second tunneled connection 128B may be configured to transmit a data stream between the client device 106 and the application node 118. As previously described, the first tunneled connection 128A may have one or more enterprise security service(s) 130 applied to the data stream coming from the client device 106 via the second MASQUE proxy service 112B. Additionally, or alternatively, the first MASQUE proxy service 112A, hosted at a cloud network edge 102, may provide one or more cloud edge service(s) 122, such as, for example SASE services that may be applied to the data stream in either direction.

Figure 2:
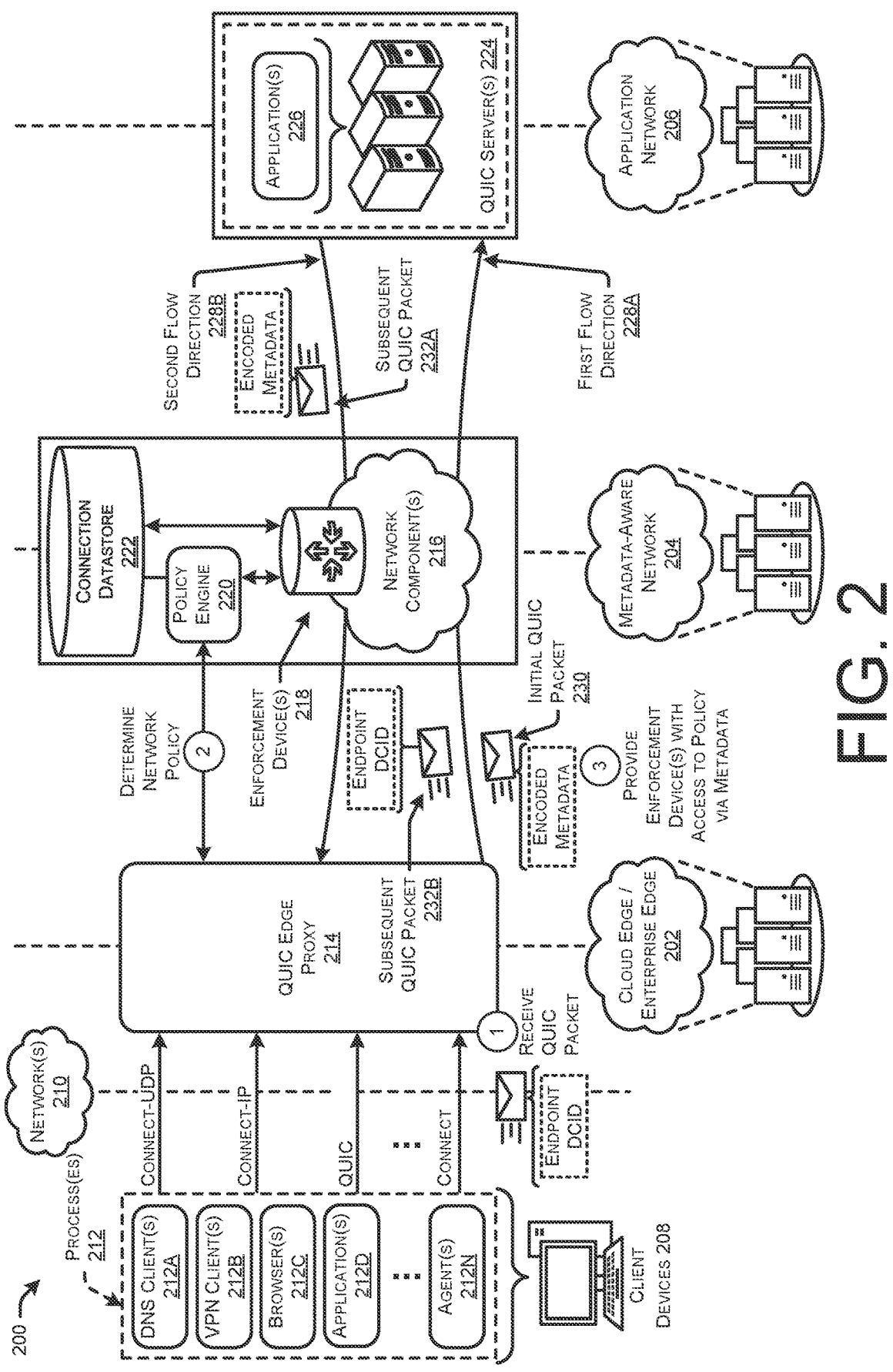
FIG. 2 illustrates a system-architecture diagram of an example environment for a QUIC edge proxy to provide enforcement nodes of a metadata-aware network with access to metadata indicating a policy to enforce on a QUIC connection between a client device and an application node.

FIG. 2 illustrates a system-architecture diagram of an example environment 200 for implementing at least some of the various technologies described herein. The environment 200 includes one or more cloud network(s) and/or enterprise network(s) having a cloud edge or an enterprise edge 202, a metadata-aware network 204, an application network 206, and/or a client device 208 that may utilize one or more resources of the application network 206 via one or more networks 210, such as, for example, the one or more cloud network(s), enterprise network(s), or any network possessing internet technologies, by way of one or more process(es) 212, such as, for example, DNS client(s) 212A, VPN client(s) 212B, browser(s) 212C, application(s) 212D, and/or or software agent(s) 212N executing on the client device 208. Additionally, FIG. 2 illustrates an example flow for a QUIC edge proxy 214 to provide network components 216, such as, for example, enforcement nodes 218 of a metadata-aware network 204 with access to metadata indicating a policy to enforce on a QUIC connection between a client device 208 and an application node.

In some examples, the cloud network(s), the enterprise network(s), the metadata-aware network 204, and/or the application network 104 may include one or more data center(s) comprising various network components, such as, for example, network switch(es) (also referred to as node(s)) operating on physical servers. In some examples, physical server(s) may host one or more virtual machines. Each virtual machine may be configured to execute one of various operations and act as one or more virtual components for the associated network(s). In some examples, the physical server(s) may host any number of virtual machines.

The QUIC edge proxy 214 may be hosted at a cloud network edge or an enterprise network edge 202. In examples where the QUIC edge proxy 214 is hosted at a cloud network edge 202, one or more SASE services may be performed on a QUIC connection session associated with the QUIC edge proxy 214. Additionally, or alternatively, in examples where the QUIC edge proxy 214 is hosted at an enterprise network edge 202, one or more enterprise configured security services may be performed on a QUIC connection session associated with the QUIC edge proxy 214. Additionally, or alternatively, the application network 206 may include one or more servers, such as, for example, QUIC servers 224 hosting one or more application resources 226.

The metadata-aware network 204 may include one or more network components, such as, for example, one or more enforcement device(s) 218, a policy engine 220, and/or a connection data store 222. In some examples, an enforcement device 218 may be configured to identify and/or utilize metadata associated with a QUIC packet and representing one or more policies to be applied to a QUIC connection session. In some examples, an enforcement node 218 may be configured to apply the one or more policies to the QUIC connection session based on the metadata. For example, an enforcement node 218 may be configured to identify the metadata encoded into a connection ID of a QUIC packet. Additionally, or alternatively, an enforcement node 218 may be configured to perform a lookup in the connection data store 222 using a first connection ID included in a QUIC packet to identify a second connection ID stored in association with the first connection ID and encoded with the metadata. The policy engine 220 may be communicatively coupled to the QUIC edge proxy 214, the connection data store 222, and/or the enforcement device(s) 218. The policy engine 220 may be configured to determine one or more policies to apply to a QUIC connection session based on the client device 208, an account associated with the client device 208 and/or an enterprise network, and/or an application 226 hosted in the application network 206 that the client is requesting access to. The policy engine 220 may be configured to determine metadata representing the one or more policies and encode the metadata into a connection ID for use in a QUIC packet header. Additionally, or alternatively, the policy engine 220 may be configured to store one or more mappings between QUIC connection IDs. For example, the policy engine 220 may store a mapping between a source connection ID (SCID) associated with a QUIC connection and a destination connection ID (DCID) associated with a QUIC connection in a first flow direction 228A and/or in a second flow direction 228B, opposite the first direction.

The metadata may be encoded into the SCID field of an initial QUIC packet 230 including a long header. In some examples, the metadata may be encoded into the SCID field of packets traveling in the first flow direction 228A by a QUIC edge proxy node executing an instance of a QUIC proxy service 214 and in communication with the policy engine 220, for example. Since subsequent QUIC packets 232 include a short header (described in more detail with respect to FIGS. 8A and 8B), only the DCID may be included in the subsequent QUIC packets 232 transmitted over the QUIC connection session. As such, the enforcement nodes 218 may be configured to access the metadata in various ways.

Since the metadata is encoded in the SCID field of initial QUIC packets 230 traveling in the first flow direction 228A and not encoded in the SCID field of initial QUIC packets 230 traveling in the second flow direction 228B, subsequent packets 232 traveling in the first flow direction 228A may not carry the metadata encoded in the SCID and instead may only include the DCID in the short header, and thus the enforcement nodes 218 may be configured to perform a lookup in the connection data store 222 using the DCID to determine the corresponding SCID with the encoded metadata and apply the policy (or policies) to the QUIC connection in the first flow direction 228A. However, in such an example, subsequent QUIC packets 232 traveling in the second flow direction 228B may carry the metadata encoded as the DCID, and thus the enforcement nodes 218 may access the metadata without performing a lookup in the data store 222 and may apply the policy (or policies) to the QUIC connection at wire speed in the second flow direction 228B.

At "1," the QUIC edge proxy 214 may receive a first initial QUIC packet from the client device including a DCID associated with the private application 226. The QUIC edge proxy 214 may be configured to terminate the first QUIC connection session initiated by the client device 208 and initiate a second QUIC connection session with the private application 226 on behalf of the client device 208.

At "2," the QUIC edge proxy 214 may communicate with the policy engine 220 to determine one or more network policies to apply to the second QUIC connection session based on information associated with the client device 208, information a client account associated with the client device 208 (e.g., an enterprise and/or application specific account), information associated with the application 226, and/or the like. Once the network policies to be applied to the second QUIC connection have been determined, the policy engine 220 may then encode metadata representing the desired policies into a connection ID and return the connection ID to the QUIC edge proxy 214. The QUIC edge proxy 214 may then encode the connection ID including the encoded metadata as the SCID of a second initial QUIC packet 230, and encode the DCID from the first initial QUIC packet as the DCID of the second initial QUIC packet 230. Additionally, or alternatively, the policy engine 220 may store a mapping between the connection ID generated by the client device 208 (e.g., the DCID from the perspective of the application resource 226) and the connection ID generated by the QUIC server (e.g., the SCID from the perspective of the application resource 226), thus allowing for the enforcement nodes 218 to access the SCID associated with QUIC packets traveling in either flow direction 228 using the DCID encoded into the short header of the QUIC packet.

At "3," the QUIC edge proxy 214 may provide the enforcement nodes 218 with access to the policy via the metadata. In some examples, providing the enforcement nodes 218 with access to the metadata may include sending a QUIC packet to an enforcement node 218. Since the metadata is encoded into the SCID field of packets traveling in the first flow direction 228A, subsequent QUIC packets 232B that use the short header and are traveling in the first flow direction 228A may not include the encoded metadata. Alternatively, the QUIC packets traveling in the second flow direction 228B will include the SCID corresponding to the QUIC edge proxy 214 as the DCID, thus the encoded metadata may be included in the short header used in the transmission of subsequent packets 232A in the second flow direction 228B. Given that the subsequent packets 232A have the short header including the DCID, the metadata may be instantly accessible by the enforcement nodes 218 of the metadata-aware network 204 in the second flow direction 228B. Additionally, or alternatively, the enforcement nodes 218 may access the metadata in the first flow direction 228A by performing a lookup in the connection data store 222 using the DCID of the short header included in subsequent packets 232B traveling in the first flow direction 228A to determine the corresponding SCID with the encoded metadata. Once the metadata has been determined, the enforcement nodes 218 may apply the corresponding policy (or policies) to the second QUIC connection.

Figure 3A:
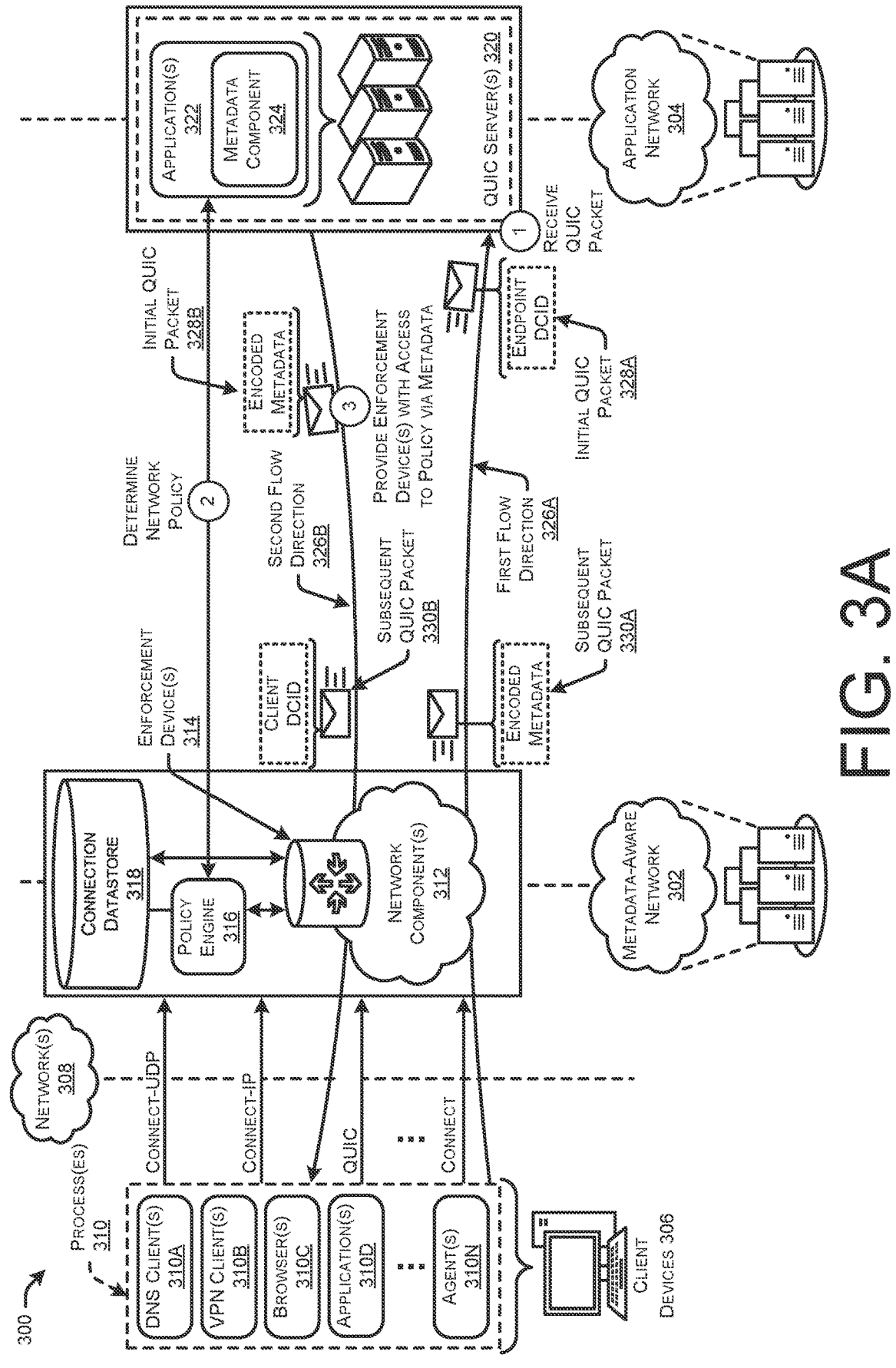
FIG. 3A illustrates a system-architecture diagram of an example environment for a modified QUIC application to provide enforcement nodes of a metadata-aware network with access to metadata indicating a policy to enforce on a QUIC connection between a client device and an application node.

FIG. 3A illustrates a system-architecture diagram of an example environment 300 for implementing at least some of the various technologies described herein. The environment 300 includes one or more network(s) such as, for example, a cloud network, a metadata-aware network 302, and/or an application network 304, and/or a client device 306 that may utilize one or more resources of the application network 304 via one or more networks 308, such as, for example, the one or more cloud network(s) or any network possessing internet technologies, by way of one or more process(es) 310, such as, for example, DNS client(s) 310A, VPN client(s) 310B, browser(s) 310C, application(s) 310D, and/or software agent(s) 310N executing on the client device 306. Additionally, FIG. 3A illustrates an example flow to provide network components 312, such as, for example, enforcement nodes 314 of a metadata-aware network 302 with access to metadata indicating a policy to enforce on a QUIC connection between the client device 306 and an application node.

In some examples, the cloud network(s), the metadata-aware network 302, and/or the application network 304 may include one or more data center(s) comprising various network components, such as, for example, network switch(es) (also referred to as node(s)) operating on physical servers. In some examples, physical server(s) may host one or more virtual machines. Each virtual machine may be configured to execute one of various operations and act as one or more virtual components for the associated network(s). In some examples, the physical server(s) may host any number of virtual machines.

The metadata-aware network 302 may include one or more network components, such as, for example, one or more enforcement device(s) 314, a policy engine 316, and/or a connection data store 318. The application network 304 may include one or more servers, such as, for example, QUIC server(s) 320 hosting one or more application resources 322. In some examples, the application resources 322 may be modified to include a metadata component 324 that is communicatively coupled to the policy engine 316. Additionally, or alternatively, the metadata component 324 may be configured to communicate with the policy engine and establish a QUIC connection session having a connection ID encoded with metadata expressing a policy to enforce on the connection flows.

In some examples, an enforcement device 314 may be configured to identify and/or utilize metadata associated with a QUIC packet and representing one or more policies to be applied to a QUIC connection session. In some examples, an enforcement node 314 may be configured to apply the one or more policies to the QUIC connection session based on the metadata. For example, an enforcement node 314 may be configured to identify the metadata encoded into a connection ID of a QUIC packet. Additionally, or alternatively, an enforcement node 314 may be configured to perform a lookup in the connection data store 318 using a first connection ID included in a QUIC packet to identify a second connection ID stored in association with the first connection ID and encoded with the metadata. The policy engine 316 may be communicatively coupled to the connection data store 318, and/or the enforcement device(s) 314. The policy engine 316 may be configured to determine one or more policies to apply to a QUIC connection session based on the client device 306, an account associated with the client device 306 and/or an enterprise network, and/or an application 322 hosted in the application network 304 that the client is requesting access to. The policy engine 316 may be configured to determine metadata representing the one or more policies and encode the metadata into a connection ID for use in a QUIC packet header. Additionally, or alternatively, the policy engine 316 may be configured to store one or more mappings between QUIC connection IDs. For example, the policy engine 316 may store a mapping between a source connection ID (SCID) associated with a QUIC connection and a destination connection ID (DCID) associated with a QUIC connection in a first flow direction 326A and/or in a second flow direction 326B, opposite the first direction.

The metadata may be encoded into the SCID field of an initial QUIC packet 328 including a long header. In some examples, the metadata may be encoded into the SCID field of packets traveling in the second flow direction 326B by the metadata component 324 of the application 322 in communication with the policy engine 316, for example. Since subsequent QUIC packets 330 include a short header (described in more detail with respect to FIGS. 8A and 8B), only the DCID may be included in the subsequent QUIC packets 330 transmitted over the QUIC connection session. As such, the enforcement nodes 314 may be configured to access the metadata in various ways.

Since the metadata is encoded into the SCID field of initial QUIC packets 328B traveling in the second flow direction 326B and not encoded in the SCID field of initial QUIC packets 328A traveling in the first flow direction 326A, subsequent QUIC packets 330 traveling in the second direction 326B may not carry the metadata encoded in the SCID and instead may only include the DCID in the short header, and thus enforcement nodes 314 may be configured to perform a lookup in the connection data store 318 using the DCID to determine the corresponding SCID with the encoded metadata and apply the policy (or policies) to the QUIC connection in the second flow direction 326B. However, in such an example, subsequent QUIC packets 330A traveling in the first flow direction 326A may carry the metadata encoded as the DCID, and thus the enforcement nodes 314 may access the metadata without performing a lookup in the data store 318 and may apply the policy (or policies) to the QUIC connection at wire speed in the first flow direction 326A.

At "1," the QUIC server 320 may receive a first initial QUIC packet 328A from the client device 306 including a DCID associated with the application 322 and/or an SCID associated with the client device 306. The metadata component 324 may be configured to encode a DCID field, of a second initial QUIC packet 328B to send as a response to the client device 306, with the connection ID encoded in the SCID field of the first initial QUIC packet 328A received from the client device 306.

At "2," the QUIC server 320 and/or the metadata component 324 may communicate with the policy engine 316 to determine one or more network policies to apply to the QUIC connection session based on information associated with the client device 306, information a client account associated with the client device 306 (e.g., an enterprise and/or application specific account), information associated with the private enterprise/application resource 322, and/or the like. Once the network policies to be applied to the QUIC connection have been determined, the policy engine 316 may then encode metadata representing the desired policies into a connection ID and return the connection ID to the QUIC server 320 and/or the metadata component 324, where the connection ID including the encoded metadata may be encoded as the SCID of the second initial QUIC packet 328B. Additionally, or alternatively, the policy engine 316 may store a mapping in the data store 318 between the connection ID generated by the client device 306 (e.g., the DCID from the perspective of the application resource 322) and the connection ID generated by the QUIC server 320 (e.g., the SCID from the perspective of the application resource 322), thus allowing for the enforcement nodes 314 to access the SCID associated with QUIC packets traveling in either flow direction 326 using the DCID encoded into the short header of the QUIC packet.

At "3," the metadata component 324 may provide the enforcement nodes 314 with access to the policy via the metadata. In some examples, providing the enforcement nodes 314 with access to the metadata may include sending a QUIC packet to an enforcement nodes 314. Since the metadata is encoded into the SCID field of packets traveling in the second flow direction 326B, subsequent QUIC packets 330B that use the short header and are traveling in the second direction 326B may not include the encoded metadata. Alternatively, subsequent QUIC packets 330A traveling in the first flow direction 330A will include the SCID generated by the QUIC server 320 as the DCID, thus the encoded metadata may be included in the short header used in the transmission of subsequent QUIC packets 330A in the first flow direction 326A. Given that the subsequent QUIC packets 326A have the short header including the DCID, the metadata may be instantly accessible by the enforcement nodes 314 of the metadata-aware network 302 in the first flow direction 326A. Additionally, or alternatively, the enforcement nodes 314 may access the metadata in the second flow direction 326B by performing a lookup in the connection datastore 318 using the DCID of the short header included in subsequent QUIC packets 330B traveling in the second flow direction 326B to determine the corresponding SCID with the encoded metadata. Once the metadata has been determined, the enforcement nodes 314 may apply the corresponding policy (or policies) to the QUIC connection.

Figure 3B:
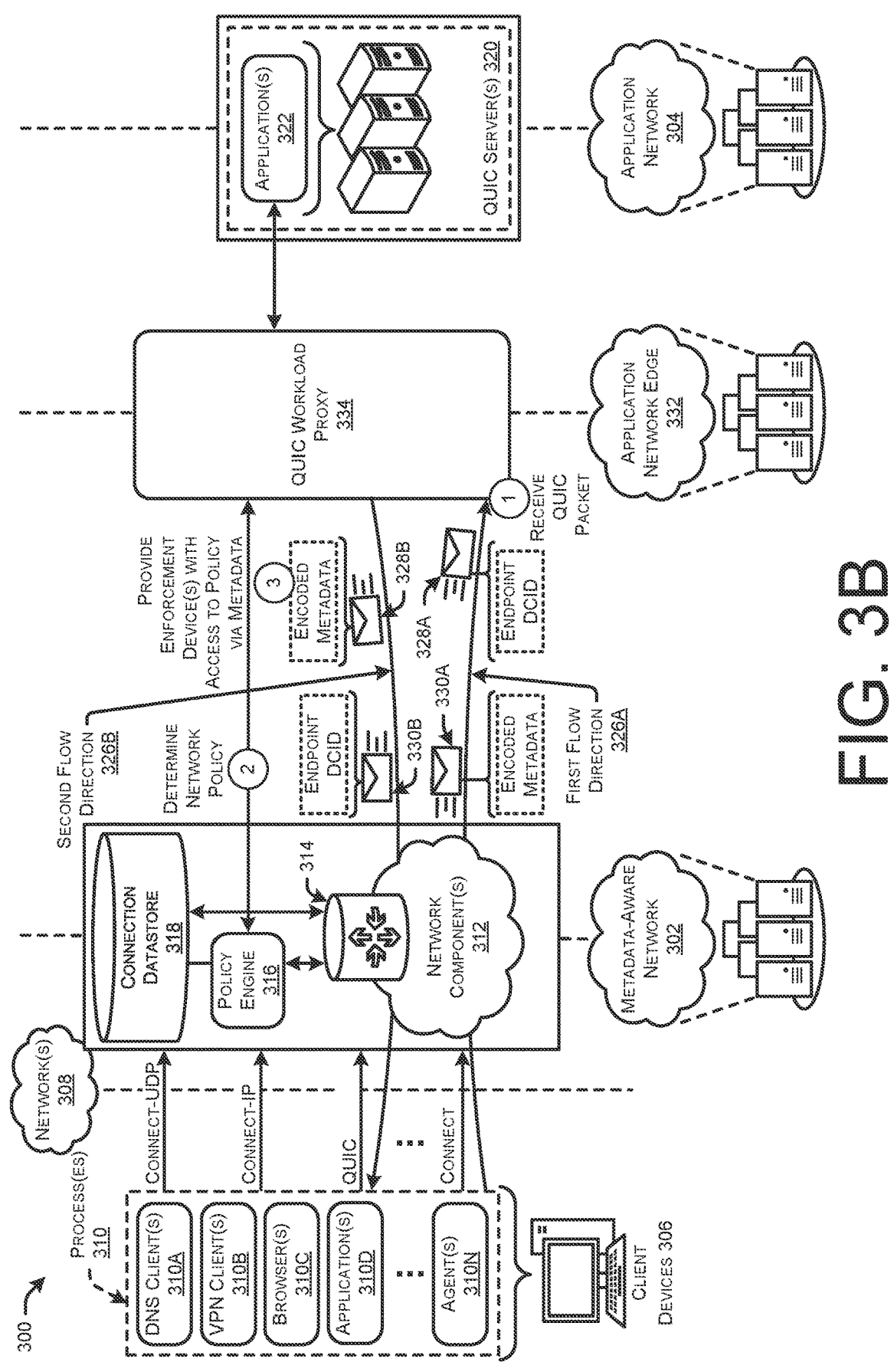
FIG. 3B illustrates a system-architecture diagram of an example environment for a QUIC workload proxy to provide enforcement nodes of a metadata-aware network with access to metadata indicating a policy to enforce on a QUIC connection between a client device and an application node.

FIG. 3B illustrates another system-architecture diagram of an example environment 300 for implementing at least some of the various technologies described herein. The environment 300 includes one or more networks network(s) such as, for example, a cloud network, a metadata-aware network 302, and/or an application network 304, and/or a client device 306 that may utilize one or more resources of the application network 304 via one or more networks 308, such as, for example, the one or more cloud network(s) or any network possessing internet technologies, by way of one or more process(es) 310, such as, for example, DNS client(s) 310A, VPN client(s) 310B, browser(s) 310C, application(s) 310D, and/or software agent(s) 310N executing on the client device 306. Additionally, FIG. 3B illustrates an example flow to provide network components 312, such as, for example, enforcement nodes 314 of a metadata-aware network 302 with access to metadata indicating a policy to enforce on a QUIC connection between the client device 306 and an application node.

In some examples, the cloud network(s), the metadata-aware network 302, and/or the application network 304 may include one or more data center(s) comprising various network components, such as, for example, network switch(es) (also referred to as node(s)) operating on physical servers. In some examples, physical server(s) may host one or more virtual machines. Each virtual machine may be configured to execute one of various operations and act as one or more virtual components for the associated network(s). In some examples, the physical server(s) may host any number of virtual machines.

The metadata-aware network 302 may include one or more network components, such as, for example, one or more enforcement device(s) 314, a policy engine 316, and/or a connection data store 318. The application network 304 may include one or more servers, such as, for example, QUIC server(s) 320 hosting one or more application resources 322. In some examples, the application network 304 may include a QUIC workload proxy node 334 hosted at the edge of the application network 332 and executing a QUIC proxy service. Additionally, or alternatively, the QUIC workload proxy 334 may be configured to communicate with the policy engine 316 and establish a QUIC connection session having a connection ID encoded with metadata expressing a policy to enforce on the connection flows.

In some examples, an enforcement device 314 may be configured to identify and/or utilize metadata associated with a QUIC packet and representing one or more policies to be applied to a QUIC connection session. In some examples, an enforcement node 314 may be configured to apply the one or more policies to the QUIC connection session based on the metadata. For example, an enforcement node 314 may be configured to identify the metadata encoded into a connection ID of a QUIC packet. Additionally, or alternatively, an enforcement node 314 may be configured to perform a lookup in the connection data store 318 using a first connection ID included in a QUIC packet to identify a second connection ID stored in association with the first connection ID and encoded with the metadata. The policy engine 316 may be communicatively coupled to the connection data store 318, and/or the enforcement device(s) 314. The policy engine 316 may be configured to determine one or more policies to apply to a QUIC connection session based on the client device 306, an account associated with the client device 306 and/or an enterprise network, and/or an application 322 hosted in the application network 304 that the client is requesting access to. The policy engine 316 may be configured to determine metadata representing the one or more policies and encode the metadata into a connection ID for use in a QUIC packet header. Additionally, or alternatively, the policy engine 316 may be configured to store one or more mappings between QUIC connection IDs. For example, the policy engine 316 may store a mapping between a source connection ID (SCID) associated with a QUIC connection and a destination connection ID (DCID) associated with a QUIC connection in a first flow direction 326A and/or in a second flow direction 326B, opposite the first direction.

The metadata may be encoded into the SCID field of an initial QUIC packet 328 including a long header. In some examples, the metadata may be encoded into the SCID field of packets traveling in the second flow direction 326B by the metadata component 324 of the application 322 in communication with the policy engine 316, for example. Since subsequent QUIC packets 330 include a short header (described in more detail with respect to FIGS. 8A and 8B), only the DCID may be included in the subsequent QUIC packets 330 transmitted over the QUIC connection session. As such, the enforcement nodes 314 may be configured to access the metadata in various ways.

Since the metadata is encoded into the SCID field of initial QUIC packets 328B traveling in the second flow direction 326B and not encoded in the SCID field of initial QUIC packets 328A traveling in the first flow direction 326A, subsequent QUIC packets 330 traveling in the second direction 326B may not carry the metadata encoded in the SCID and instead may only include the DCID in the short header, and thus enforcement nodes 314 may be configured to perform a lookup in the connection data store 318 using the DCID to determine the corresponding SCID with the encoded metadata and apply the policy (or policies) to the QUIC connection in the second flow direction 326B. However, in such an example, subsequent QUIC packets 330A traveling in the first flow direction 326A may carry the metadata encoded as the DCID, and thus the enforcement nodes 314 may access the metadata without performing a lookup in the data store 318 and may apply the policy (or policies) to the QUIC connection at wire speed in the first flow direction 326A.

At "1," the QUIC workload proxy 334 may receive a first initial QUIC packet 328A from the client device 306 including a DCID associated with the application 322 and/or an SCID associated with the client device 306. The QUIC workload proxy 334 may be configured to encode a DCID field, of a second initial QUIC packet 328B to send as a response to the client device 306, with the connection ID encoded in the SCID field of the first initial QUIC packet 328A received from the client device 306.

At "2," the QUIC workload proxy 334 may communicate with the policy engine 316 to determine one or more network policies to apply to the QUIC connection session based on information associated with the client device 306, information a client account associated with the client device 306 (e.g., an enterprise and/or application specific account), information associated with the private enterprise/application resource 322, and/or the like. Once the network policies to be applied to the QUIC connection have been determined, the policy engine 316 may then encode metadata representing the desired policies into a connection ID and return the connection ID to the QUIC workload proxy 334, where the connection ID including the encoded metadata may be encoded as the SCID of the second initial QUIC packet 328B. Additionally, or alternatively, the policy engine 316 may store a mapping in the data store 318 between the connection ID generated by the client device 306 (e.g., the DCID from the perspective of the application resource 322) and the connection ID associated with the QUIC server 320 (e.g., the SCID from the perspective of the application resource 322), thus allowing for the enforcement nodes 314 to access the SCID associated with QUIC packets traveling in either flow direction 326 using the DCID encoded into the short header of the QUIC packet.

At "3," the QUIC workload proxy 334 may provide the enforcement nodes 314 with access to the policy via the metadata. In some examples, providing the enforcement nodes 314 with access to the metadata may include sending a QUIC packet to an enforcement nodes 314. Since the metadata is encoded into the SCID field of packets traveling in the second flow direction 326B, subsequent QUIC packets 330B that use the short header and are traveling in the second direction 326B may not include the encoded metadata. Alternatively, subsequent QUIC packets 330A traveling in the first flow direction 330A will include the SCID generated by the QUIC server 320 as the DCID, thus the encoded metadata may be included in the short header used in the transmission of subsequent QUIC packets 330A in the first flow direction 326A. Given that the subsequent QUIC packets 326A have the short header including the DCID, the metadata may be instantly accessible by the enforcement nodes 314 of the metadata-aware network 302 in the first flow direction 326A. Additionally, or alternatively, enforcement nodes 314 may access the metadata in the second flow direction 326B by performing a lookup in the connection datastore 318 using the DCID of the short header included in subsequent QUIC packets 330B traveling in the second flow direction 326B to determine the corresponding SCID with the encoded metadata. Once the metadata has been determined, the enforcement nodes 314 may apply the corresponding policy (or policies) to the QUIC connection.

Figure 4A:
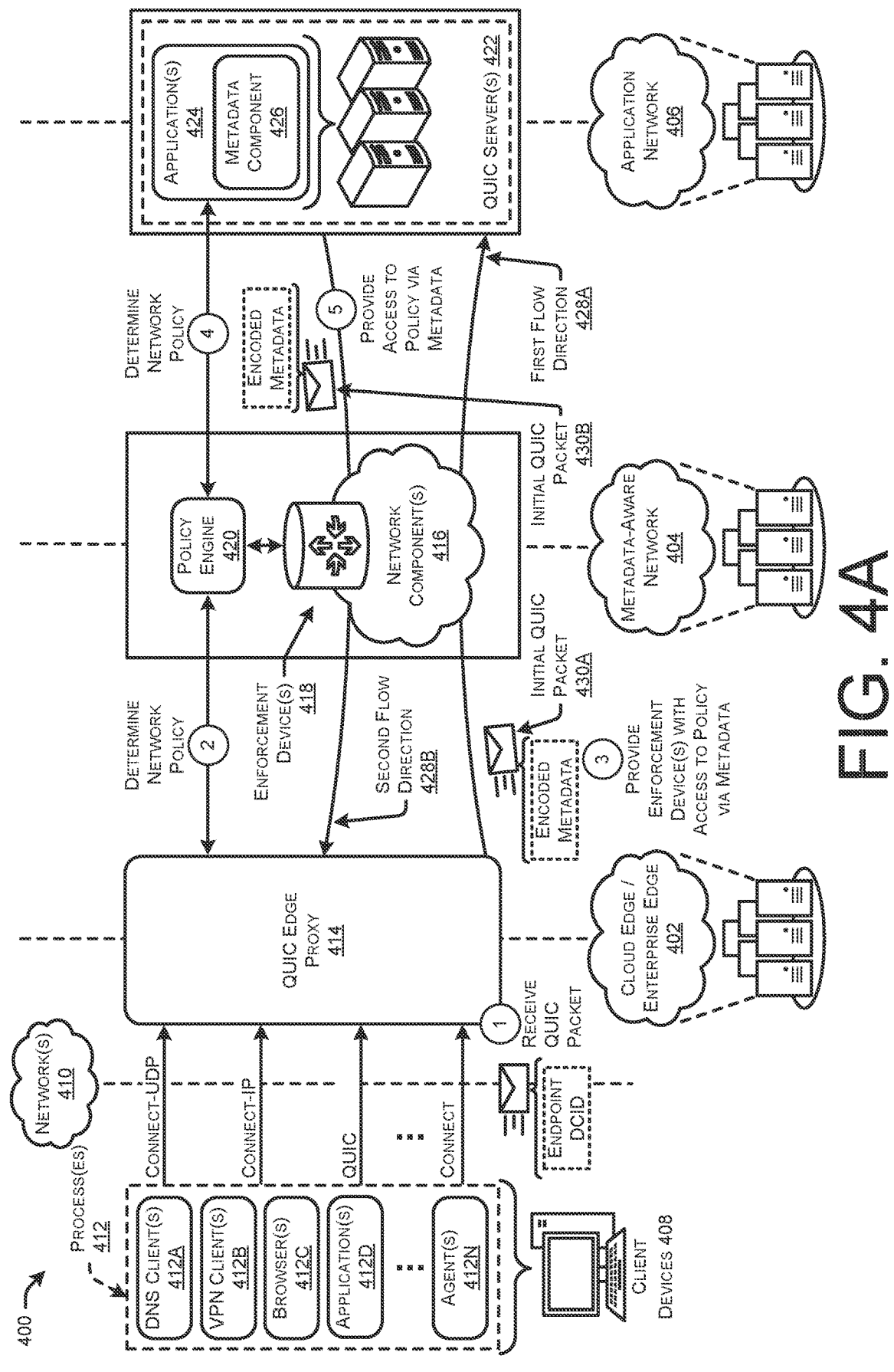
FIG. 4A illustrates a system-architecture diagram of an example environment for a QUIC edge proxy and a modified QUIC application to provide enforcement nodes of a metadata-aware network with access to metadata indicating a policy to enforce on a QUIC connection between a client device and an application node.

FIG. 4A illustrates a system-architecture diagram of an example environment 400 for implementing at least some of the various technologies described herein. The environment 400 includes one or more network(s) such as, for example, a cloud network and/or enterprise network having a network edge 402, a metadata-aware network 404, an application network 406, and/or a client device 408 that may utilize one or more resources of the application network 406 via one or more networks 410, such as, for example, one or more cloud networks or any network possessing internet technologies, by way of one or more process(es) 412, such as, for example, DNS client(s) 412A, VPN client(s) 412B, browser(s) 412C, application(s) 412D, and/or software agent(s) 412N executing on the client device 408. Additionally, FIG. 4A illustrates an example flow for at least a QUIC edge proxy 414 to provide network components 416, such as, for example, enforcement nodes 418 of a metadata-aware network 404 with access to metadata indicating a policy to enforce on a QUIC connection between the client device 408 and an application node.

In some examples, the cloud network(s), the enterprise network(s), the metadata-aware network 404, and/or the application network 406 may include one or more data center(s) comprising various network components, such as, for example, network switch(es) (also referred to as node(s)) operating on physical servers. In some examples, physical server(s) may host one or more virtual machines. Each virtual machine may be configured to execute one of various operations and act as one or more virtual components for the associated network(s). In some examples, the physical server(s) may host any number of virtual machines.

The QUIC edge proxy 414 may be hosted at a cloud network edge or an enterprise network edge 402. In examples where the QUIC edge proxy 414 is hosted at a cloud network edge 402, one or more SASE services may be performed on a QUIC connection session associated with the QUIC edge proxy 414. Additionally, or alternatively, in examples where the QUIC edge proxy 414 is hosted at an enterprise network edge 402, one or more enterprise configured security services may be performed on a QUIC connection session associated with the QUIC edge proxy 414.

The metadata-aware network 404 may include one or more network components, such as, for example, one or more enforcement device(s) 418 and/or a policy engine 420. The application network 406 may include one or more servers, such as, for example, QUIC server(s) 422 hosting one or more application resources 424. In some examples, the application resources 424 may be modified to include a metadata component 426 that is communicatively coupled to the policy engine 420. Additionally, or alternatively, the metadata component 426 may be configured to communicate with the policy engine 420 and establish a QUIC connection session having a connection ID encoded with metadata expressing a policy to enforce on the connection flows. Additionally, or alternatively, the QUIC edge proxy 414 may be configured to communicate with the policy engine 420 and establish a QUIC connection session having a connection ID encoded with metadata expressing a policy to enforce on the connection flows.

In some examples, an enforcement device 418 may be configured to identify and/or utilize metadata associated with a QUIC packet and representing one or more policies to be applied to a QUIC connection session. In some examples, an enforcement node 418 may be configured to apply the one or more policies to the QUIC connection session based on the metadata. For example, an enforcement node 418 may be configured to identify the metadata encoded into a connection ID of a QUIC packet. The policy engine 420 may be communicatively coupled to the enforcement device(s) 418. The policy engine 420 may be configured to determine one or more policies to apply to a QUIC connection session based on the client device 408, an account associated with the client device 408 and/or an enterprise network, and/or an application 424 hosted in the application network 406 that the client is requesting access to. The policy engine 420 may be configured to determine metadata representing the one or more policies and encode the metadata into a connection ID for use in a QUIC packet header, where the metadata may be provided to the enforcement nodes 418 in a first flow direction 428A and/or a second flow direction 428B by way of the transmission of a QUIC packet.

The metadata may be encoded into the SCID field of an initial QUIC packet 430 including a long header. In some examples, the metadata may be encoded into the SCID field of packets traveling the first flow direction 428A by the QUIC edge proxy 414 in communication with the policy engine 420, for example. Additionally, or alternatively, the metadata may be encoded into the SCID field of packets traveling in the second flow direction 428B by the metadata component 426 of the application 424 in communication with the policy engine 420, for example. Since subsequent QUIC packets include a short header (described in more detail with respect to FIGS. 8A and 8B), only the DCID may be included in the subsequent QUIC packets transmitted over the QUIC connection session.

Since the metadata representing the policy may be encoded into the SCID in both the first flow direction 428A and the second flow direction 428B, the metadata may be instantly accessible to the enforcement nodes 418 via the DCID included in the subsequent packets including the short header in both the first flow direction 428A and the second flow direction 428B. In this way, the enforcement nodes 418 need not perform a lookup to access the metadata in either direction, as described with respect to FIGS. 2-3B, and instead may apply the policy (or policies) to the QUIC connection session at wire speed in both the first flow direction 428A and the second flow direction 428B.

At "1," the QUIC edge proxy 414 may receive a first initial QUIC packet from the client device including a DCID associated with the private application 424. The QUIC edge proxy 414 may be configured to terminate the first QUIC connection session initiated by the client device 408 and initiate a second QUIC connection session with the private application 424 on behalf of the client device 408.

At "2," the QUIC edge proxy 414 may communicate with the policy engine 420 to determine one or more network policies to apply to the second QUIC connection session based on information associated with the client device 408, information a client account associated with the client device 408 (e.g., an enterprise and/or application specific account), information associated with the application 424, and/or the like. Once the network policies to be applied to the second QUIC connection have been determined, the policy engine 420 may then encode metadata representing the desired policies into a connection ID and return the connection ID to the QUIC edge proxy 424. The QUIC edge proxy 424 may then encode the connection ID including the encoded metadata as the SCID of a second initial QUIC packet 430A, and encode the DCID from the first initial QUIC packet as the DCID of the second initial QUIC packet 430A.

At "3," the QUIC edge proxy 414 may provide the enforcement nodes 418 with access to the policy via the metadata in the first flow direction 428A. In some examples, providing the enforcement nodes 418 with access to the metadata may include sending the second initial QUIC packet 430A from the QUIC edge proxy 414 to the QUIC server 422 hosting the application 424, by way of the enforcement nodes 418 in the first flow direction 428A.

At "4," the QUIC server 422 may receive the second initial QUIC packet 430A from the QUIC edge proxy 414 including a DCID associated with the application 424 and/or an SCID associated with the client device 408 and/or the QUIC edge proxy 414. The metadata component 426 may be configured to encode a DCID field, of a third initial QUIC packet 430B to send as a response to the client device 408, with the connection ID encoded in the SCID field of the second initial QUIC packet 430A received from the QUIC edge proxy 414. Additionally, or alternatively, the QUIC server 422 and/or the metadata component 426 may communicate with the policy engine 420 to determine one or more network policies to apply to the second QUIC connection session based on information associated with the client device 408, information a client account associated with the client device 408 (e.g., an enterprise and/or application specific account), information associated with the private enterprise/application resource 424, and/or the like. In some examples, the policy engine 420 may be configured to identify the one or more network policies determined at step "2" and sent to the QUIC edge proxy 414, and may determine to apply the same policies. Once the network policies to be applied to the second QUIC connection have been determined, the policy engine 420 may then encode metadata representing the desired policies into a connection ID and return the connection ID to the QUIC server 422 and/or the metadata component 426, where the connection ID including the encoded metadata may be encoded as the SCID of the second initial QUIC packet 428B.

At "5," the metadata component 426 may provide the enforcement nodes 418 with access to the policy via the metadata. In some examples, providing the enforcement nodes 418 with access to the metadata may include sending the third initial QUIC packet 430B from the QUIC server 422 hosting the application 424 and to the QUIC edge proxy 414, by way of the enforcement nodes 418 in the second flow direction 428B.

Since the metadata representing the policy is encoded into the SCID in the first flow direction 428A by the QUIC edge proxy 414 and in the second flow direction 428B by the metadata component 426, the metadata may be instantly accessible to the enforcement nodes 418 via the DCID included in subsequent packets including the short header in both the first flow direction 428A and the second flow direction 428B. In this way, the enforcement nodes 418 may apply the policy (or policies) to the second QUIC connection session at wire speed in both the first flow direction 428A and the second flow direction 428B.

Figure 4B:
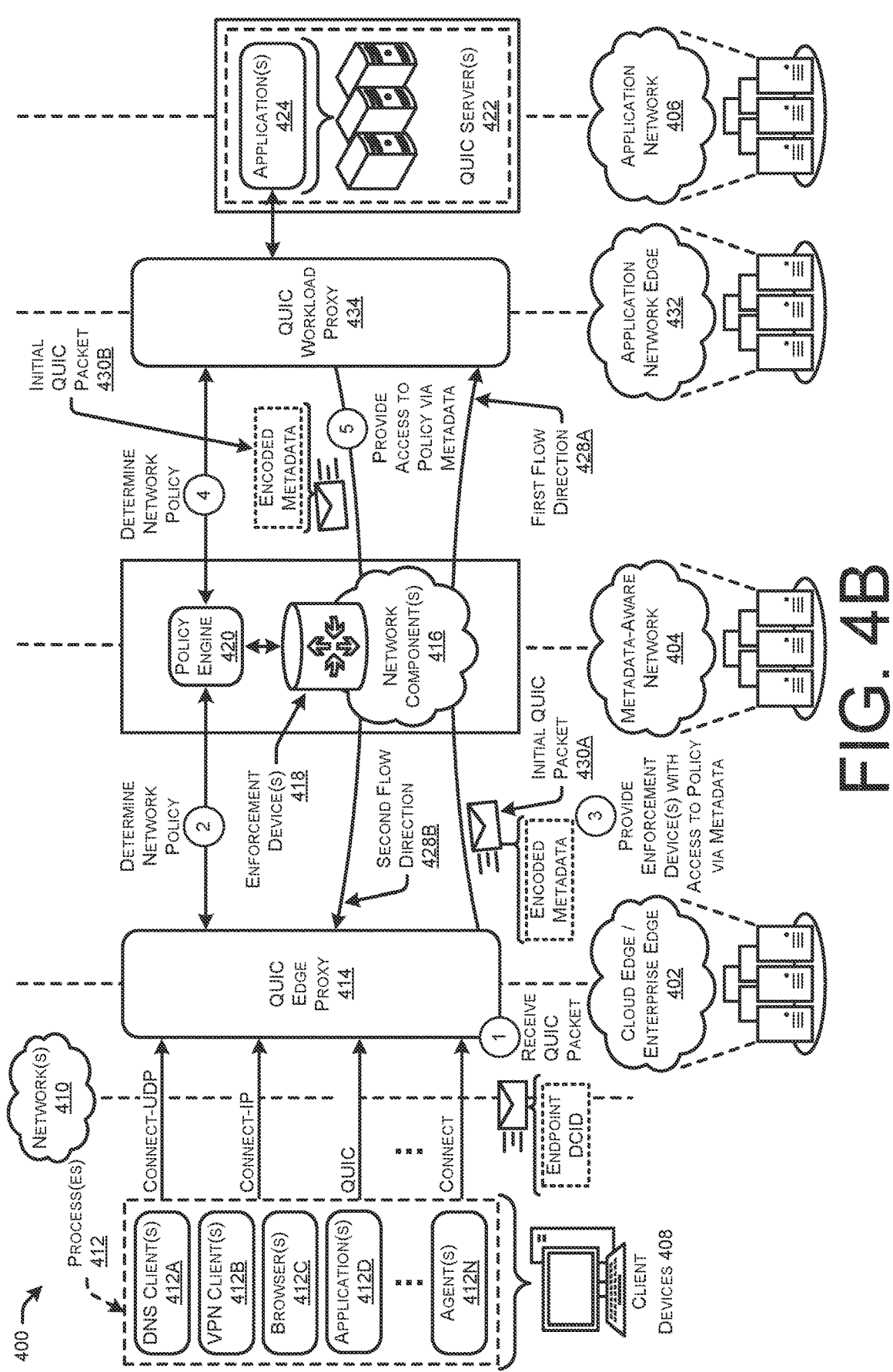
FIG. 4B illustrates a system-architecture diagram of an example environment for a QUIC edge proxy and a QUIC workload proxy to provide enforcement nodes of a metadata-aware network with access to metadata indicating a policy to enforce on a QUIC connection between a client device and an application node.

FIG. 4B illustrates another system-architecture diagram of an example environment 400 for implementing at least some of the various technologies described herein. The environment 400 includes one or more network(s) such as, for example, a cloud network and/or enterprise network having a network edge 402, a metadata-aware network 404, an application network 406, and/or a client device 408 that may utilize one or more resources of the application network 406 via one or more networks 410, such as, for example, one or more cloud networks or any network possessing internet technologies, by way of one or more process(es) 412, such as, for example, DNS client(s) 412A, VPN client(s) 412B, browser(s) 412C, application(s) 412D, and/or software agent(s) 412N executing on the client device 408. Additionally, FIG. 4B illustrates an example flow for one or more QUIC proxy nodes, such as, a QUIC edge proxy 414 to provide network components 416, such as, for example, enforcement nodes 418 of a metadata-aware network 404 with access to metadata indicating a policy to enforce on a QUIC connection between the client device 408 and an application node.

In some examples, the cloud network(s), the enterprise network(s), the metadata-aware network 404, and/or the application network 406 may include one or more data center(s) comprising various network components, such as, for example, network switch(es) (also referred to as node(s)) operating on physical servers. In some examples, physical server(s) may host one or more virtual machines. Each virtual machine may be configured to execute one of various operations and act as one or more virtual components for the associated network(s). In some examples, the physical server(s) may host any number of virtual machines.

The QUIC edge proxy 414 may be hosted at a cloud network edge or an enterprise network edge 402. In examples where the QUIC edge proxy 414 is hosted at a cloud network edge 402, one or more SASE services may be performed on a QUIC connection session associated with the QUIC edge proxy 414. Additionally, or alternatively, in examples where the QUIC edge proxy 414 is hosted at an enterprise network edge 402, one or more enterprise configured security services may be performed on a QUIC connection session associated with the QUIC edge proxy 414.

The metadata-aware network 404 may include one or more network components, such as, for example, one or more enforcement device(s) 418 and/or a policy engine 420. The application network 406 may include one or more servers, such as, for example, QUIC server(s) 422 hosting one or more application resources 424. In some examples, the application network 406 may include a QUIC workload proxy node 434 hosted at the edge of the application network 432 and executing a QUIC proxy service. Additionally, or alternatively, the QUIC workload proxy 434 may be configured to communicate with the policy engine 420 and establish a QUIC connection session having a connection ID encoded with metadata expressing a policy to enforce on the connection flows. Additionally, or alternatively, the QUIC edge proxy 414 may be configured to communicate with the policy engine 420 and establish a QUIC connection session having a connection ID encoded with metadata expressing a policy to enforce on the connection flows.

In some examples, an enforcement device 418 may be configured to identify and/or utilize metadata associated with a QUIC packet and representing one or more policies to be applied to a QUIC connection session. In some examples, an enforcement node 418 may be configured to apply the one or more policies to the QUIC connection session based on the metadata. For example, an enforcement node 418 may be configured to identify the metadata encoded into a connection ID of a QUIC packet. The policy engine 420 may be communicatively coupled to the enforcement device(s) 418. The policy engine 420 may be configured to determine one or more policies to apply to a QUIC connection session based on the client device 408, an account associated with the client device 408 and/or an enterprise network, and/or an application 424 hosted in the application network 406 that the client is requesting access to. The policy engine 420 may be configured to determine metadata representing the one or more policies and encode the metadata into a connection ID for use in a QUIC packet header, where the metadata may be provided to the enforcement nodes 418 in a first flow direction 428A and/or a second flow direction 428B by way of the transmission of a QUIC packet.

The metadata may be encoded into the SCID field of an initial QUIC packet 430 including a long header. In some examples, the metadata may be encoded into the SCID field of packets traveling the first flow direction 428A by the QUIC edge proxy 414 in communication with the policy engine 420, for example. Additionally, or alternatively, the metadata may be encoded into the SCID field of packets traveling in the second flow direction 428B by the metadata component 426 of the application 424 in communication with the policy engine 420, for example. Since subsequent QUIC packets include a short header (described in more detail with respect to FIGS. 8A and 8B), only the DCID may be included in the subsequent QUIC packets transmitted over the QUIC connection session.

Since the metadata representing the policy may be encoded into the SCID in both the first flow direction 428A and the second flow direction 428B, the metadata may be instantly accessible to the enforcement nodes 418 via the DCID included in the subsequent packets including the short header in both the first flow direction 428A and the second flow direction 428B. In this way, the enforcement nodes 418 need not perform a lookup to access the metadata in either direction, as described with respect to FIGS. 2-3B, and instead may apply the policy (or policies) to the QUIC connection session at wire speed in both the first flow direction 428A and the second flow direction 428B.

At "1," the QUIC edge proxy 414 may receive a first initial QUIC packet from the client device including a DCID associated with the private application 424. The QUIC edge proxy 414 may be configured to terminate the first QUIC connection session initiated by the client device 408 and initiate a second QUIC connection session with the private application 424 on behalf of the client device 408.

At "2," the QUIC edge proxy 414 may communicate with the policy engine 420 to determine one or more network policies to apply to the second QUIC connection session based on information associated with the client device 408, information a client account associated with the client device 408 (e.g., an enterprise and/or application specific account), information associated with the application 424, and/or the like. Once the network policies to be applied to the second QUIC connection have been determined, the policy engine 420 may then encode metadata representing the desired policies into a connection ID and return the connection ID to the QUIC edge proxy 424. The QUIC edge proxy 424 may then encode the connection ID including the encoded metadata as the SCID of a second initial QUIC packet 430A, and encode the DCID from the first initial QUIC packet as the DCID of the second initial QUIC packet 430A.

At "3," the QUIC edge proxy 414 may provide the enforcement nodes 418 with access to the policy via the metadata in the first flow direction 428A. In some examples, providing the enforcement nodes 418 with access to the metadata may include sending the second initial QUIC packet 430A from the QUIC edge proxy 414 to the QUIC server 422 hosting the application 424, by way of the enforcement nodes 418 in the first flow direction 428A.

At "4," the QUIC workload proxy 434 may receive the second initial QUIC packet 430A from the QUIC edge proxy 414 including a DCID associated with the application 424 and/or an SCID associated with the client device 408 and/or the QUIC edge proxy 414. The QUIC workload proxy 434 may be configured to encode a DCID field, of a third initial QUIC packet 430B to send as a response to the client device 408, with the connection ID encoded in the SCID field of the second initial QUIC packet 430A received from the QUIC edge proxy 414. Additionally, or alternatively, the QUIC workload proxy 434 may communicate with the policy engine 420 to determine one or more network policies to apply to the second QUIC connection session based on information associated with the client device 408, information a client account associated with the client device 408 (e.g., an enterprise and/or application specific account), information associated with the private enterprise/application resource 424, and/or the like. In some examples, the policy engine 420 may be configured to identify the one or more network policies determined at step "2" and sent to the QUIC edge proxy 414, and may determine to apply the same policies. Once the network policies to be applied to the second QUIC connection have been determined, the policy engine 420 may then encode metadata representing the desired policies into a connection ID and return the connection ID to the QUIC workload proxy 434, where the connection ID including the encoded metadata may be encoded as the SCID of the third initial QUIC packet 430B.

At "5," the QUIC workload proxy 434 may provide the enforcement nodes 418 with access to the policy via the metadata. In some examples, providing the enforcement nodes 418 with access to the metadata may include sending the third initial QUIC packet 430B from the QUIC workload proxy 434 and to the QUIC edge proxy 414, by way of the enforcement nodes 418 in the second flow direction 428B.

Since the metadata representing the policy is encoded into the SCID in the first flow direction 428A by the QUIC edge proxy 414 and in the second flow direction 428B by the QUIC workload proxy 434, the metadata may be instantly accessible to the enforcement nodes 418 via the DCID included in subsequent packets including the short header in both the first flow direction 428A and the second flow direction 428B. In this way, the enforcement nodes 418 may apply the policy (or policies) to the second QUIC connection session at wire speed in both the first flow direction 428A and the second flow direction 428B.

Figure 5:
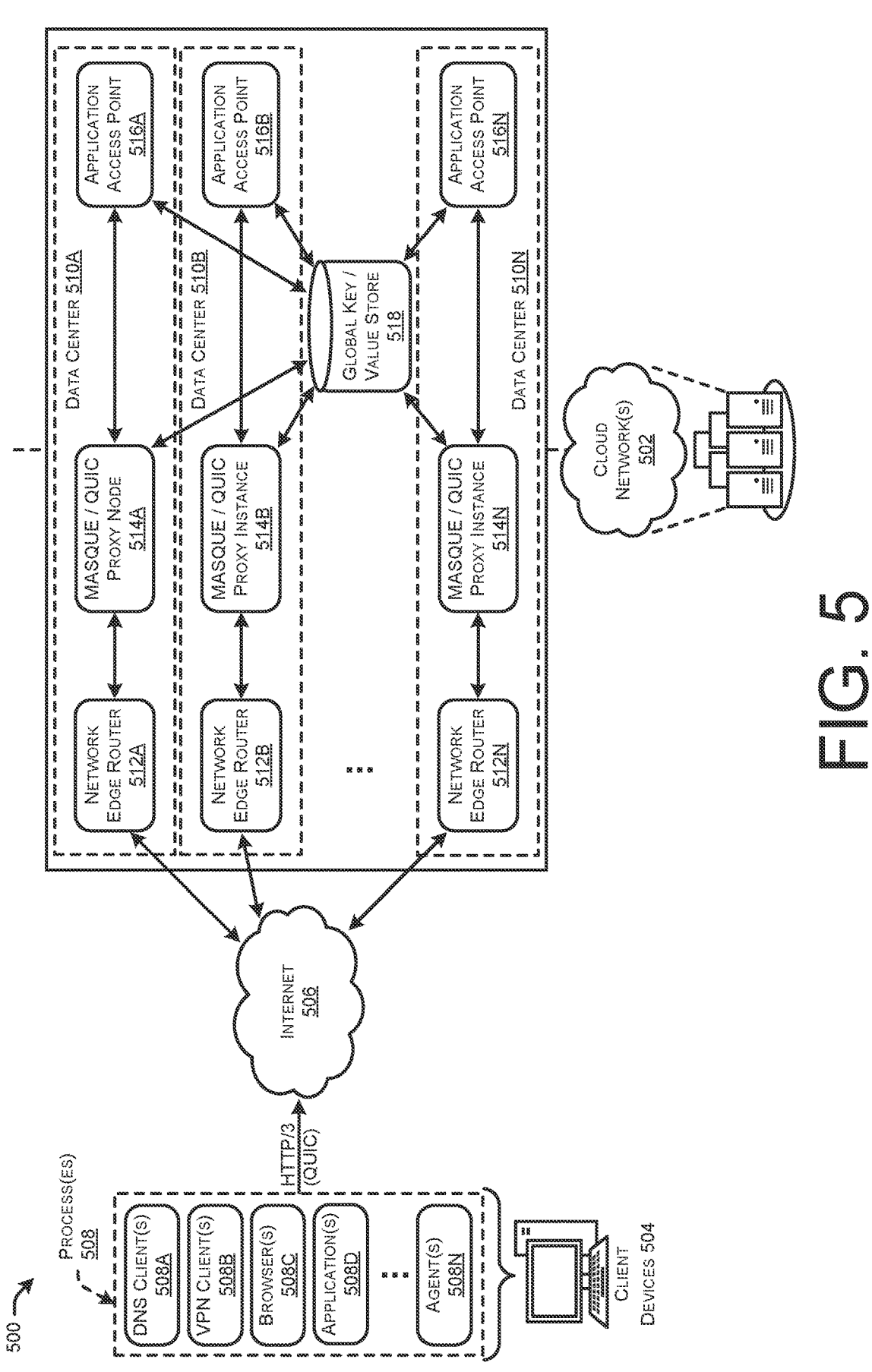
FIG. 5 illustrates an example environment for a QUIC proxy service to handle one or more QUIC connection migrations across QUIC proxy nodes, data centers, and/or application nodes.

FIG. 5 illustrates an example environment 500 for implementing at least some of the various technologies described herein. The environment 500 includes one or more cloud network(s) 502 and/or a client device 504 that may utilize one or more resources offered by the cloud network(s) 502 via one or more internet 506 connections by way of one or more process(es) 508 executing on the client device 504, such as, for example, DNS client(s) 508A, VPN client(s) 508B, browser(s) 508C, application(s) 508D, and/or software agent(s) 508N executing on the client device 504. The cloud network(s) 502 may include one or more data centers 510A-510N, each data center 510 including a network edge router 512, a proxy node 514 executing a MASQUE and/or QUIC proxy service, and/or an application node serving as an application access point 516 to the client device 504. Additionally, or alternatively, the cloud network(s) 502 may include a global key-value data store 518. In some examples, the proxy node(s) 514 may be configured to handle one or more QUIC connection migrations across the data centers

510, the network edge routers 512, the proxy nodes 514, and/or the application nodes 516.

In some examples, the client device 504 may establish a connection to an application resource hosted in a cloud network, and enterprise network, and/or an application network, and mappings between connection information associated with one or more QUIC connections and/or MASQUE connections may be stored in a connection data store according to any of the techniques previously described with respect to FIGS. 1A-4B. In some examples, the data store may be configured as a global key-value data store 518, where proxy nodes 514 and/or application nodes 516 may access the connection information contained in the global data store 518.

The edge router 512 in each data center 510 may be connected to a proxy node 514 executing a QUIC and/or MASQUE proxy service, where the proxy node 514 may be connected to a private application node 516 executing a private enterprise/application resource. In some examples, the global key-value data store 518 may be accessible by the proxy nodes 514 and/or private application nodes 516, and configured to store a mapping between a first connection associated with the proxy node 514 on the front end (e.g., a connection between the proxy node 514 and a client device 504) and a second connection associated with the proxy node 514 on the back end (e.g., a connection between the proxy node 514 and the private application node 516). In this way, when a proxy node 514 receives a QUIC packet on the frontend, it can determine where to map this connection to on the backend. Additionally, or alternatively, when a proxy node 514 receives a QUIC packet on the backend, it can determine where to map this connection to on the front end. In some examples, the connection information stored in the global data store 518 may comprise a port associated with the first connection, an IP address associated with the client device 504, an SCID from the client perspective, a DCID from the client perspective, a port associated with the second connection, an IP address associated with the private application node 516, an SCID from the private application node perspective, and/or a DCID from the private application node perspective.

In some examples, a first network edge router 512A of a first data center 510A may advertise an IP address associated with a private enterprise/application resource executing on a private application node 516. In some examples, the first network edge router 512A may advertise the IP address using Anycast, or any protocol of the like. A client device 504 may then connect to this IP address and establish an SCID, a DCID, and cryptography configurations to setup the first QUIC connection on the front end of a first proxy node 514A. The first proxy node 514A may then store the first QUIC connection information (e.g., the client IP address, a port associated with the first QUIC connection, the SCID, the DCID, and the cryptography configuration) in the global data store 518. Additionally, or alternatively, the first proxy node 514A may select a first private application node 516A from among multiple private application nodes 516 associated with the advertised IP address and may establish a second QUIC connection on the back end of the first proxy node 514A to the first application node 516A. The first proxy node 514A may receive a response from the first private application node 516A representing the second QUIC connection information including the first application node 516A IP address, a port associated with the second QUIC connection, the SCID from the perspective of the first application node 516A, and the DCID from the perspective of the first application node 516A. In some examples, first proxy node 514A may store the second QUIC connection information in the global data store 518 in association with the first QUIC connection information. In some examples, first proxy node 514A may begin proxying across the first QUIC connection on the front end and the second QUIC connection on the back end.

In some examples, the first network edge router 512A of the first data center 510A may be taken out of rotation. In such scenarios, the first data center may then cease advertising the IP address, and the client device 504 may be redirected to a second network edge router 512B of a second data center 510A that is also advertising the IP address. Once the QUIC traffic arrives at the second data center 510A, the first proxy node 514A or a second proxy node 514B may then query the global data store 518 using the front end QUIC connection information to identify the backend QUIC connection information that it is mapped to, and may continue proxying the traffic without interruption.

Additionally, or alternatively, the first proxy node 514A may detect that the first private application node 516A is down, underperforming, and/or that there is an issue with the second QUIC connection on the back end. In such scenarios, the first proxy node 514A may select a second private application node 516B from the private application nodes 516 associated with the IP address, and establish a third QUIC connection with second private application 516B node and continue proxying the traffic without interruption.

Additionally, or alternatively, the first proxy node 514A may send traffic from the client device 504 to the first private application node 516A. In some examples, the first application node 516A may go offline, and the first proxy node 514A may select a second private application node 516B from the private application nodes 516 associated with the IP address, and may send the traffic to the second private application node 516B. In such scenarios, the second private application node 516B may utilize the DCID and/or the SCID included in the traffic (e.g., associated with the back end connection), to query the global data store 518 and determine the front end connection information, allowing the second private application node 516B to identify the client device 504 and send a response to the first proxy node 514A and/or to a second proxy node 514A.

Figure 6:
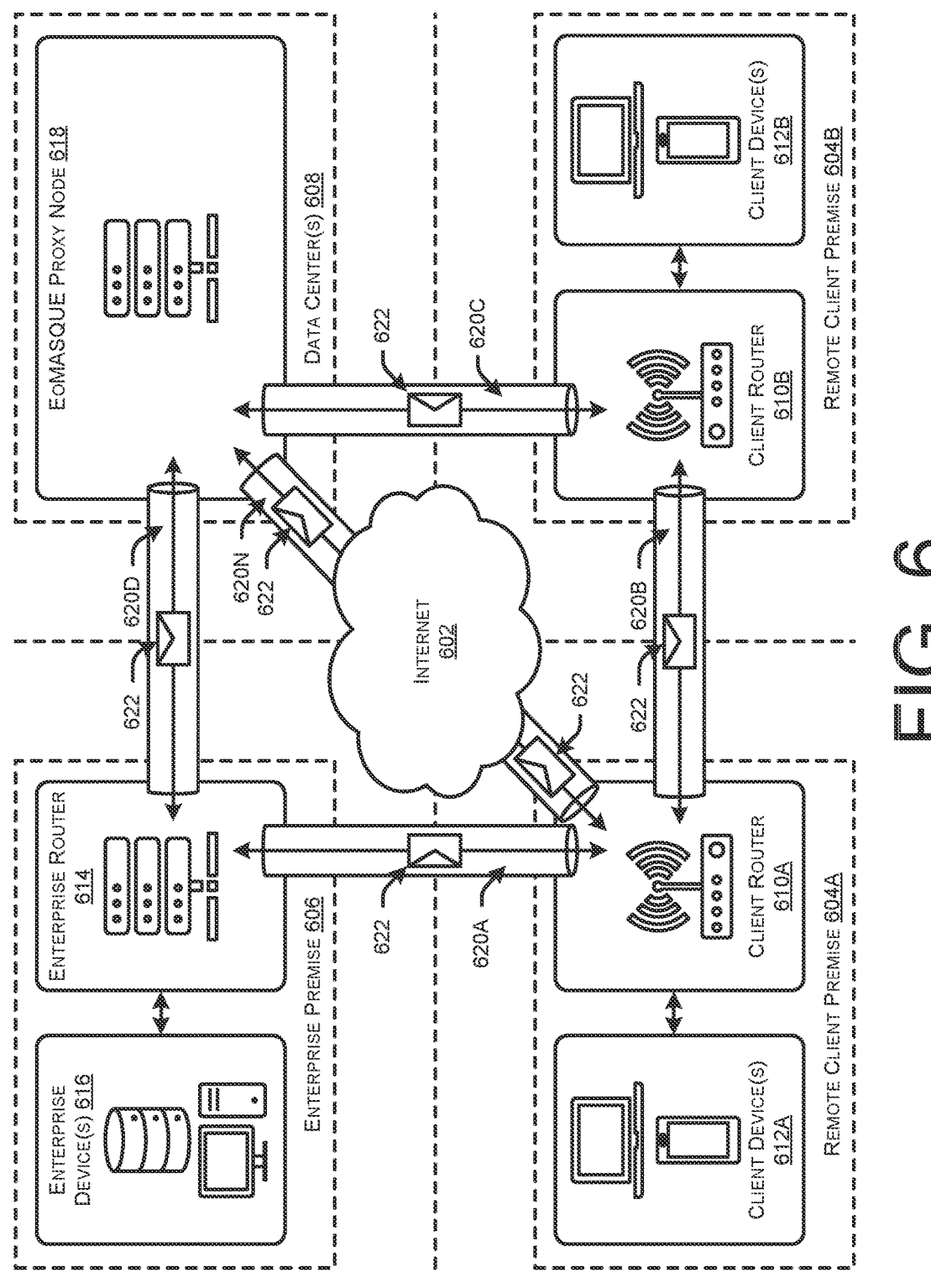
FIG. 6 illustrates an example environment for tunneling one or more Layer 2 ethernet frames from a first device in a first network to a second device in a second network using a MASQUE tunnel.

FIG. 6 illustrates an example environment 600 for implementing at least some of the various technologies described herein. The environment 600 includes one or more network(s), such as, for example, an internet 602 network allowing for connections to be established between one or more remote client premise(s) 604, one or more enterprise premise(s) 606, and/or one or more data center(s) 608. In some examples, the connections may be configured using the MASQUE protocol, or an extended version of the MASQUE protocol, configured to tunnel one or more Layer 2 ethernet frames between network devices in separate networks using an Ethernet over MASQUE (EoMASQUE) tunnel.

In some examples, a remote client premise 604 may include a client router 610 communicatively coupled to the internet 602 and/or one or more client device(s) 612 connected to the client router 610. The client router 610 may be configured to route communications to and from the one or more client devices 612 in the remote client premise 604. Additionally, or alternatively, an enterprise premise 606 may include an enterprise router 614 communicatively coupled to the internet 602 and/or one or more enterprise device(s) 616 (e.g., databases, servers, enterprise client devices, etc.) connected to the enterprise router 614. The enterprise router 614 may be configured to router communications to and from the one or more enterprise device(s) 616 in the enterprise premise 606. Additionally, or alternatively, the data center(s) 608 may be hosted by one or more cloud network(s) and may include an EoMASQUE proxy node 618 communicatively coupled to the internet 602. In some examples, the EoMASQUE proxy node 618 may be configured to establish one or more proxied connections between one or more remote client premise(s) 604, one or more enterprise premise(s) 606, and/or one or more additional EoMASQUE proxy nodes 618 via one or more EoMASQUE tunneled connections 620. In some examples, the EoMASQUE tunneled connections 620 may be configured using any of the techniques utilized to establish the tunneled connection(s) 128 as described with respect to FIGS. 1A and 1B.

Currently, various protocols may be proxied via the MASQUE mechanism, such as, for example, http_proxying (assigned value 0x00), dns_over_https (assigned value 0x01), quic_proxying (assigned value 0x02), udp_proxying (assigned value 0x03), and ip_proxying (assigned value 0x04). In some examples, a new entity configured to allow for proxying of ethernet frames using a MASQUE proxy connection (e.g., an EoMASQUE tunnel) may be added to the MASQUE protocol along with a corresponding CONNECT method, CONNECT-ETH. The new entity and CONNECT method may be configured similar to CONNECT-IP, however, instead of raw Layer-3 (L3) IP packets being proxied over MASQUE, the new entity may allow for raw L2 ethernet frames to be proxied over MASQUE using the new CONNECT-ETH method and a corresponding entity value (e.g., eth_proxying assigned the next available value in the protocol, such as, 0x05). EoMASQUE may be configured to utilize HTTP/3, a UDP-based protocol, and may utilize the QUIC protocol as a transport.

In some examples, an EoMASQUE tunnel 620 may be configured to be established between various networks. For example, a first EoMASQUE tunnel 620A may be configured to connect a client router 610A provisioned in a remote client premise 610A to an enterprise router 614 provisioned in an enterprise premise 606. Additionally, or alternatively, a second EoMASQUE tunnel 620B may be configured to connect a first client router 610A provisioned in a first remote client premise 604A to a second client router 610B provisioned in a second remote client premise 604B. Additionally, or alternatively, a third EoMASQUE tunnel 620C may be configured to connect a client router 610B provisioned in a remote client premise 604B to an EoMASQUE proxy node 618 provisioned in one or more data center(s) 608. In some examples, the EoMASQUE proxy node 618 may be connected to additional routers provisioned in additional premise(s) remote from the EoMASQUE proxy node 618 via additional EoMASQUE tunnel(s), such as, for example, a fourth EoMASQUE tunnel 620D configured to connect the enterprise router 614 in the enterprise premise 606 to the EoMASQUE proxy node 618 and/or a fifth EoMASQUE tunnel 620N configured to connect an additional client router 610A in an additional remote client premise 604A to the EoMASQUE proxy node 618.

In some examples, the various routing devices 610A, 610B, 614, and/or 618 may be configured to transmit one or more address resolution protocol (ARP/NDP) requests and/or ARP/NDP responses, encapsulated by one or more ethernet packets 622, between remote premises via the EoMASQUE tunnels 620 to receive network addresses, such as, for example IP addresses and/or media access control (MAC) addresses associated with device(s) 612A, 612B, and/or 616 in the remote premises so that the various routing devices 610A, 610B, 614, and/or 618 may be configured to route traffic between the device(s) 612A, 612B, and/or 616.

For example, a first client router 610A of a first remote premise 604A may establish a EoMASQUE tunnel 620B between the first client router 610A and a second client router 610B in a second remote client premise 604B. The first client router 610A may determine to transmit a TCP packet from a source to a destination, such as, for example, from a first client device 612A in the first remote client premise 604A to a second client device 612B in the second remote client premise 604B. The first client router 610A may then generate one or more first ethernet packets representing an ARP/NDP request, and send the one or more first ethernet packets from the first client router 610A to the second client router 610B via the EoMASQUE tunnel 620B. In some examples, the first client router 610A may then receive one or more second ethernet packets via the EoMASQUE tunnel 620B representing an ARP/NDP response that includes network address information (e.g., a MAC address and/or an IP address) associated with the second client device 612B, and may then leverage the network address information to transmit the TCP packet to the destination via the EoMASQUE tunnel 620B.

Additionally, or alternatively, a first client router 610A of a first remote premise 604A may establish an EoMASQUE tunnel 620A between the first client router 610A and an enterprise router 614 in an enterprise premise 606. The first client router 610A may determine to transmit a TCP packet from a source to a destination, such as, for example, from a first client device 612A in the first remote client premise 604A to an enterprise device and/or resource 616 in the enterprise premise 606. The first client router 610A may then generate one or more first ethernet packets representing an ARP/NDP request, and send the one or more first ethernet packets from the first client router 610A to the enterprise router 614 via the EoMASQUE tunnel 620A. In some examples, the first client router 610A may then receive one or more second ethernet packets via the EoMASQUE tunnel 620A representing an ARP/NDP response that includes network address information (e.g., a MAC address and/or an IP address) associated with the enterprise device(s) 616, and may then leverage the network address information to transmit the TCP packet to the destination via the EoMASQUE tunnel 620A.

Additionally, or alternatively, an EoMASQUE proxy node 618 may be configured to establish various EoMASQUE tunnels 620 to provide a proxied connection to one or more remote premises. For example, the EoMASQUE proxy node 618 may establish a first EoMASQUE tunnel 620N between the EoMASQUE proxy node 618 and a first client router 610A in a first remote client premise 604A. Additionally, or alternatively, the EoMASQUE proxy node 618 may establish a second EoMASQUE tunnel 620C between the EoMASQUE proxy node 618 and a second client router 610B in a second remote client premise 604B. Additionally, or alternatively, the EoMASQUE proxy node may establish a third EoMASQUE tunnel 620D between the EoMASQUE proxy node 618 and an enterprise router 614 in an enterprise premise 606. In some examples, the EoMASQUE proxy node 618 may be configured to transmit one or more ethernet packets and/or TCP packets between the first client router 610A and the second client router 610B via the first EoMASQUE tunnel 620N and the second EoMASQUE tunnel 620C, between the first client router 610A and the enterprise router 614 via the first EoMASQUE tunnel 620N and the third EoMASQUE tunnel 620D, and/or between the second client router 610B and the enterprise router 614 via the second EoMASQUE tunnel 620C and the third EoMASQUE tunnel 620D.

FIGS. 7A-7D illustrate example QUIC connection IDs encoded with metadata. In some examples, the metadata may be encoded into a QUIC connection ID by a policy engine, such as, for example, the policy engine(s) 220, 316, and/or 420 as described with respect to FIGS. 2-4B.

Figures 7A, 7B:
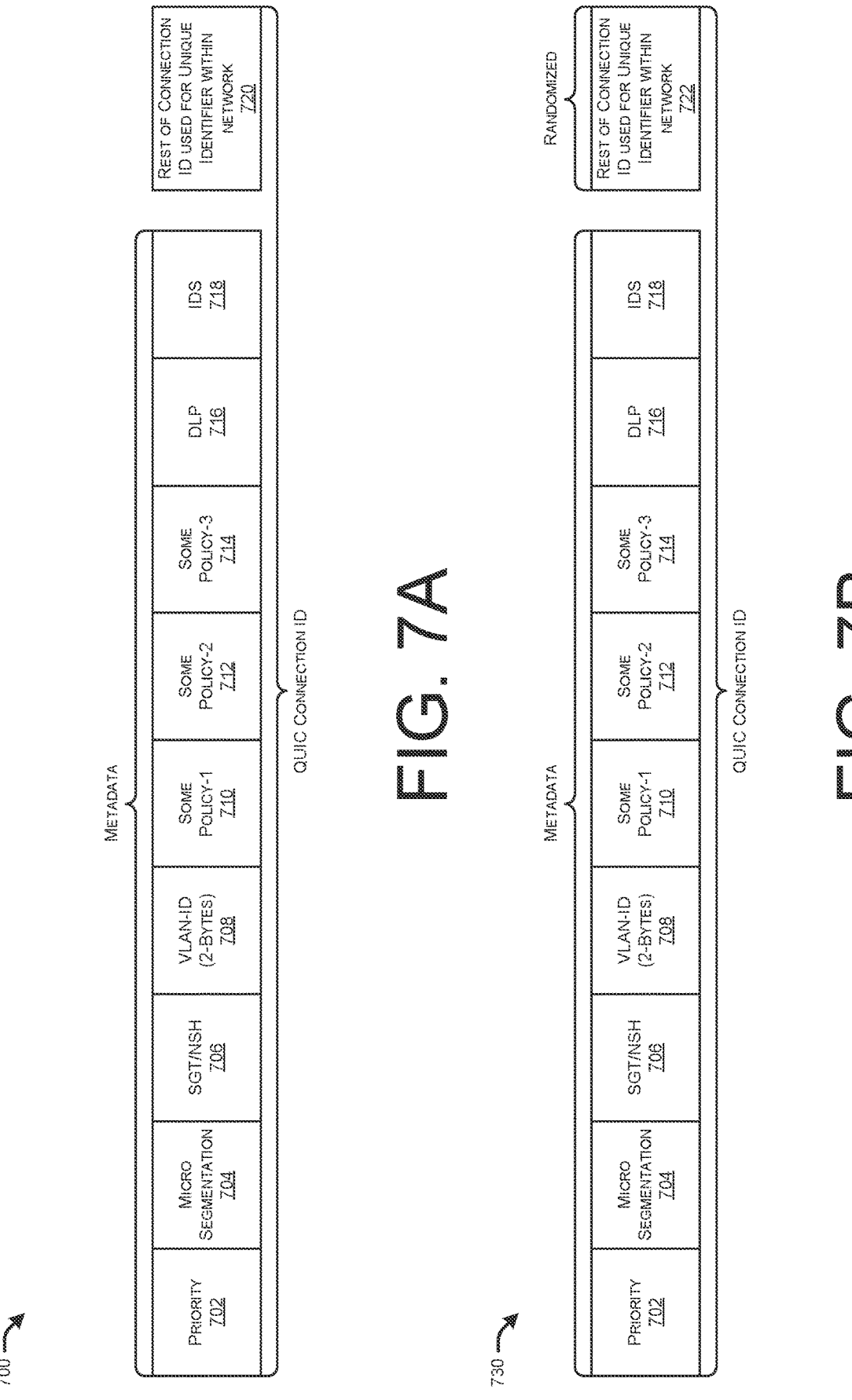
FIG. 7A illustrates an example QUIC connection ID encoded with metadata.
FIG. 7B illustrates another example QUIC connection ID encoded with metadata.

FIG. 7A illustrates an example QUIC connection ID 700 encoded with metadata. In some examples, the metadata representing one or more policies may be encoded into a first portion (e.g., labeled as "Metadata" in FIG. 7A) of a QUIC connection ID 700 of a QUIC packet header. In some examples, the metadata encoded into the first portion of the QUIC connection ID 700 may include a priority field 702 associated with the QUIC connection, a micro-segmentation field 704 associated with the QUIC connection, a secure group tagging (SGT) field 706 associated with the QUIC connection, a network service header (NSH) field 706 associated with the QUIC connection, a virtual local area network (VLAN) identifier field 708 associated with the QUIC connection, one or more user defined policy fields associated with the QUIC connection 710, 712, and/or 714, a data loss prevention (DLP) field 716 associated with the QUIC connection, and/or an intrusion detection system (IDS) field 718 associated with the QUIC connection. Additionally, or alternatively, a second portion 720 of the QUIC connection ID 700 may be reserved to represent a unique identifier within the network.

FIG. 7B illustrates another example QUIC connection ID 730 encoded with metadata. In some examples, the metadata representing one or more policies may be encoded into a first portion (e.g., labeled as "Metadata" in FIG. 7B) of a QUIC connection ID 730 of a QUIC packet header. In some examples, the metadata encoded into the first portion of the QUIC connection ID 730 may include a priority field 702 associated with the QUIC connection, a micro-segmentation field 704 associated with the QUIC connection, a secure group tagging (SGT) field 706 associated with the QUIC connection, a network service header (NSH) field 706 associated with the QUIC connection, a virtual local area network (VLAN) identifier field 708 associated with the QUIC connection, one or more user defined policy fields associated with the QUIC connection 710, 712, and/or 714, a data loss prevention (DLP) field 716 associated with the QUIC connection, and/or an intrusion detection system (IDS) field 718 associated with the QUIC connection. Additionally, or alternatively, a second portion 722 of the QUIC connection ID 730 may be reserved to represent a unique identifier within the network. Additionally, or alternatively, the second portion 722 representing the unique identifier within the network may be configured as a randomized unique identifier.

Figures 7C, 7D:
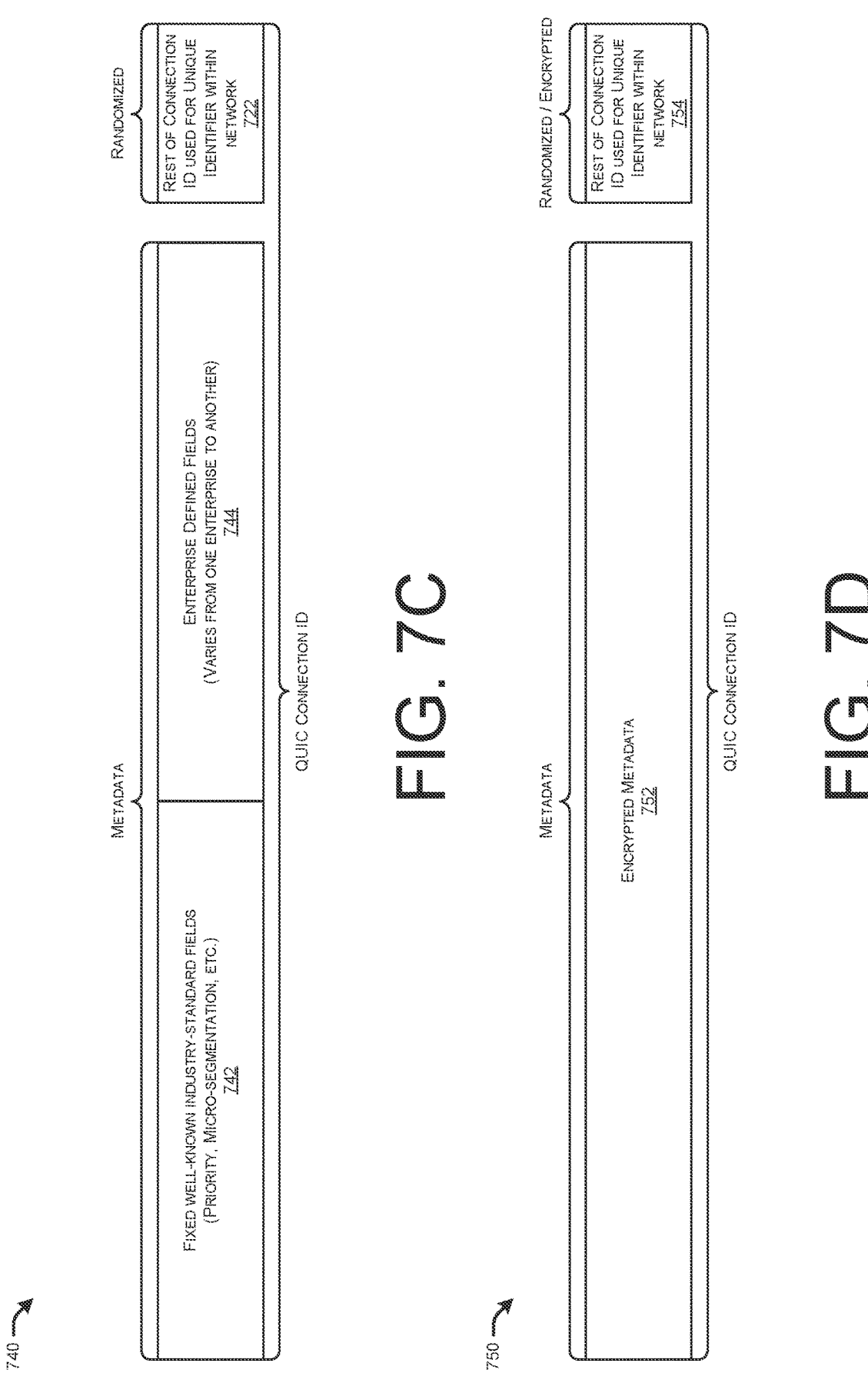
FIG. 7C illustrates another example QUIC connection ID encoded with metadata.
FIG. 7D illustrates another example QUIC connection ID encoded with metadata.

FIG. 7C illustrates another example QUIC connection ID 740 encoded with metadata. In some examples, the metadata representing one or more policies may be encoded into a first portion (e.g., labeled as "Metadata" in FIG. 7C) of a QUIC connection ID 740 of a QUIC packet header. In some examples, the metadata encoded into the first portion of the QUIC connection ID 740 may include a field configured for fixed well-known industry standard fields 742 (e.g., priority, micro-segmentation, etc.) and/or a field for enterprise-defined fields 744 (e.g., varying from one enterprise to another). Additionally, or alternatively, a second portion 722 of the QUIC connection ID 740 may be reserved to represent a unique identifier within the network. Additionally, or alternatively, the second portion 722 representing the unique identifier within the network may be configured as a randomized unique identifier.

FIG. 7D illustrates another example QUIC connection ID 750 encoded with metadata. In some examples, the metadata representing one or more policies may be encoded into a first portion (e.g., labeled as "Metadata" in FIG. 7D) of a QUIC connection ID 750 of a QUIC packet header. In some examples, the first portion of the QUIC connection ID 750 may be configured as encrypted metadata 752, privatizing the encrypted metadata 752 from network devices that do not possess the cryptography algorithm necessary to decrypt the encrypted metadata 752. Additionally, or alternatively, Additionally, or alternatively, a second portion 754 of the QUIC connection ID 750 may be reserved to represent a unique identifier within the network. Additionally, or alternatively, the second portion 754 representing the unique identifier within the network may be configured as a randomized unique identifier. Additionally, or alternatively, the second portion 754 representing the unique identifier within the network may be encrypted similar to the metadata included in the first portion of the QUIC connection ID 750. In some examples, separate cryptography algorithms may be employed to allow certain network devices to access the unique identifier portion 754 while the encrypted metadata 752 remains privatized. In some examples, the encrypted metadata 752 may be configured to encode any of the fields included in any of the first portions of the QUIC connection ID as described with respect to FIGS. 7A-7C.

FIGS. 8A and 8B illustrate example QUIC headers utilized in QUIC packets, such as, for example, the QUIC packets described with respect to FIGS. 2-5.

FIG. 8A illustrates an example QUIC long header 800. In some examples, the QUIC long header 800 may include a destination connection ID (DCID) 802 and/or a source connection ID (SCID) 804. The QUIC long header 800 may be utilized in initial QUIC packets utilized to establish a QUIC connection, such as, for example, the initial QUIC packets 230, 328, and/or 430 as described with respect to FIGS. 2-4B. In some examples, metadata may be encoded into the SCID 804 of a QUIC long header, using the techniques described herein with respect to FIGS. 2-4B.

FIG. 8B illustrates an example QUIC short header 810. In some examples, the QUIC short header 810 may include only a DCID 802. The QUIC short header 810 may be utilized in subsequent QUIC packets sent along as a stream of data via a QUIC connection, such as, for example, the subsequent QUIC packets 232, and/or 330 as described with respect to FIGS. 2-4B.

FIGS. 9-16 illustrate flow diagrams of example methods 900-1600 and that illustrate aspects of the functions performed at least partly by the cloud network(s), the enterprise network(s), the application network(s), and/or the metadata-aware network(s) and/or by the respective components within as described in FIGS. 1A-6. The logical operations described herein with respect to FIGS. 9-16 may be implemented (1) as a sequence of computer-implemented acts or program modules running on a computing system and/or (2) as interconnected machine logic circuits or circuit modules within the computing system. In some examples, the method(s) 900-1600 may be performed by a system comprising one or more processors and one or more non-transitory computer-readable media storing computer-executable instructions that, when executed by the one or more processors, cause the one or more processors to perform the method(s) 900-1600.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 9-16 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 9 illustrates a flow diagram of an example method 900 for one or more nodes executing a MASQUE proxy service to establish a connection with an application node on behalf of a client device to transmit a data stream between the client device and the application node.

At 902, the method 900 includes receiving, at one or more nodes executing a multiplexed application substrate over QUIC encryption (MASQUE) proxy service and from a client device, a hypertext transfer protocol (HTTP) request.

At 904, the method 900 includes identifying, by the MASQUE proxy service, an endpoint identifier in a header field of the HTTP request.

At 906, the method 900 includes sending, by the MASQUE proxy service and to a domain name service (DNS) server, a DNS resolution request including the endpoint identifier.

At 908, the method 900 includes receiving, by the MASQUE proxy service and from the DNS server, an address associated with an application node associated with an enterprise network that is remote from the client device.

At 910, the method 900 includes establishing, at least partly by the MASQUE proxy service, a tunneled connection between the one or more nodes and the application node, wherein the tunneled connection is configured to transmit a data stream between the client device and the application node.

In some examples, the MASQUE proxy service may be a first MASQUE proxy service executing on a first node of the one or more nodes. In some examples, the first node may be deployed at a first network edge of an enterprise network. Additionally, or alternatively, the one or more nodes may include a second node executing a second MASQUE proxy service. In some examples, the second node being deployed at a second network edge of a cloud computing network. In some examples, the cloud computing network being remote from the enterprise network.

In some examples, the tunneled connection comprises a first tunneled connection communicatively coupling the first node and the second node, a second tunneled connection communicatively coupling the first node and the application node, and/or a third tunneled connection communicatively coupling the second node and the client device.

In some examples, the enterprise network may comprise a firewall service configured to apply one or more enterprise firewall rules to the data stream at the first tunneled connection.

In some examples, establishing the tunneled connection may be based at least in part on receiving, by the MASQUE proxy service and from an authentication service associated with the enterprise network, an authentication token associated with at least one of the client device or an enterprise account associated with the client device.

In some examples, the HTTP request may be a first HTTP request generated by a first application executing on the client device, the endpoint identifier may be a first endpoint identifier, the address may be a first address, and/or the application node may be a first application node. Additionally, or alternatively, the method 900 includes receiving, by the MASQUE proxy service and from a second application executing on the client, a second HTTP request. In some examples, the second application may be different from the first application. Additionally, or alternatively, the method 900 includes identifying, by the MASQUE proxy service, a second endpoint identifier in the header field of the second HTTP request. Additionally, or alternatively, the method 900 includes sending, by the MASQUE proxy service and to a domain name service (DNS) server, an additional DNS resolution request including the second endpoint identifier. Additionally, or alternatively, the method 900 includes receiving, by the MASQUE proxy service and from the DNS server, a second address associated with a second application node. Additionally, or alternatively, the method 900 includes determining, by the MASQUE proxy service and based at least in part on the second address, that the second application node is associated with the enterprise network. Additionally, or alternatively, the method 900 includes establishing, by the MASQUE proxy service and based at least in part on the authentication token, an additional tunneled connection between the client device and the second application node.

In some examples, the MASQUE proxy service may be executing on a first node of the one or more nodes. In some examples, the first node being deployed in a cloud computing network. Additionally, or alternatively, the one or more nodes may include a second node executing a secure access service edge (SASE) service deployed in the cloud computing network. In some examples, the SASE service may be configured to apply one or more cloud-based security services to the data stream.

In some examples, the MASQUE proxy service may be executing on a first node of the one or more nodes. In some examples, the first node being deployed in a cloud computing network. Additionally, or alternatively, the application node is communicatively coupled to the first node via an internet protocol secure (IPSec) connection or a point-to-point virtual private network (VPN) connection.

FIG. 10 illustrates a flow diagram of an example method 1000 for providing enforcement nodes of a metadata-aware network with access to metadata indicating a policy to enforce on a QUIC connection between a client device and an application node.

At 1002, the method 1000 includes receiving, at one or more nodes associated with a QUIC server, a first QUIC packet. In some examples, the first QUIC packet may indicate a request by a client device to establish a QUIC connection with an application node.

At 1004, the method 1000 includes identifying, based at least in part on a first identifier in a source connection identifier (SCID) field of the first QUIC packet, a policy associated with at least one of the client device or the application node.

At 1006, the method 1000 includes determining, based at least in part on the policy, metadata indicating the policy to enforce on the QUIC connection.

At 1008, the method 1000 includes providing access to the metadata to enforcement nodes of a metadata-aware network connecting the one or more nodes and the application node.

In some examples, the one or more nodes may include an edge proxy node disposed at a first edge of the metadata-aware network that is proximal to the client device, a workload proxy node disposed at a second edge of the metadata-aware network that is opposite the first edge and proximal to the application node, and/or a policy node associated with the metadata-aware network. In some examples, the edge proxy node may be executing a first instance of a QUIC proxy service. In some examples, the workload proxy node may be executing a second instance of the QUIC proxy service. In some examples, the policy node may be executing a policy engine. Additionally, or alternatively, the method 1000 includes prior to receiving the first QUIC packet receiving, at the second instance of the QUIC proxy service and from the policy engine, the first identifier that is encoded with the metadata and/or encoding, by the second instance of the QUIC proxy service, the first identifier in the SCID field of the first QUIC packet. Additionally, or alternatively, the method 1000 includes receiving, at the first instance of the QUIC proxy service and from the policy engine, a second identifier that is encoded with the metadata. Additionally, or alternatively, the method 1000 includes encoding, by the first instance of the QUIC proxy service, the first identifier in a destination connection identifier (DCID) field of a second QUIC packet. Additionally, or alternatively, the method 1000 includes encoding, by the first instance of the QUIC proxy service, the second identifier in the SCID field of the second QUIC packet. In some examples, providing access to the metadata to the enforcement nodes comprises at least one of sending the second QUIC packet from the first instance of the QUIC proxy service and to a first enforcement node of the enforcement nodes and/or sending the first QUIC packet from the second instance of the QUIC proxy service and to a second enforcement node of the enforcement nodes.

In some examples, the one or more nodes may include a proxy node disposed at an edge of the metadata-aware network that is proximal to the client device, the proxy node executing a QUIC proxy service and/or a policy node associated with the metadata-aware network, the policy node executing a policy engine. Additionally, or alternatively, the method 1000 includes prior to receiving the first QUIC packet receiving, at the application node and from the policy engine, the first identifier that is encoded with the metadata and/or encoding, by the application node, the first identifier in the SCID field of the first QUIC packet. Additionally, or alternatively, the method 1000 includes receiving, at the QUIC proxy service and from the policy engine, a second identifier that is encoded with the metadata. Additionally, or alternatively, the method 1000 includes encoding, by the QUIC proxy service, the first identifier in a destination connection identifier (DCID) field of a second QUIC packet. Additionally, or alternatively, the method 1000 includes encoding, by the QUIC proxy service, the second identifier in the SCID field of the second QUIC packet. In some examples, providing access to the metadata to the enforcement nodes comprises at least one of sending the second QUIC packet from the QUIC proxy service and to a first enforcement node of the enforcement nodes and/or sending the first QUIC packet from the application node and to a second enforcement node of the enforcement nodes, the DCID field of the first QUIC packet including the second identifier.

In some examples, the one or more nodes may include a proxy node disposed at an edge of the metadata-aware network that is proximal to the application node, the proxy node executing a QUIC proxy service and/or a policy node associated with the metadata-aware network and executing a policy engine. Additionally, or alternatively, the method 1000 includes receiving, at the QUIC proxy service and from the policy engine, a second identifier that is encoded with the metadata. Additionally, or alternatively, the method 1000 includes encoding, by the QUIC proxy service, the first identifier in a destination connection identifier (DCID) field of a second QUIC packet. Additionally, or alternatively, the method 1000 includes encoding, by the QUIC proxy service, the second identifier in the SCID field of the second QUIC packet. In some examples, providing access to the metadata to the enforcement nodes may comprise sending the second QUIC packet from the QUIC proxy service and to a first enforcement node of the enforcement nodes.

In some examples, the one or more nodes may include a proxy node disposed at an edge of the metadata-aware network that is proximal to the client device, the proxy node executing a QUIC proxy service and/or a policy node associated with the metadata-aware network and executing a policy engine. Additionally, or alternatively, the method 1000 includes receiving, at the QUIC proxy service and from the policy engine, a second identifier that is encoded with the metadata. Additionally, or alternatively, the method 1000 includes encoding, by the QUIC proxy service, the first identifier in a destination connection identifier (DCID) field of a second QUIC packet. Additionally, or alternatively, the method 1000 includes encoding, by the QUIC proxy service, the second identifier in the SCID field of the second QUIC packet. In some examples, providing access to the metadata to the enforcement nodes may comprise sending the second QUIC packet from the QUIC proxy service and to a first enforcement node of the enforcement nodes.

Additionally, or alternatively, the method 1000 includes prior sending the second QUIC packet, storing, by the QUIC proxy service and in a data store, a mapping between the first identifier and the second identifier. In some examples, providing access to the metadata to the enforcement nodes may comprise identifying, by the first enforcement node and based at least in part on the first identifier in the second QUIC packet, the second identifier in the data store.

Additionally, or alternatively, the method 1000 includes receiving, at a proxy node executing a QUIC proxy service and from a policy node associated with the metadata-aware network and executing a policy service, a second identifier encoded with the metadata. In some examples, the second identifier may include at least one of a first portion including a representation of the metadata, a second portion including an encrypted representation of the metadata, and/or a third portion including a unique identifier associated with the proxy node.

In some examples, the metadata may comprise at least one of a priority field associated with the QUIC connection, a micro-segmentation field associated with the QUIC connection, a secure group tagging (SGT) field associated with the QUIC connection, a network service header (NSH) field associated with the QUIC connection, a virtual local area network (VLAN) identifier field associated with the QUIC connection, a data loss prevention (DLP) field associated with the QUIC connection, an intrusion detection system (IDS) field associated with the QUIC connection, and/or one or more user-defined policy fields associated with the QUIC connection.

FIG. 11 illustrates a flow diagram of another example method 1100 for providing enforcement nodes of a metadata-aware network with access to metadata indicating a policy to enforce on a QUIC connection between a client device and an application node.

At 1102, the method 1100 includes receiving, at an application node associated with a QUIC server, a first QUIC packet. In some examples, the first QUIC packet indicating a request by a client device to establish a QUIC connection with the application node.

At 1104, the method 1100 includes identifying, based at least in part on a first identifier in a destination connection identifier (DCID) field of the first QUIC packet. In some examples, a policy associated with at least one of the client device or the application node.

At 1106, the method 1100 includes determining, based at least in part on the policy, metadata indicating the policy to enforce on the QUIC connection.

At 1108, the method 1100 includes providing access to the metadata to enforcement nodes of a metadata-aware network.

Additionally, or alternatively, the method 1100 includes receiving, at the application node and from a policy node associated with the metadata-aware network, a second identifier encoded with the metadata. In some examples, the policy node executes a policy engine. Additionally, or alternatively, the method 1100 includes encoding, by the application node, the second identifier in a source connection identifier (SCID) field of a second QUIC packet. Additionally, or alternatively, the method 1100 includes encoding, by the application node, a third identifier in the DCID field of the second QUIC packet, the third identifier being associated with the client device. Additionally, or alternatively, the method 1100 includes sending the second QUIC packet to a first enforcement node of the enforcement nodes. In some examples, providing access to the metadata to the enforcement nodes may be based at least in part on sending the second QUIC packet.

Additionally, or alternatively, the method 1100 includes prior to sending the second QUIC packet, storing, in a data store, a mapping between the second identifier and the third identifier. In some examples, providing access to the metadata to the enforcement nodes may comprise identifying, by the first enforcement node and based at least in part on the third identifier in the second QUIC packet, the second identifier in the data store.

Additionally, or alternatively, the method 1100 includes receiving, at the application node and from a policy node associated with the metadata-aware network, a second identifier encoded with the metadata. In some examples, the policy node executes a policy engine. Additionally, or alternatively, the method 1100 includes receiving, at the application node and from the policy node, a third identifier encoded with the metadata. In some examples, the third identifier may be associated with a proxy node executing a QUIC proxy service and being disposed at an edge of the metadata-aware network. In some examples, the edge may be proximal to the client device. Additionally, or alternatively, the method 1100 includes encoding, by the application node, the second identifier in a source connection identifier (SCID) field of a second QUIC packet. Additionally, or alternatively, the method 1100 includes encoding, by the application node, the third identifier in the DCID field of the second QUIC packet.

In some examples, providing access to the metadata to the enforcement nodes may comprise at least one of sending the second QUIC packet from the application node and to a first enforcement node of the enforcement nodes and/or sending a third QUIC packet from the QUIC proxy service and to a second enforcement node of the enforcement nodes. In some examples, the DCID field of the third QUIC packet may include the second identifier.

In some examples, the metadata may comprise at least one of a priority field associated with the QUIC connection, a micro-segmentation field associated with the QUIC connection, a secure group tagging (SGT) field associated with the QUIC connection, a network service header (NSH) field associated with the QUIC connection, a virtual local area network (VLAN) identifier field associated with the QUIC connection, a data loss prevention (DLP) field associated with the QUIC connection, an intrusion detection system (IDS) field associated with the QUIC connection, and/or one or more user-defined policy fields associated with the QUIC connection.

FIG. 12 illustrates a flow diagram of an example method 1200 for a QUIC proxy service to handle one or more QUIC connection migrations across QUIC proxy nodes, data centers, and/or application nodes.

At 1202, the method 1200 includes establishing, by a QUIC proxy service, a first QUIC connection with a client device.

At 1204, the method 1200 includes establishing, by the QUIC proxy service, a second QUIC connection with a first application node. In some examples, data may be streamed between the client device and the first application node via the first QUIC connection and the second QUIC connection.

At 1206, the method 1200 includes storing, by the QUIC proxy service and in a data store, a mapping between first connection information associated with the client device and second connection information associated with an application executing on the first application node.

At 1208, the method 1200 includes detecting an event indicating that the client device is to communicate with a second application node.

At 1210, the method 1200 includes establishing, by the QUIC proxy service and based at least in part on the mapping between the first connection information and the second connection information, a third QUIC connection with the second application node. In some examples, the data may be streamed between the client device and the second application node via the first QUIC connection and the third QUIC connection.

Additionally, or alternatively, the method 1200 includes identifying, by the second application node and based at least in part on the second connection information, the mapping between the first connection information and the second connection information in the data store. In some examples, establishing the third QUIC connection with the second application node may be based at least in part on the second application node identifying the mapping.

Additionally, or alternatively, the method 1200 includes prior to the event, advertising an anycast internet protocol (IP) address associated with the first application node by a first networking device. Additionally, or alternatively, the method 1200 includes subsequent to the event, preventing the first networking device associated with the first application node from advertising the anycast IP address. Additionally, or alternatively, the method 1200 includes causing a second networking device associated with the second application node to advertise the anycast IP address.

In some examples, the first connection information may comprise at least one of a first internet protocol (IP) address associated with the client device, a first port associated with the client device, a first source connection identifier (SCID)

associated with the client device, and/or a first destination connection identifier (DCID) associated with the first application node. Additionally, or alternatively, the second connection information may comprise a second IP address associated with the first application node, a second port associated with the first application node, a second SCID associated with the first application node, and/or a second DCID associated with the client device.

In some examples, the QUIC proxy service executes on a first QUIC proxy node. Additionally, or alternatively, the data store may be accessible by at least one of one or more second proxy nodes, the first application node, and/or one or more second application nodes.

In some examples, the event is a first event and the QUIC proxy service is a first instance of the QUIC proxy service executing on a first proxy node. Additionally, or alternatively, the method 1200 includes detecting a second event indicating that the client device is to communicate with a second proxy node. Additionally, or alternatively, the method 1200 includes establishing, based at least in part on the first connection information, a fourth QUIC connection between the client device and a second instance of the QUIC proxy service executing on the second proxy node. Additionally, or alternatively, the method 1200 includes identifying, by the second instance of the QUIC proxy service and based at least in part on the first connection information, the mapping between the first connection information and the second connection information in the data store. Additionally, or alternatively, the method 1200 includes establishing, by the second instance of the QUIC proxy service and based at least in part on the mapping, a fifth QUIC connection with the first application node. In some examples, data may be streamed between the client device and the first application node via the fourth QUIC connection and the fifth QUIC connection.

In some examples, the first event may be based at least in part on at least one of determining that the first application node is unreachable and/or detecting an interruption associated with the second QUIC connection. Additionally, or alternatively, the second event may be based at least in part on at least one of determining, based at least in part on a load balancing service executing on a networking node, that the first proxy node is executing above a threshold limit and/or detecting an interruption associated with the first QUIC connection.

FIG. 13 illustrates a flow diagram of another example method 1300 for a QUIC proxy service to handle one or more QUIC connection migrations across QUIC proxy nodes, data centers, and/or application nodes.

At 1302, the method 1300 includes establishing, by a first instance of a QUIC proxy service executing on a first proxy node, a first QUIC connection between the first proxy node and a client device.

At 1304, the method 1300 includes establishing, by the first instance of the QUIC proxy service, a second QUIC connection between the first proxy node and a first application node. In some examples, the data may be streamed between the client device and the first application node via the first QUIC connection and the second QUIC connection.

At 1306, the method 1300 includes storing, by the first instance of the QUIC proxy service and in a data store, a mapping between first connection information associated with the client device and second connection information associated with an application executing on the first application node.

At 1308, the method 1300 includes detecting an event indicating that the client device is to communicate with a second proxy node executing a second instance of the QUIC proxy service.

At 1310, the method 1300 includes identifying, by the second instance of the QUIC proxy service executing on the second proxy node, the mapping between the first connection information and the second connection information.

At 1312, the method 1300 includes establishing, by the second instance of the QUIC proxy service, and based at least in part on the first connection information, a third QUIC connection between the client device and the second proxy node.

At 1314, the method 1300 includes establishing, by the second instance of the QUIC proxy service and based at least in part on the second connection information, a fourth QUIC connection between the first application node and the second proxy node. In some examples, the data may be streamed between the client device and the first application node via the third QUIC connection and the fourth QUIC connection.

In some examples, the first connection information may comprise at least one of a first internet protocol (IP) address associated with the client device, a first port associated with the client device, a first source connection identifier (SCID) associated with the client device, and/or a first destination connection identifier (DCID) associated with the first application node. Additionally, or alternatively, the second connection information may comprise a second IP address associated with the first application node, a second port associated with the first application node, a second SCID associated with the first application node, and/or a second DCID associated with the client device.

In some examples, the data store may be accessible by at least one of the second proxy node, one or more third proxy nodes, the first application node, and/or one or more second application nodes.

In some examples, the event may be a first event. Additionally, or alternatively, the method 1300 includes detecting a second event indicating that the client device is to communicate with a second application node. Additionally, or alternatively, the method 1300 includes establishing, by the second instance of the QUIC proxy service and based at least in part on the mapping between the first connection information and the second connection information, a fifth QUIC connection with the second application node. In some examples, the data may be streamed between the client device and the second application node via the third QUIC connection and the fifth QUIC connection.

Additionally, or alternatively, the method 1300 includes identifying, by the second application node and based at least in part on the second connection information, the mapping between the first connection information and the second connection information in the data store. In some examples, establishing the fifth QUIC connection with the second application node may be based at least in part on the second application node identifying the mapping.

Additionally, or alternatively, the method 1300 includes prior to the second event, advertising an anycast internet protocol (IP) address associated with the first application node by a first networking device. Additionally, or alternatively, the method 1300 includes subsequent to the second event, preventing the first networking device associated with the first application node from advertising the anycast IP address. Additionally, or alternatively, the method 1300 includes causing a second networking device associated with the second application node to advertise the anycast IP address.

In some examples, the second event may be based at least in part on at least one of determining that the first application node is unreachable and/or detecting an interruption associated with the fourth QUIC connection. Additionally, or alternatively, the first even may be based at least in part on at least one of determining, based at least in part on a load balancing service executing on a networking node, that the first proxy node is executing above a threshold limit and/or detecting an interruption associated with the first QUIC connection.

FIG. 14 illustrates a flow diagram of another example method 1400 for a QUIC proxy service to handle one or more QUIC connection migrations across QUIC proxy nodes, data centers, and/or application nodes.

At 1402, the method 1400 includes establishing, by a QUIC proxy service executing on a first proxy node, a first QUIC connection with a client device.

At 1404, the method 1400 includes establishing, by the QUIC proxy service, a second QUIC connection with a first application node. In some examples, data may be streamed between the client device and the first application node via the first QUIC connection and the second QUIC connection.

At 1406, the method 1400 includes storing, by the QUIC proxy service and in a data store, a mapping between first connection information associated with the client device and second connection information associated with an application executing on the first application node.

At 1408, the method 1400 includes detecting an event indicating an interruption associated with at least one of the first QUIC connection or the second QUIC connection.

At 1410, the method 1400 includes establishing, by the QUIC proxy service and based at least in part on the mapping between the first connection information and the second connection information at least a third QUIC connection with a second application node, wherein the data may be streamed between the client device and the second application node via the first QUIC connection and the third QUIC connection.

At 1412, the method 1400 includes establishing, by the QUIC proxy service and based at least in part on the mapping between the first connection information and the second connection information at least a fourth QUIC connection between a second proxy node and the client device.

At 1414, the method 1400 includes establishing, by the QUIC proxy service and based at least in part on the mapping between the first connection information and the second connection information at least a fifth QUIC connection between the second proxy node and the first application node. In some examples, the data may be streamed between the client device and the first application node via the fourth QUIC connection and the fifth QUIC connection.

In some examples, the event may indicate the interruption associated with the first QUIC connection. Additionally, or alternatively, the method 1400 includes establishing, by the QUIC proxy service executing on the second proxy node, the fourth QUIC connection with the client device. Additionally, or alternatively, the method 1400 includes identifying, by the QUIC proxy service and based at least in part on the first connection information, the mapping between the first connection information and the second connection information in the data store. Additionally, or alternatively, the method 1400 includes establishing, by the QUIC proxy service executing on the second proxy node and based at least in part on the mapping, the fifth QUIC connection with the first application node.

In some examples, the event may indicate the interruption associated with the second QUIC connection. Additionally, or alternatively, the method 1400 may include identifying, by the second application node and based at least in part on the second connection information, the mapping between the first connection information and the second connection information in the data store. Additionally, or alternatively, the method 1400 may include establishing the third QUIC connection with the second application node based at least in part on the second application node identifying the mapping.

Additionally, or alternatively, the method 1400 may include prior to the event, advertising an anycast internet protocol (IP) address associated with the first application node by a first networking device. Additionally, or alternatively, the method 1400 may include subsequent to the event, preventing the first networking device associated with the first application node from advertising the anycast IP address. Additionally, or alternatively, the method 1400 may include causing a second networking device associated with the second application node to advertise the anycast IP address.

In some examples, the first connection information may comprise at least one of a first internet protocol (IP) address associated with the client device, a first port associated with the client device, a first source connection identifier (SCID) associated with the client device, and/or a first destination connection identifier (DCID) associated with the first application node. Additionally, or alternatively, the second connection information may comprise a second IP address associated with the first application node, a second port associated with the first application node, a second SCID associated with the first application node, and/or a second DCID associated with the client device.

In some examples, the data store may be accessible by at least one of the second proxy node, one or more third proxy nodes, the first application node, the second application node, and/or one or more third application nodes.

FIG. 15 illustrates a flow diagram of an example method 1500 for establishing an EoMASQUE tunnel configured to tunnel one or more Layer 2 ethernet frames from a first device in a first network to a second device in a second network.

At 1502, the method 1500 includes establishing, at least partly by a first device disposed in a first network, a multiplexed application substrate over QUIC encryption (MASQUE) tunnel between the first device and a second device disposed in a second network that is separate from the first network.

At 1504, the method 1500 includes determining, at the first device, to transmit a transmission control protocol (TCP) packet to a first destination in the second network via the MASQUE tunnel.

At 1506, the method 1500 includes generating one or more first ethernet packets representing a first address resolution protocol (ARP/NDP) request.

At 1508, the method 1500 includes sending, from the first device and to the second device, the one or more first ethernet packets via the MASQUE tunnel.

At 1510, the method 1500 includes receiving, at the first device and from the second device, one or more second ethernet packets via the MASQUE tunnel, the one or more second ethernet packets representing a first ARP/NDP response that includes a first media address control (MAC) address associated with the first destination.

Additionally, or alternatively, the method 1500 includes transmitting, based at least in part on the first MAC address, the TCP packet to the first destination via the MASQUE tunnel.

In some examples, the TCP packet may be a first TCP packet. Additionally, or alternatively, the method 1500 includes receiving, at the first device and from the second device, one or more third ethernet packets via the MASQUE tunnel, the one or more third ethernet packets representing a second ARP/NDP request. Additionally, or alternatively, the method 1500 includes determining a second MAC address associated with a second destination in the first network, wherein the first device is configured to transmit data to the second destination. Additionally, or alternatively, the method 1500 includes generating one or more fourth ethernet packets representing a second ARP/NDP response that includes the second MAC address associated with the second destination. Additionally, or alternatively, the method 1500 includes sending, from the first device and to the second device, the one or more fourth ethernet packets via the MASQUE tunnel.

In some examples, the MASQUE tunnel may be a first MASQUE tunnel and/or the TCP packet may be a first TCP packet. Additionally, or alternatively, the method 1500 includes establishing, at least partly by the first device, a second MASQUE tunnel between the first device and a third device disposed in a third network that is separate from the first network and the second network. Additionally, or alternatively, the method 1500 includes determining, at the first device, to transmit a second TCP packet to a second destination in the third network via the second MASQUE tunnel. Additionally, or alternatively, the method 1500 includes generating one or more third ethernet packets representing a second ARP/NDP request. Additionally, or alternatively, the method 1500 includes sending, from the first device and to the third device, the one or more third ethernet packets via the second MASQUE tunnel. Additionally, or alternatively, the method 1500 includes receiving, at the first device and from the third device, one or more fourth ethernet packets via the second MASQUE tunnel, the one or more fourth ethernet packets representing a second ARP/NDP response that includes a second MAC address associated with the second destination.

In some examples, the MASQUE tunnel may be a first MASQUE tunnel and/or the TCP packet may be a first packet. Additionally, or alternatively, the method 1500 includes establishing, at least partly by the first device, a second MASQUE tunnel between the first device and a MASQUE proxy service, wherein the MASQUE proxy service is configured to transmit data to at least a second destination disposed in a third network via a third MASQUE tunnel, the third network being separate from the first network and the second network. Additionally, or alternatively, the method 1500 includes determining, at the first device, to transmit a second TCP packet to the second destination in the third network. Additionally, or alternatively, the method 1500 includes generating one or more third ethernet packets representing a second ARP/NDP request. Additionally, or alternatively, the method 1500 includes sending, from the first device and to the MASQUE proxy service, the one or more third ethernet packets via the second MASQUE tunnel. Additionally, or alternatively, the method 1500 includes receiving, at the first device and from the MASQUE proxy service, one or more fourth ethernet packets via the second MASQUE tunnel. In some examples, the one or more fourth ethernet packets may represent a second ARP/NDP response that includes a second MAC address associated with the second destination.

In some examples, the first destination may comprise at least one of a computing device communicatively coupled to the first device, a server communicatively coupled to the first device, one or more proxy nodes executing one or more instances of a MASQUE proxy service, and/or an application executing on the first device.

FIG. 16 illustrates a flow diagram of another example method 1600 for establishing an EoMASQUE tunnel configured to tunnel one or more Layer 2 ethernet frames from a first device in a first network to a second device in a second network.

At 1602, the method 1600 includes establishing, by one or more nodes executing a multiplexed application substrate over QUIC encryption (MASQUE) proxy service, a first MASQUE tunnel between the MASQUE proxy service and a first device disposed in a first network.

At 1604, the method 1600 includes establishing, by the MASQUE proxy service, a second MASQUE tunnel between the MASQUE proxy service and a second device disposed in a second network that is separate from the first network.

At 1606, the method 1600 includes receiving, by the MASQUE proxy service and from the first device via the first MASQUE tunnel, one or more first ethernet packets representing a first address resolution protocol (ARP/NDP) request.

At 1608, the method 1600 includes sending, by the MASQUE proxy service and to the second device via the second MASQUE tunnel, the one or more first ethernet packets.

At 1610, the method 1600 includes receiving, by the MASQUE proxy service and from the second device via the second MASQUE tunnel, one or more second ethernet packets representing a first ARP/NDP response including at least a first media address control (MAC) address associated with a first destination in the second network.

At 1612, the method 1600 includes sending, by the MASQUE proxy service and to the first device via the first MASQUE tunnel, the one or more second ethernet packets.

Additionally, or alternatively, the method 1600 includes receiving, by the MASQUE proxy service and from the first device via the first MASQUE tunnel, a transmission control protocol (TCP) packet. Additionally, or alternatively, the method 1600 includes sending, by the MASQUE proxy service and to the second device via the second MASQUE tunnel, the TCP packet.

Additionally, or alternatively, the method 1600 includes receiving, by the MASQUE proxy service and from the second device via the second MASQUE tunnel, one or more third ethernet packets representing a second ARP/NDP request. Additionally, or alternatively, the method 1600 includes sending, by the MASQUE proxy service and to the first device via the first MASQUE tunnel, the one or more third ethernet packets. Additionally, or alternatively, the method 1600 includes receiving, by the MASQUE proxy service and from the first device via the first MASQUE tunnel, one or more fourth ethernet packets representing a second ARP/NDP response including at least a second MAC address associated with a second destination in the first network. Additionally, or alternatively, the method 1600 includes sending, by the MASQUE proxy service and to the second device via the second MASQUE tunnel, the one or more fourth ethernet packets. Additionally, or alternatively, the method 1600 includes receiving, by the MASQUE proxy service and from the second device via the second MASQUE tunnel, a transmission control protocol (TCP) packet. Additionally, or alternatively, the method 1600 includes sending, by the MASQUE proxy service and to the first device via the first MASQUE tunnel, the TCP packet.

In some examples, the MASQUE proxy service may be a first instance of the MASQUE proxy service executing on a first node of the one or more nodes. Additionally, or alternatively, the method 1600 includes establishing, at least partly by the first instance of the MASQUE proxy service, a third MASQUE tunnel between the first node and a second node of the one or more nodes disposed at an edge of a third network and executing a second instance of the MASQUE proxy service. In some examples, the second instance of the MASQUE proxy service may be configured to transmit data to at least a second destination disposed in the third network via a fourth MASQUE tunnel. In some examples, the third network may be separate from the first network and the second network. Additionally, or alternatively, the method 1600 includes receiving, by the first instance of the MASQUE proxy service and from the first device via the first MASQUE tunnel, one or more third ethernet packets representing a second ARP/NDP request. Additionally, or alternatively, the method 1600 includes sending, by the first instance of the MASQUE proxy service and to the second instance of the MASQUE proxy service via the third MASQUE tunnel, the one or more third ethernet packets. Additionally, or alternatively, the method 1600 includes receiving, by the first instance of the MASQUE proxy service and from the second instance of the MASQUE proxy service via the third MASQUE tunnel, one or more fourth ethernet packets representing a second ARP/NDP response including at least a second MAC address associated with the second destination in the third network. Additionally, or alternatively, the method 1600 includes sending, by the first instance of the MASQUE proxy service and to the first device via the first MASQUE tunnel, the one or more fourth ethernet packets.

In some examples, the first destination may comprise at least one of a computing device communicatively coupled to the second device, a server communicatively coupled to the second device, one or more proxy nodes executing one or more instances of a MASQUE proxy service, and/or an application executing on the second device.

In some examples, the first device may encapsulate the first ARP/NDP request with the one or more first ethernet packets.

Figure 17:
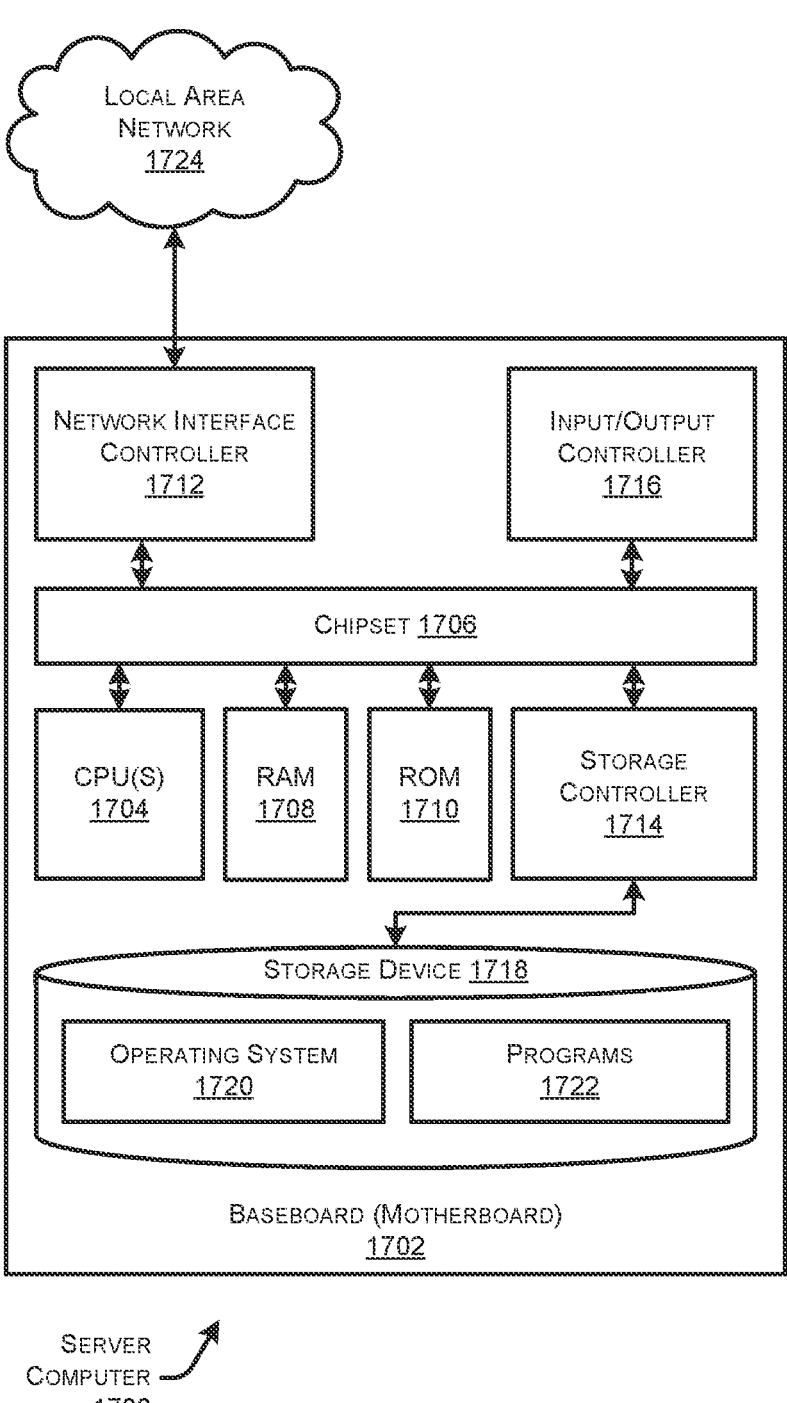
FIG. 17 is a computer architecture diagram showing an illustrative computer hardware architecture for implementing a server device that can be utilized to implement aspects of the various technologies presented herein.

FIG. 17 shows an example computer architecture for a computing device (or network routing device) 1700 capable of executing program components for implementing the functionality described above. The computer architecture shown in FIG. 17 illustrates a conventional server computer, workstation, desktop computer, laptop, tablet, network appliance, e-reader, smartphone, or other computing device, and can be utilized to execute any of the software components presented herein. The computing device 1700 may, in some examples, correspond to a physical server associated with the cloud network(s), the enterprise network(s), the application network(s), and/or the metadata-aware network(s) as described in FIGS. 1A-6.

The computing device 1700 includes a baseboard 1702, or "motherboard," which is a printed circuit board to which a multitude of components or devices can be connected by way of a system bus or other electrical communication paths. In one illustrative configuration, one or more central processing units ("CPUs") 1704 operate in conjunction with a chipset 1706. The CPUs 1704 can be standard programmable processors that perform arithmetic and logical operations necessary for the operation of the computing device 1700.

The CPUs 1704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1706 provides an interface between the CPUs 1704 and the remainder of the components and devices on the baseboard 1702. The chipset 1706 can provide an interface to a RAM 1708, used as the main memory in the computing device 1700. The chipset 1706 can further provide an interface to a computer-readable storage medium such as a read-only memory ("ROM") 1710 or non-volatile RAM ("NVRAM") for storing basic routines that help to startup the computing device 1700 and to transfer information between the various components and devices. The ROM 1710 or NVRAM can also store other software components necessary for the operation of the computing device 1700 in accordance with the configurations described herein.

The computing device 1700 can operate in a networked environment using logical connections to remote computing devices and computer systems through a network, such as the network 1726. The chipset 1706 can include functionality for providing network connectivity through a NIC 1712, such as a gigabit Ethernet adapter. The NIC 1712 is capable of connecting the computing device 1700 to other computing devices over the network 1726. It should be appreciated that multiple NICs 1712 can be present in the computing device 1700, connecting the computer to other types of networks and remote computer systems.

The computing device 1700 can be connected to a storage device 1718 that provides non-volatile storage for the computing device 1700. The storage device 1718 can store an operating system 1720, programs 1722, and data, which have been described in greater detail herein. The storage device 1718 can be connected to the computing device 1700 through a storage controller 1714 connected to the chipset 1706. The storage device 1718 can consist of one or more physical storage units. The storage controller 1714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1700 can store data on the storage device 1718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1718 is characterized as primary or secondary storage, and the like.

For example, the computing device 1700 can store information to the storage device 1718 by issuing instructions through the storage controller 1714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1700 can further read information from the storage device 1718 by detecting the physical states or characteristics of one or more particular locations within the physical storage units.

In addition to the mass storage device 1718 described above, the computing device 1700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 1700. In some examples, the operations performed by the computing resource network 102, and or any components included therein, may be supported by one or more devices similar to computing device 1700. Stated otherwise, some or all of the operations performed by the cloud network(s), the enterprise network(s), the application network(s), and/or the metadata-aware network(s), and/or any components included therein, as described in FIGS. 1A-6, may be performed by one or more computing device 1700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1718 can store an operating system 1720 utilized to control the operation of the computing device 1700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1718 can store other system or application programs and data utilized by the computing device 1700.

In one embodiment, the storage device 1718 or other computer-readable storage media is encoded with computer-executable instructions which, when loaded into the computing device 1700, transform the computer from a general-purpose computing system into a special-purpose computer capable of implementing the embodiments described herein. These computer-executable instructions transform the computing device 1700 by specifying how the CPUs 1704 transition between states, as described above. According to one embodiment, the computing device 1700 has access to computer-readable storage media storing computer-executable instructions which, when executed by the computing device 1700, perform the various processes described above with regard to FIGS. 1A-4B and 9-16. The computing device 1700 can also include computer-readable storage media having instructions stored thereupon for performing any of the other computer-implemented operations described herein.

The computing device 1700 can also include one or more input/output controllers 1716 for receiving and processing input from a number of input devices, such as a keyboard, a mouse, a touchpad, a touch screen, an electronic stylus, or other type of input device. Similarly, an input/output controller 1716 can provide output to a display, such as a computer monitor, a flat-panel display, a digital projector, a printer, or other type of output device. It will be appreciated that the computing device 1700 might not include all of the components shown in FIG. 17, can include other components that are not explicitly shown in FIG. 17, or might utilize an architecture completely different than that shown in FIG. 17.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
establishing, at least partly by a first device disposed in a first network, a multiplexed application substrate over QUIC encryption (MASQUE) tunnel between the first device and a second device disposed in a second network that is separate from the first network;
determining, at the first device, to transmit a packet to a first destination in the second network via the MASQUE tunnel;
generating one or more first ethernet packets representing a first address resolution protocol (ARP/NDP) request;
sending, from the first device and to the second device, the one or more first ethernet packets via the MASQUE tunnel; and
receiving, at the first device and from the second device, one or more second ethernet packets via the MASQUE tunnel, the one or more second ethernet packets representing a first ARP/NDP response that includes a first media address control (MAC) address associated with the first destination.

2. The method of claim 1, further comprising transmitting, based at least in part on the first MAC address, the packet to the first destination via the MASQUE tunnel.

3. The method of claim 1, further comprising:
receiving, at the first device and from the second device, one or more third ethernet packets via the MASQUE tunnel, the one or more third ethernet packets representing a second ARP/NDP request;
determining a second MAC address associated with a second destination in the first network, wherein the first device is configured to transmit data to the second destination;

generating one or more fourth ethernet packets representing a second ARP/NDP response that includes the second MAC address associated with the second destination; and
sending, from the first device and to the second device, the one or more fourth ethernet packets via the MASQUE tunnel.

4. The method of claim 1, wherein the MASQUE tunnel is a first MASQUE tunnel and the packet is a first packet, and the method further comprising:
establishing, at least partly by the first device, a second MASQUE tunnel between the first device and a third device disposed in a third network that is separate from the first network and the second network;
determining, at the first device, to transmit a second packet to a second destination in the third network via the second MASQUE tunnel;
generating one or more third ethernet packets representing a second ARP/NDP request;
sending, from the first device and to the third device, the one or more third ethernet packets via the second MASQUE tunnel; and
receiving, at the first device and from the third device, one or more fourth ethernet packets via the second MASQUE tunnel, the one or more fourth ethernet packets representing a second ARP/NDP response that includes a second MAC address associated with the second destination.

5. The method of claim 1, wherein the MASQUE tunnel is a first MASQUE tunnel and the packet is a first packet, and the method further comprising:
establishing, at least partly by the first device, a second MASQUE tunnel between the first device and a MASQUE proxy service, wherein the MASQUE proxy service is configured to transmit data to at least a second destination disposed in a third network via a third MASQUE tunnel, the third network being separate from the first network and the second network;
determining, at the first device, to transmit a second packet to the second destination in the third network;
generating one or more third ethernet packets representing a second ARP/NDP request;
sending, from the first device and to the MASQUE proxy service, the one or more third ethernet packets via the second MASQUE tunnel; and
receiving, at the first device and from the MASQUE proxy service, one or more fourth ethernet packets via the second MASQUE tunnel, the one or more fourth ethernet packets representing a second ARP/NDP response that includes a second MAC address associated with the second destination.

6. The method of claim 1, wherein the first destination comprises at least one of:
a computing device communicatively coupled to the first device;
a server communicatively coupled to the first device;
one or more proxy nodes executing one or more instances of a MASQUE proxy service; or
an application executing on the first device.

7. The method of claim 1, further comprising encapsulating, by the first device, the first ARP/NDP request with the one or more first ethernet packets.

8. A system comprising:
one or more processors; and
one or more computer-readable media storing computer-executable instructions that, when executed by the one or more processors, cause the one or more processors to perform operations comprising:

establishing, at least partly by a first device disposed in a first network, a multiplexed application substrate over QUIC encryption (MASQUE) tunnel between the first device and a second device disposed in a second network that is separate from the first network;

determining, at the first device, to transmit a packet to a first destination in the second network via the MASQUE tunnel;

generating one or more first ethernet packets representing a first address resolution protocol (ARP/NDP) request;

sending, from the first device and to the second device, the one or more first ethernet packets via the MASQUE tunnel; and receiving, at the first device and from the second device, one or more second ethernet packets via the MASQUE tunnel, the one or more second ethernet packets representing a first ARP/NDP response that includes a first media address control (MAC) address associated with the first destination.

9. The system of claim 8, the operations further comprising transmitting, based at least in part on the first MAC address, the packet to the first destination via the MASQUE tunnel.

10. The system of claim 8, the operations further comprising:

receiving, at the first device and from the second device, one or more third ethernet packets via the MASQUE tunnel, the one or more third ethernet packets representing a second ARP/NDP request;

determining a second MAC address associated with a second destination in the first network, wherein the first device is configured to transmit data to the second destination;

generating one or more fourth ethernet packets representing a second ARP/NDP response that includes the second MAC address associated with the second destination; and sending, from the first device and to the second device, the one or more fourth ethernet packets via the MASQUE tunnel.

11. The system of claim 8, wherein the MASQUE tunnel is a first MASQUE tunnel and the packet is a first packet, and the operations further comprising:

establishing, at least partly by the first device, a second MASQUE tunnel between the first device and a third device disposed in a third network that is separate from the first network and the second network;

determining, at the first device, to transmit a second packet to a second destination in the third network via the second MASQUE tunnel;

generating one or more third ethernet packets representing a second ARP/NDP request;

sending, from the first device and to the third device, the one or more third ethernet packets via the second MASQUE tunnel; and receiving, at the first device and from the third device, one or more fourth ethernet packets via the second MASQUE tunnel, the one or more fourth ethernet packets representing a second ARP/NDP response that includes a second MAC address associated with the second destination.

12. The system of claim 8, wherein the MASQUE tunnel is a first MASQUE tunnel and the packet is a first packet, and the operations further comprising:

establishing, at least partly by the first device, a second MASQUE tunnel between the first device and a MASQUE proxy service, wherein the MASQUE proxy service is configured to transmit data to at least a second destination disposed in a third network via a third MASQUE tunnel, the third network being separate from the first network and the second network;

determining, at the first device, to transmit a second packet to the second destination in the third network;

generating one or more third ethernet packets representing a second ARP/NDP request;

sending, from the first device and to the MASQUE proxy service, the one or more third ethernet packets via the second MASQUE tunnel; and receiving, at the first device and from the MASQUE proxy service, one or more fourth ethernet packets via the second MASQUE tunnel, the one or more fourth ethernet packets representing a second ARP/NDP response that includes a second MAC address associated with the second destination.

13. The system of claim 8, wherein the first destination comprises at least one of:

a computing device communicatively coupled to the first device;

a server communicatively coupled to the first device;

one or more proxy nodes executing one or more instances of a MASQUE proxy service; or an application executing on the first device.

14. The system of claim 8, the operations further comprising encapsulating, by the first device, the first ARP/NDP request with the one or more first ethernet packets.

15. One or more non-transitory computer-readable media storing computer-executable instructions that, when executed by one or more processors, cause the one or more processors to perform operations comprising:

establishing, at least partly by a first device disposed in a first network, a multiplexed application substrate over QUIC encryption (MASQUE) tunnel between the first device and a second device disposed in a second network that is separate from the first network;

determining, at the first device, to transmit a packet to a first destination in the second network via the MASQUE tunnel;

generating one or more first ethernet packets representing a first address resolution protocol (ARP/NDP) request;

sending, from the first device and to the second device, the one or more first ethernet packets via the MASQUE tunnel; and receiving, at the first device and from the second device, one or more second ethernet packets via the MASQUE tunnel, the one or more second ethernet packets representing a first ARP/NDP response that includes a first media address control (MAC) address associated with the first destination.

16. The one or more non-transitory computer-readable media of claim 15, the operations further comprising transmitting, based at least in part on the first MAC address, the packet to the first destination via the MASQUE tunnel.

17. The one or more non-transitory computer-readable media of claim 15, the operations further comprising:

receiving, at the first device and from the second device, one or more third ethernet packets via the MASQUE tunnel, the one or more third ethernet packets representing a second ARP/NDP request;

determining a second MAC address associated with a second destination in the first network, wherein the first device is configured to transmit data to the second destination;

generating one or more fourth ethernet packets representing a second ARP/NDP response that includes the second MAC address associated with the second destination; and sending, from the first device and to the second device, the one or more fourth ethernet packets via the MASQUE tunnel.

18. The one or more non-transitory computer-readable media of claim 15, wherein the MASQUE tunnel is a first MASQUE tunnel and the packet is a first packet, and the operations further comprising:

establishing, at least partly by the first device, a second MASQUE tunnel between the first device and a third device disposed in a third network that is separate from the first network and the second network;

determining, at the first device, to transmit a second packet to a second destination in the third network via the second MASQUE tunnel;

generating one or more third ethernet packets representing a second ARP/NDP request;

sending, from the first device and to the third device, the one or more third ethernet packets via the second MASQUE tunnel; and receiving, at the first device and from the third device, one or more fourth ethernet packets via the second MASQUE tunnel, the one or more fourth ethernet packets representing a second ARP/NDP response that includes a second MAC address associated with the second destination.

19. The one or more non-transitory computer-readable media of claim 15, wherein the MASQUE tunnel is a first MASQUE tunnel and the packet is a first packet, and the operations further comprising:

establishing, at least partly by the first device, a second MASQUE tunnel between the first device and a MASQUE proxy service, wherein the MASQUE proxy service is configured to transmit data to at least a second destination disposed in a third network via a third MASQUE tunnel, the third network being separate from the first network and the second network;

determining, at the first device, to transmit a second packet to the second destination in the third network;

generating one or more third ethernet packets representing a second ARP/NDP request;

sending, from the first device and to the MASQUE proxy service, the one or more third ethernet packets via the second MASQUE tunnel; and receiving, at the first device and from the MASQUE proxy service, one or more fourth ethernet packets via the second MASQUE tunnel, the one or more fourth ethernet packets representing a second ARP/NDP response that includes a second MAC address associated with the second destination.

20. The one or more non-transitory computer-readable media of claim 15, wherein the first destination comprises at least one of:

a computing device communicatively coupled to the first device;

a server communicatively coupled to the first device;

one or more proxy nodes executing one or more instances of a MASQUE proxy service; or an application executing on the first device.

* * * * *